US012571895B2

(12) United States Patent (10) Patent No.: US 12,571,895 B2
Stokes (45) Date of Patent: Mar. 10, 2026

(54) ACTIVE MILLS CROSS ARRANGEMENT SYSTEMS AND METHODS

(71) Applicant: Raymarine UK Limited, Fareham (GB)

(72) Inventor: Paul Stokes, Fleet (GB)

(73) Assignee: Raymarine UK Limited, Fareham (GB)

( * ) Notice: Subject to any disclaimer, the term of this patent is extended or adjusted under 35 U.S.C. 154(b) by 304 days.

(21) Appl. No.: 17/784,046

(22) PCT Filed: Dec. 18, 2020

(86) PCT No.: PCT/US2020/066253
§ 371 (c)(1),
(2) Date: Jun. 9, 2022

(87) PCT Pub. No.: WO2021/127592
PCT Pub. Date: Jun. 24, 2021

(65) Prior Publication Data
US 2023/0009535 A1 Jan. 12, 2023

Related U.S. Application Data

(60) Provisional application No. 62/950,079, filed on Dec. 18, 2019, provisional application No. 62/950,074, filed on Dec. 18, 2019.

(51) Int. Cl.
*G01S 7/52* (2006.01)
*G01S 7/53* (2006.01)
(52) U.S. Cl.
CPC ............ *G01S 7/52003* (2013.01); *G01S 7/53* (2013.01)

(58) Field of Classification Search
CPC .............................. G01S 7/52003; G01S 7/53
See application file for complete search history.

(56) References Cited

U.S. PATENT DOCUMENTS 4,855,961 A * 8/1989 Jaffe ....................... G01S 15/89
367/101
5,323,362 A 6/1994 Mitchell et al.
(Continued)

FOREIGN PATENT DOCUMENTS

CN 102200573 A * 9/2011
EP 1914734 A1 4/2008
(Continued)

OTHER PUBLICATIONS

Summa et al., "Optimization of acoustic se applications," Jun. 5, 1990, pp. 231-237 (Year: 1990).*
(Continued)

*Primary Examiner* — Abdallah Abulaban
(74) *Attorney, Agent, or Firm* — Haynes and Boone, LLP

(57) ABSTRACT

Techniques are disclosed for systems and methods to provide high resolution interpolation of arrival direction of echo return signals using an active mills cross arrangement, such as in sonar or other ranging sensor systems. A system may include an active mills cross arrangement with high resolution interpolation of echo returns in two planes. The active mills cross arrangement may include a transmitter configured to emit one or more signals, a first line array including a first plurality of elements defining a first plane, and a second line array including a second plurality of elements defining a second plane orthogonal to the first plane. At least one of the first line array and the second line array may be configured to receive echo returns of the emitted signals from one or more objects or targets.

19 Claims, 63 Drawing Sheets

Active Mill's Cross Arrangement
with 2 Plane Interpolation Option #2a
(33 Channel Line Arrays)

1700

Transmit Array — 1712

Receive Array #1

1710

1740

1760

Receive Array #2

1762

(56) References Cited

U.S. PATENT DOCUMENTS

| | | | | |
|---|---|---|---|---|
| 5,515,337 A * | 5/1996 | Gilmour | .............. | G10K 11/348 |
| | | | | 367/905 |
| 6,258,034 B1 | 7/2001 | Hanafy | | |
| 6,310,832 B1 * | 10/2001 | Kits van Heyningen | ................... | |
| | | | | G01S 3/8083 |
| | | | | 367/122 |
| 6,436,044 B1 | 8/2002 | Wang | | |
| 7,355,924 B2 | 4/2008 | Zimmerman et al. | | |
| 9,030,914 B2 | 5/2015 | Guigne et al. | | |
| 2005/0185242 A1 | 8/2005 | Modavis | | |
| 2008/0137483 A1 * | 6/2008 | Sawrie | ................... | H04B 13/02 |
| | | | | 367/103 |
| 2017/0234984 A1 * | 8/2017 | Khial | ................... | G01S 7/4817 |
| | | | | 356/5.1 |

FOREIGN PATENT DOCUMENTS

| | | | | |
|---|---|---|---|---|
| JP | 2004012237 A | * | 1/2004 | |
| WO | WO 2012/078610 A3 | | 6/2012 | |

OTHER PUBLICATIONS

Summa et al., "Optimization of acoustic sensors for autonomous underwater vehicle applications," Jun. 5, 1990, pp. 231-237, IEEE, New York, United States of America (Abstract Only).

Marks et al., "Adaptive spectral apodization for sidelobe reduction in optical coherence tomography images," Nov. 2004, vol. 9, issue 6, Journal of Biomedical Optics, https://doi.org/10.1117/1.1806471.

Nikolov et al., "Analysis and Optimization of Medical Ultrasound Imaging Using the Effective Aperture Approach," Jul. 26, 2005, pp. 68-81, vol. 3, Institute for Parallel Processing.

Ebel at al., "Effects of zero-filling and apodization on spectral integrals in discrete Fourier-transform spectroscopy of noisy data," Oct. 2006, pp. 330-338, vol. 182, No. 2, Journal of Magnetic Resonance, https://doi.org/10.1016/j.jmr.2006.06.026.

Seo et al., Sidelobe Suppression in Ultrasound Imaging using Dual Apodization with Cross-Correlation, Oct. 2008, IEEE Transactions on Ultrasonics, Ferroelectrics, and Frequency Control, U.S. National Library of Medicine, https://www.ncbi.nlm.nih.gov/pmc/articles/PMC2905597/.

Walker et al., "Robust Finite Impulse Response Beamforming Applied to Medical Ultrasound," Feb. 2009, IEEE Transactions on Ultrasonics, Ferroelectrics, and Frequency Control, https://www.researchgate.net/figure/Different-beamformer-architectures-The-apodization-weights-and-filters-in-all_fig2_26337632 (Figures Only).

Parker, "Apodization and Windowing Functions," Jun. 2013, pp. 1263-1271, vol. 60, IEEE Transactions on Ultrasonics, Ferroelectrics, and Frequency Control, Parker, Kevin J. "Correspondence: Apodization and Windowing Functions." IEEE Transactions on Ultrasonics, Ferroelectrics, and Frequency Control, vol. 60, No. 6, 2013, pp. 1263-1271, https://doi.org/10.1109/tuffc.2013.2691.

Hassan, "Comparison between windowing apodization functions techniques for medical ultrasound imaging," Jan. 2015, Semantic Scholar, https://www.semanticscholar.org/paper/Comparison-between-windowing-apodization-functions-Hassan/1511983aa9289111cd0a91dbfebf6cbbc211b87b (Abstract Only).

Catherine, "What is apodization?" Feb. 15, 2015, Best Ultrasound http://bestultrasound.com/what-is-apodization/.

Cohen et al., "Sparse Convolutional Beamforming for Ultrasound Imaging," Aug. 3, 2018, vol. 65, No. 12, pp. 2390-2406, IEEE Transactions on Ultrasonics, Ferroelectrics, and Frequency Control.

"The Differences Between Apodizing and Not Apodizing," Aug. 14, 2018, AZO Materials, https://www.azom.com/article.aspx?ArticleID=16498.

Steiner, "What is Apodization," Jun. 19, 2019, B & H Foto & Electronics Corp., New York, United States of America.

"Fourier Transform and Apodization," Jan. 20, 2021, Shimadzu Excellence in Science, https://www.shimadzu.com/an/service-support/technical-support/analysis-basics/tips-ftir/apodization.html.

"Mills Cross Telescope," Jul. 27, 2021, Wikipedia The Free Encyclopedia, https://en.wikipedia.org/wiki/Mills_Cross_Telescope.

"Apodization," Sep. 26, 2021, Merriam-Webster, https://www.merriam-webster.com/dictionary/apodization.

"Apodization," Apr. 4, 2022, Science Direct, https://www.sciencedirect.com/topics/engineering/apodization.

Weisstein, "Apodization Function." May 8, 2022, MathWorld—A Wolfram Web Resource, https://mathworld.wolfram.com/ApodizationFunction.html.

"Apodization Filter," May 9, 2022, Shutter Muse, https://shuttermuse.com/glossary/apodization-filter/.

"Apodization," May 29, 2022, Wikipedia The Free Encyclopedia, https://en.wikipedia.org/wiki/Apodization.

* cited by examiner

100

107

102

106

104

103

Mobile Structure 101

| Multichannel Sonar System 110 | Orientation Sensor 140 |
| User Interface 120 | Speed Sensor 142 |
| Controller 130 | Gyroscope/ Accelerometer 144 |
| Steering Sensor/ Actuator 150 | GPS 146 |
| Propulsion System 170 | Other Modules 180 |

700

516  520

750

510

701

516  520

752

510

1000B

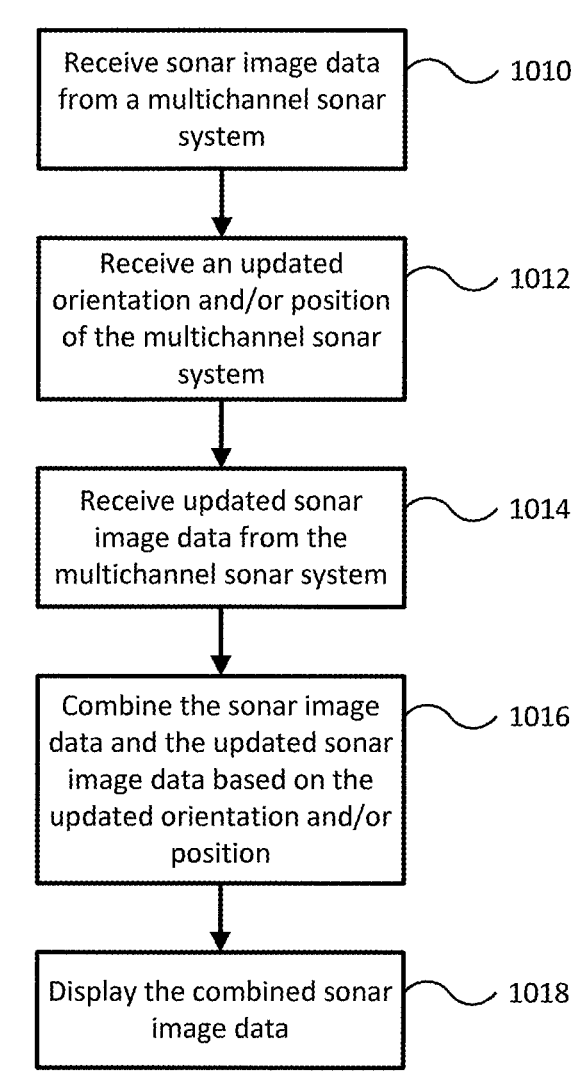

Receive sonar image data from a multichannel sonar system — 1010

Receive an updated orientation and/or position of the multichannel sonar system — 1012

Receive updated sonar image data from the multichannel sonar system — 1014

Combine the sonar image data and the updated sonar image data based on the updated orientation and/or position — 1016

Display the combined sonar image data — 1018

FIG. 10B

**Mill's Cross Directivities
with 2 Plane Interpolation Option #A
(33 Channel Line Arrays)**

Unsteered Responses Showing the Central Combined Beam

**Mill's Cross Directivities
(33 Channel Line Arrays)**

Unsteered Responses Showing the Central Combined Beam

1306

**Receive Array #1
Directivity**

1332

**Receive Array #2
Directivity**

1334

**Receive Array #1
Directivity**

**Active Mill's Cross Arrangement
with 2 Plane Interpolation Option #1
(33 Channel Line Arrays)**

1550

1552

Transmit and
Receive Array

1510

Receive Array

1512

1500

**Active Mill's Cross Directivities with
2 Plane Interpolalation Option #1
(33 Channel Line Arrays)**

Unsteered Responses Showing the Central Combined Beam

**Active Mill's Cross Directivities with
2 Plane Interpolalation Option #2a
(33 Channel Line Arrays)**

Unsteered Responses Showing the Central Combined Beam

Active Mill's Cross Arrangement
with 2 Plane Interpolation Option #2b
(33 Channel Line Arrays)

1900

Transmit Array

1910

1940

1912

Receive Array #1

Receive Array #2

1960

Active Mill's Cross Directivities with
2 Plane Interpolalation Option #2b
(33 Channel Line Arrays)

Unsteered Responses Showing the Central Combined Beam

2100

Binary Weighting For Best Side Lobes

Channel Number

| Rank | Number of Channels | Weighting Scheme | Number of Active Channels | One Way Sidelobe Level (dB) | One Way - 3dB Beamwidth (deg.) | Increase in Beamwidth (%) |
|------|-----|------------------|-----|--------|------|------|
| 1 | 64 | x010100010011 | 52 | -19.40 | 1.82 | 14.7 |
| 2 | 64 | x0101101100111 | 54 | -19.38 | 1.72 | 8.7 |
| 3 | 64 | x01010000011 | 50 | -19.27 | 1.89 | 19.5 |
| 4 | 64 | x010001100001 | 48 | -19.21 | 1.96 | 23.8 |
| 5 | 64 | x00011001001 | 50 | -19.19 | 1.89 | 19.1 |
| 6 | 64 | x0110101000111 | 52 | -19.19 | 1.78 | 12.4 |
| 7 | 64 | x0110011101011 | 54 | -19.18 | 1.71 | 8.1 |
| 8 | 64 | x0010101010011 | 52 | -19.16 | 1.81 | 14 |
| 9 | 64 | x011100001101 | 52 | -19.15 | 1.82 | 14.8 |
| 10 | 64 | x0001110101001 | 50 | -19.11 | 1.84 | 16.1 |

FIG. 27A

| No. of Channels | Weighting Scheme | Number of Active Channels | One Way Sidelobe Level (dB) | One Way - 3dB Beamwidth (deg.) | Change in Beamwidth (%) |
|---|---|---|---|---|---|
| 64 | Uniform | 64 | n/a | 1.583 | n/a |
| 78 | x0010101111010011 | 64 | -19.90 | 1.441 | -9.0 |
| 80 | x011001010000111 | 64 | -20.52 | 1.460 | -7.8 |
| 82 | x01111101010000010011 | 64 | -20.29 | 1.455 | -8.1 |
| 84 | x010011010000110001 | 64 | -20.34 | 1.454 | -8.1 |
| 86 | x0110101000010000011 | 64 | -20.45 | 1.453 | -8.2 |

FIG. 27B

| Rank | No. of Channels | Weighting Scheme | No. of Active Channels | One Way Sidelobe Level (dB) | One Way - 3dB Beam width (deg.) | Increase in Beamwidth (%) | Mid-Level |
|---|---|---|---|---|---|---|---|
| 1 | 64 | x12211111110101 | 60 | -24.73 | 2.063 | 30.3 | 0.380 |
| 2 | 64 | x12111111100011 | 58 | -24.56 | 2.073 | 30.9 | 0.430 |
| 3 | 64 | x122221111111111001 | 60 | -24.53 | 1.981 | 25.2 | 0.465 |
| 4 | 64 | x11211111110101 | 60 | -24.52 | 2.03 | 28.2 | 0.410 |
| 5 | 64 | x12111111110011 | 60 | -24.45 | 2.015 | 27.3 | 0.425 |
| 6 | 64 | x12222111111101101 | 60 | -24.34 | 2.022 | 27.7 | 0.410 |
| 7 | 64 | x11112111101001 | 58 | -24.32 | 2.085 | 31.7 | 0.395 |
| 8 | 64 | x11121111101101 | 60 | -24.30 | 1.986 | 25.5 | 0.445 |
| 9 | 64 | x122221111111101001 | 58 | -24.23 | 2.111 | 33.4 | 0.405 |
| 10 | 64 | x12222111111111011 | 62 | -24.22 | 1.943 | 22.7 | 0.435 |

FIG. 28A

| No. of Channels | Weighting Scheme | No. of Active Channels | One Way Sidelobe Level (dB) | One Way - 3dB Beamwidth (deg.) | Change in Beamwidth (%) | Mid-Level |
|---|---|---|---|---|---|---|
| 64 | Uniform | 64 | n/a | 1.583 | n/a | n/a |
| 64 | x11212111111111111 | 64 | -24.02 | 1.967 | 24.3 | 0.350 |
| 66 | x1122111111111101 | 64 | -24.07 | 1.910 | 20.7 | 0.405 |
| 68 | x12221111111101101 | 64 | -25.10 | 1.920 | 21.3 | 0.390 |
| 70 | x122211111111101001 | 64 | -25.03 | 1.936 | 22.3 | 0.375 |
| 72 | x122111111111000101 | 64 | -24.94 | 1.869 | 18.1 | 0.435 |
| 74 | x12221111121111110100001 | 64 | -24.74 | 1.842 | 15.4 | 0.445 |

Binary Weighting Schemes Overlay

Upper = 0.230
Last 0 = 0.223

Element Position

**Ternary Weighting
Schemes Overlay**

Mid = 0.139

Last 0 = 0.090

Upper = 0.320

Last 2 = 0.313

First 2 = 0.188

Element Position

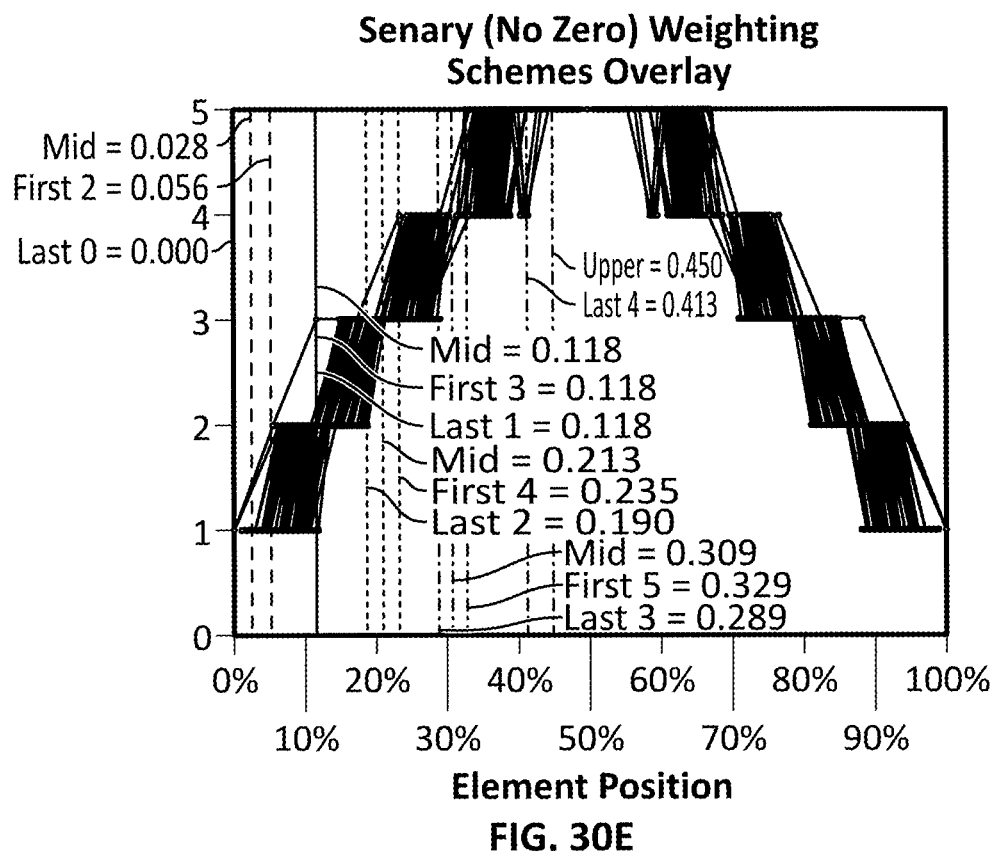

Senary (No Zero) Weighting Schemes Overlay

Mid = 0.028
First 2 = 0.056
Last 0 = 0.000

Upper = 0.450
Last 4 = 0.413

Mid = 0.118
First 3 = 0.118
Last 1 = 0.118
Mid = 0.213
First 4 = 0.235
Last 2 = 0.190
Mid = 0.309
First 5 = 0.329
Last 3 = 0.289

Element Position

FIG. 30E

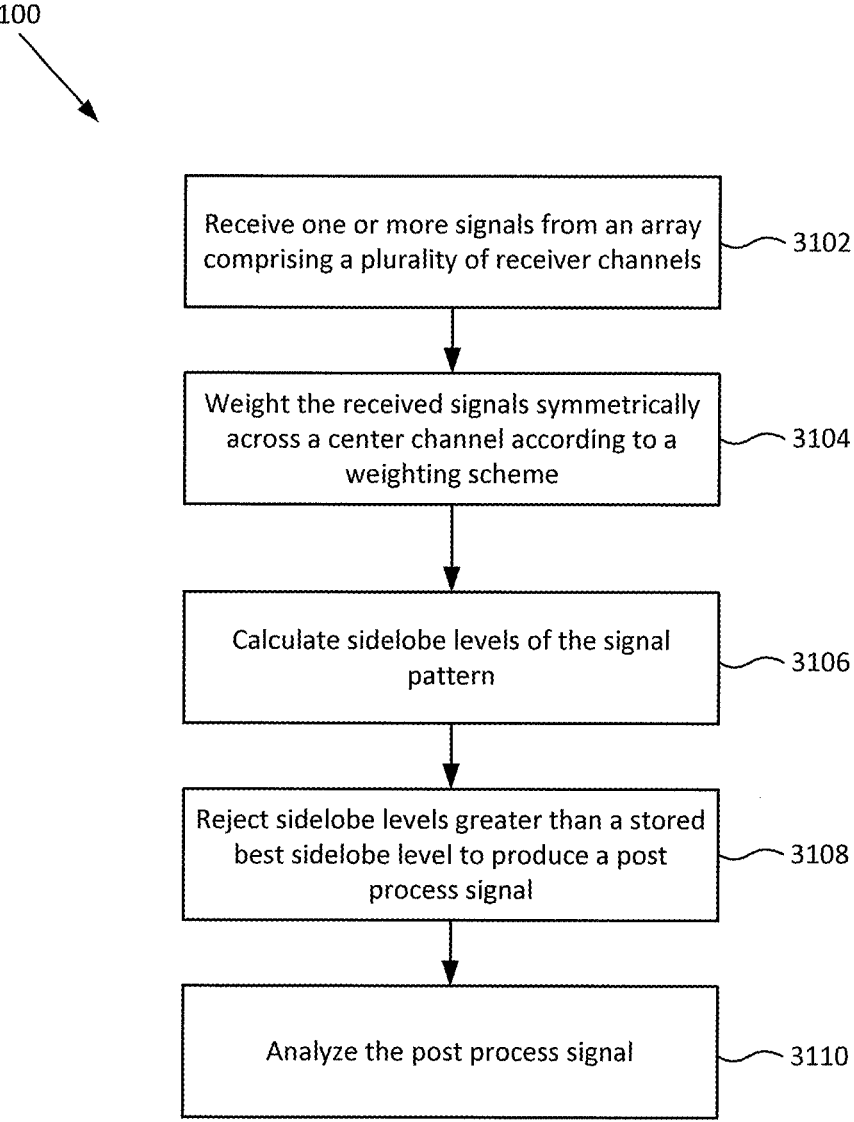

3100

Receive one or more signals from an array comprising a plurality of receiver channels — 3102

Weight the received signals symmetrically across a center channel according to a weighting scheme — 3104

Calculate sidelobe levels of the signal pattern — 3106

Reject sidelobe levels greater than a stored best sidelobe level to produce a post process signal — 3108

Analyze the post process signal — 3110

FIG. 31

ACTIVE MILLS CROSS ARRANGEMENT SYSTEMS AND METHODS

CROSS-REFERENCE TO RELATED APPLICATIONS

This patent application is a U.S. National Stage Patent Application under 35 U.S.C. 371 of International Patent Application No. PCT/US2020/066253 filed Dec. 18, 2020 and entitled "ACTIVE MILLS CROSS ARRANGEMENT SYSTEMS AND METHODS," which claims priority to and the benefit of U.S. Provisional Patent Application No. 62/950,074 filed Dec. 18, 2019 and entitled "ACTIVE MILLS CROSS ARRANGEMENT SYSTEMS AND METHODS," and U.S. Provisional Patent Application No. 62/950,079 filed Dec. 18, 2019 and entitled "APODIZATION SYSTEMS AND METHODS," which are hereby incorporated by reference in their entireties.

TECHNICAL FIELD

One or more embodiments of the invention relate generally to transmission systems and more particularly, for example, to active mills cross arrangement systems and methods for providing high resolution interpolation of arrival direction in multiple planes.

BACKGROUND

The angular resolution limitation for a mills cross arrangement is defined by the beam width of constituent line arrays. Therefore, for very high resolutions, long line arrays with many elements are required. Thus, there is a need for an improved active mills cross arrangement or system to improve resolution and thus reduce the required length of the arrays.

BRIEF SUMMARY

Techniques are disclosed for systems and methods to provide high resolution interpolation of arrival direction of echo return signals using an active mills cross arrangement, such as in sonar or other ranging sensor systems. A system may include an active mills cross arrangement with high resolution interpolation of echo returns in two planes. The active mills cross arrangement may include a transmitter configured to emit one or more signals, a first line array including a first plurality of elements defining a first plane, and a second line array including a second plurality of elements defining a second plane orthogonal to the first plane. At least one of the first line array and the second line array may be configured to receive echo returns of the emitted signals from one or more objects or targets.

In another embodiment, a method includes emitting, by a transmitter controlled by a logic device, one or more signals along a first plane. The method may include receiving, by a first line array in communication with the logic device, echo returns of the emitted signals along a second plane. The method may include interpolating, by the logic device in a plurality of planes, a direction of arrival algorithm to the received echo returns.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 10B illustrates a flow diagram of various operations to operate a multichannel sonar system in accordance with an embodiment of the disclosure.

FIGS. 25A-E illustrate diagrams of a fourth weighting scheme for a linear array, associated one and two-way unsteered responses, and associated one and two-way 30° steering responses in accordance with an embodiment of the disclosure.

FIG. 27A illustrates a diagram of ten 64-channel binary weighting schemes ranked according to one-way sidelobe level reduction in accordance with an embodiment of the disclosure.

FIG. 27B illustrates a diagram of best sidelobe level reductions of binary weighting schemes for a fixed number of 64 active channels in accordance with an embodiment of the disclosure.

FIG. 28A illustrates a diagram of ten 64-channel ternary weighting schemes ranked according to one-way sidelobe level reduction in accordance with an embodiment of the disclosure.

FIG. 28B illustrates a diagram of best sidelobe level reductions of ternary weighting schemes for a fixed number of 64 active channels in accordance with an embodiment of the disclosure.

FIGS. 30A-E illustrate diagrams of binary, ternary, quaternary, quinary, and senary weighting schemes overlaid, with element positions within the array normalized such that 100% is equal to the number of elements in the array, in accordance with an embodiment of the disclosure.

FIG. 31 illustrates a flowchart of a method of apodizing a signal received from an array in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
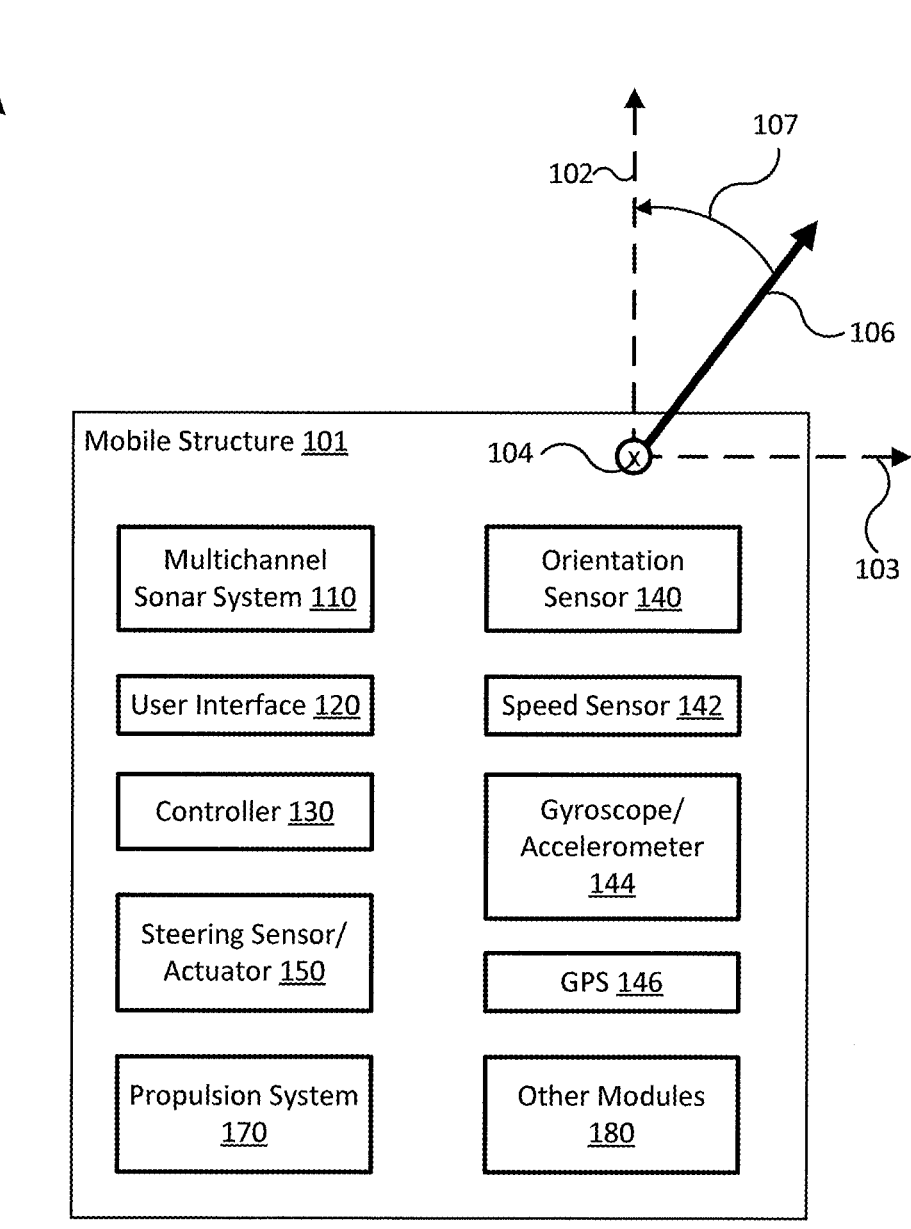
FIG. 1A illustrates a block diagram of a multichannel sonar system in accordance with an embodiment of the disclosure.

In accordance with various embodiments of the present disclosure, an active mills cross arrangement may be used with radar, sonar, and/or other types of transmission signal-based sensor systems. In some embodiments, such a system may include a multichannel sonar system, which may itself include a controller and one or more multichannel sonar transducer assemblies in conjunction with an orientation sensor, a gyroscope, an accelerometer, a position sensor, and/or a speed sensor providing measurements of an orientation, a position, an acceleration, and/or a speed of the multichannel sonar transducer assemblies and/or a coupled mobile structure. For example, the sensors may be mounted to or within the mobile structure (e.g., a watercraft, aircraft, motor vehicle, and/or other mobile structure), or may be integrated with the multichannel sonar transducer assemblies and/or the controller.

Embodiments of the present disclosure can reliably produce higher quality sensor data and/or imagery and be simpler to implement due to reduced shielding needs and/or component count. When combined with a multichannel sonar transducer and various multichannel processing techniques, including automatically coordinating multichannel sonar operation with various orientation and/or position measurements, embodiments of the present signal shaping transducer facilitate the multichannel sonar system being relatively compact and formed according to a number of unique multichannel sonar transducer arrangements, as described herein. The unique multichannel sonar transducer arrangements, in turn, provide various opportunities to develop new sonar processing and/or data accumulation techniques, all of which may be enhanced through use of transmission signal shaping, as described herein.

Sonar may be used to perform bathymetry, detect underwater hazards, find fish, and/or otherwise assist in navigation by producing data and/or imagery of a water column beneath a watercraft. Conventional sonar systems often include one or more independently operating sonar transducers with temporally and/or spatially non-overlapping beams arranged to help differentiate ensonifications and produce traditionally recognizable sonar imagery.

Higher quality sonar imagery has conventionally been associated with relatively large and unwieldy sonar transducer assemblies that can preclude operation in shallow depths. Sonar systems incorporating such assemblies are typically expensive and cannot be used with a large portion of non-commercial watercraft. At the same time, consumer market pressures and convenience dictate smaller and easier to use systems that include more features and produce higher quality resulting imagery. Thus, there is a need for an improved methodology to provide compact yet feature-rich and flexible-use sonar systems, particularly in the context of providing relatively high quality enhanced sonar data and/or imagery.

Embodiments of the present disclosure may include an active mills cross arrangement with high resolution interpolation of echo returns in two planes. The active mills cross arrangement may include a transmitter configured to emit one or more signals, such as sonar signals. The active mills cross arrangement may include a plurality of line arrays, such as two line arrays which are positioned orthogonal to each other. In some embodiments, at least one of the line arrays may be a transmitter array or a transceiver array. In some embodiments, one or more line arrays may be configured as receiver arrays. In some embodiments, a plurality of receiver arrays may extend parallel to each other and orthogonal to a transmitter array. The active mills cross arrangement may apply direction of arrival algorithms in multiple planes, such as in orthogonal planes, to improve resolution and thus reduce the required length of the arrays.

FIG. 1A illustrates a block diagram of system 100 in accordance with an embodiment of the disclosure. In various embodiments, system 100 may be adapted to measure an orientation, a position, an acceleration, and a speed of mobile structure 101 and/or multichannel sonar system 110. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Multichannel sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Multichannel sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, in the context of sea based sonar, fisherman desire highly detailed and accurate information and/or imagery of underwater structure and mid water targets (e.g., fish). Conventional sonar systems are relatively expensive and bulky and typically cannot be used to provide enhanced underwater views, as described herein. Embodiments of sonar system 110 provide a low cost multichannel sonar system that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, all using the same hardware but with different selectable configurations and/or processing methods, as described herein. In some embodiments, sonar system 110 may be implemented with a single transducer assembly housing incorporating a multichannel transducer and associated electronics. Such embodiments can reduce overall system cost because, for example, a multi-way interface cable is not needed. Such embodiments may also provide improved image quality by locating transmission and receiver electronics close to their corresponding transmission and receive channels, which can drastically improve signal to noise relative to systems that transmit and/or receive analog signals over long cabling.

In general, embodiments of sonar system 110 may be configured to transmit relatively wide fan-shaped acoustic beams using a single transmission channel and/or element of a multichannel transducer, receive similarly shaped acoustic returns using multiple receive channels and/or elements of the multichannel transducer, and to perform beamforming and/or interferometry processing on the acoustic returns to produce high quality two and/or three dimensional sonar imagery, as described herein. In some embodiments, one or more sonar transmitters of sonar system 110 may be configured to use chirp signals to improve range resolution and hence reduce ambiguities typically inherent in interferometry processing techniques.

In some embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or multichannel transducer for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of waypoints remote from mobile system 101 without having to estimate positions using, for example, water depth and range. Similarly, sonar system 110 may be configured to provide accurate two and/or three dimensional display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a water bed or floor.

In embodiments where sonar system is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In another embodiment, controller 130 may be configured to determine water depth and/or altitude, and use such data to control an orientation of sonar system 110 to maintain an optimum orientation for the reported depths/altitudes. In yet another embodiment, a user may be searching for fish in a wide area and may select a configuration setting that will adjust a transducer assembly configuration to ensonify a relatively broad, shallow area. In still another embodiment, controller 130 may be configured to receive orientation measurements for mobile structure 101. In such embodiment, controller 130 may be configured to control the actuators associated with the transducer assembly to maintain its orientation relative to, for example, the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/ positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/ port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
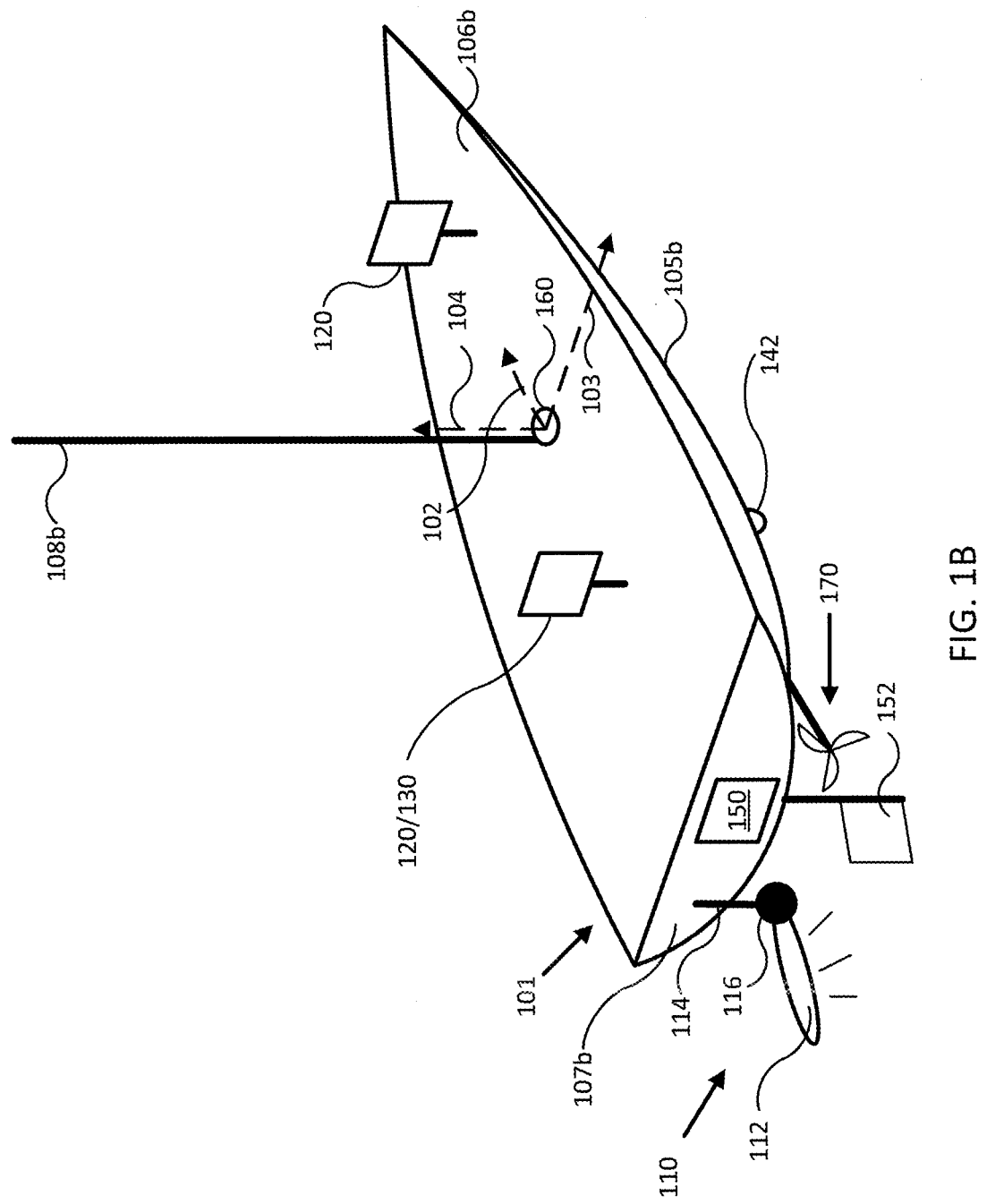
FIG. 1B illustrates a diagram of a multichannel sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include multichannel sonar system 110, integrated user interface/controller 120/130, secondary user interface 120, steering sensor/actuator 150, sensor cluster 160 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated multichannel sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated multichannel sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein. In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
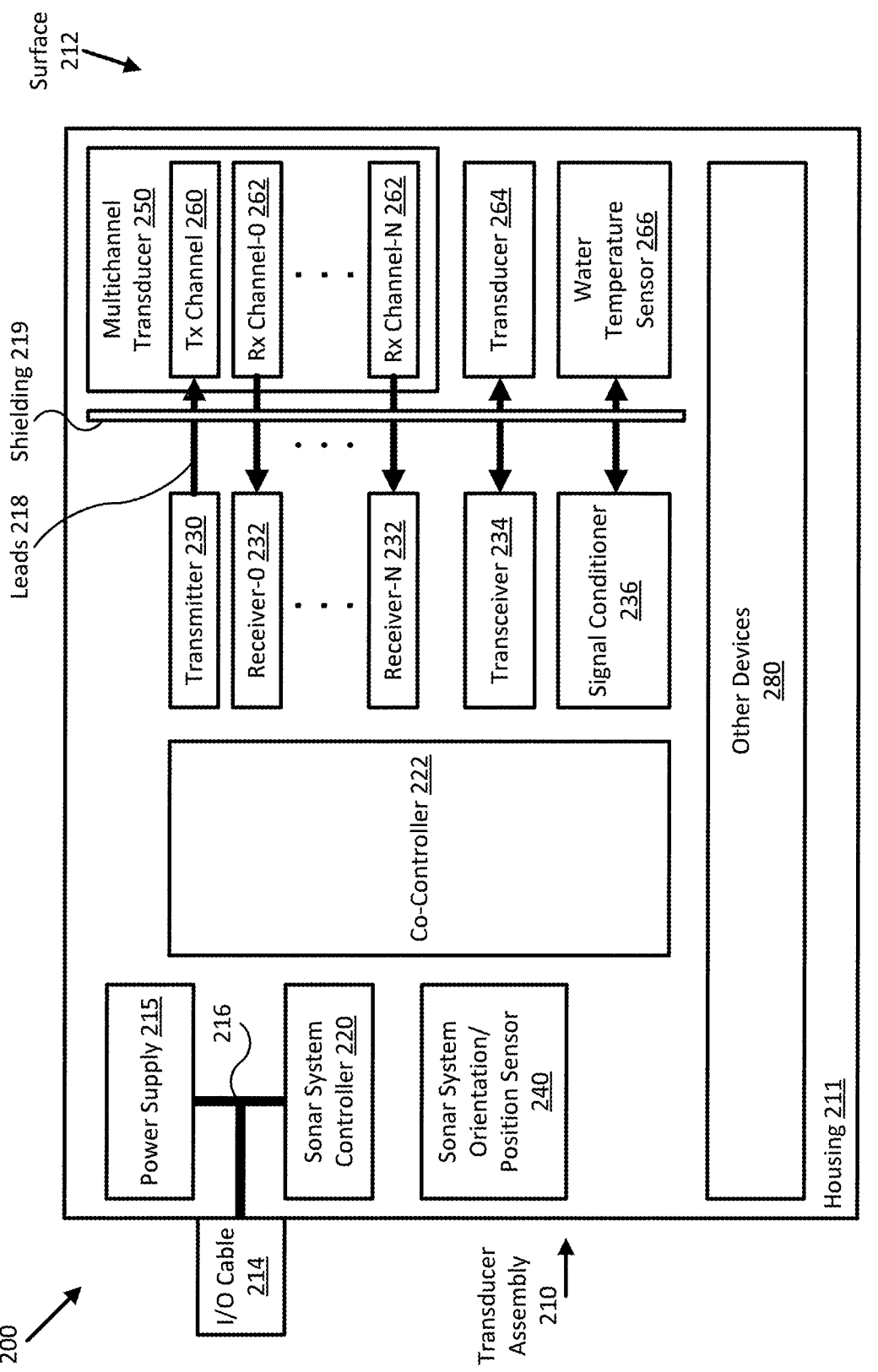
FIG. 2A illustrates a diagram of a multichannel sonar system in accordance with an embodiment of the disclosure.

FIG. 2A illustrates a diagram of a multichannel sonar system 200 in accordance with an embodiment of the disclosure. In the embodiment shown in FIG. 2A, multichannel sonar system 200 includes a transducer assembly 210 that can be coupled to a user interface (e.g., user interface 120 of FIG. 1A) and/or a power source through a single I/O cable 214. As shown, transducer assembly 210 may include one or more controllers (e.g., sonar system controller 220 and/or co-controller 222), transducers (e.g., multichannel transducer 250 and/or transducer 264), other sensors (e.g., orientation/position sensor 240 and/or water temperature sensor 266), and/or other devices facilitating operation of system 200 all disposed within a common housing 211. In other embodiments, one or more of the devices shown in FIG. 2A may be integrated with a remote user interface and communicate with remaining devices within transducer assembly 210 through one or more data and/or power cables similar to I/O cable 214.

Controller 220 and/or co-controller 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transducer assembly 210 and/or system 200, for example, similar to controller 130. In typical embodiments, controller 220 may be tasked with overseeing general operation of transducer assembly 210, generating sonar imagery from sonar data, correlating sensor data with sonar data/imagery, communicating operational parameters and/or sensor information with other devices through I/O cable 214, and/or other non-time-critical operations of system 200. In such embodiments, co-controller 222 may be implemented with relatively high resolution timing circuitry capable of generating digital transmission and/or sampling control signals for operating transmitters, receivers, transceivers, signal conditioners, and/or other devices of transducer assembly 210, for example, and other time critical operations of system 200, such as per-sample digital beamforming and/or interferometry operations applied to sonar returns from multichannel transducer 250, as described herein. In some embodiments, controller 220 and co-controller 222 may be integrated together, for example, or may be implemented in a distributed manner across a number of individual controllers.

Transmitter 230 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from co-controller 222 and to generate transmission signals to excite a transmission channel/transducer element of multichannel transducer 250 (e.g., transmission channel 260) to produce one or more acoustic beams. In some embodiments, operation of transmitter 230 (e.g., amplification, frequency dependent filtering, transmit signal frequency, duration, shape, and/or timing/triggering, and/or other signal attributes), may be controlled (e.g., through use of various control signals) by co-controller 222, as described herein.

Each of receivers 232 (e.g., for N channels as shown) may be implemented with one or more analog to digital converters (ADCs), filters, phase adjusters, signal conditioning elements, amplifiers, timing circuitry, logic devices, and/or other digital and/or analog electronics configured to accept analog acoustic returns from a corresponding receive channel/transducer element of multichannel transducer 250 (e.g., receive channels 262), convert the analog acoustic returns into digital acoustic returns, and provide the digital acoustic returns to co-controller 222. In some embodiments, operation of each receiver 232 (e.g., amplification, frequency dependent filtering, basebanding, sample resolution, duration, and/or timing/triggering, and/or other ADC/signal attributes) may be controlled by co-controller 222. For example, co-controller 222 may be configured to use receivers 232 to convert an acoustic return into a digital acoustic return comprising one or more digital baseband transmissions that are then provided to co-controller 222. In some embodiments, receivers 232 may be configured to low-pass or otherwise filter, amplify, decimate, and/or otherwise process the acoustic and/or digital acoustic returns (e.g., using analog and/or digital signal processing) prior to providing the digital acoustic returns to co-controller 222. In other embodiments, receivers 232 may be configured to provide substantially unprocessed (e.g., raw) analog and/or digital acoustic returns to co-controller 222 for further signal processing, as described herein. In further embodiments, transmitter 230 and one or more of receivers 232 may be integrated into a single transceiver.

In the embodiment shown in FIG. 2A, multichannel transducer 250 includes multiple transducer elements and/or transmission/receive channels that may be operated substantially independently of each other and be configured to emit acoustic beams and receive acoustic returns through emission surface 212 of housing 211. In some embodiments, multichannel transducer 250 may include a single transmission channel 260 and, separately, multiple receive channels 262. In other embodiments, multichannel transducer 250 may include multiple transmission channels. In further embodiments, transmission channel 260 may be implemented as both a transmission channel and a receive channel though use of a transceiver (e.g., similar to transceiver 234). In general, transmission channel 260 may be implemented as one, two, or many separate transducer elements configured to produce one or more acoustic beams. Each of receive channels 262 may also be implemented as one, two, or many separate transducer elements, but configured to receive acoustic returns. The effective volumetric shapes of the acoustic beams and acoustic returns may be determined by the shapes and arrangements of their corresponding transducer elements, as described herein. In various embodiments, the various channels of multichannel transducer 250 may be arranged to facilitate multichannel processing, such as beamforming, interferometry, inter-beam interpolation, and/or other types of multichannel processing used to produce sonar data and/or imagery.

For example, in one embodiment, multichannel transducer 250 may be implemented with multiple transmission channels 260 arranged in a phased array to allow electronic steering of relatively narrow acoustic beams (relative to those produced by a single transmission channel 260) within a relatively wide range of transmission angles. In such embodiments, transducer assembly 210 may be configured to use such electronically steered beams to improve signal-to-noise in resulting sonar data and/or imagery and/or to improve rejection of false targets detected in the corresponding acoustic returns. A related and less complex embodiment could be a transmission array implemented without phasing such that the resulting acoustic beam width can be adjusted by including or excluding transmission channels and/or elements. For example, such embodiments could be used to alternate between operation with deep verses shallow water where the acoustic beams could be switched between relatively narrow for deep water and relative wide for shallow water.

In some embodiments, transducer assembly 210 may be implemented with one or more additional transducers (e.g., transducer 264) separate from multichannel transducer 250, and serviced by separate transmitter/receiver electronics similar to transmitter 230 and/or receivers 232 (e.g., transceiver 234, which may include high voltage protection circuitry and/or transmit/receive switching to enable transmission and reception over the same leads 218). In various embodiments, operation of transceiver 234 and/or transducer 264 (e.g., and its constituent transducer elements) may be controlled by co-controller 222, similar to control of transmitter 230 and/or receivers 232 described herein. Typically, transceiver 234 and/or transducer 264 may be configured to produce acoustic beams adapted to reduce or eliminate interference with operation of multichannel transducer 250, such as by using a substantially different transmission frequency, timing, and/or shape, and/or by aiming the acoustic beams in a substantially non-interfering direction. In alternative embodiments, transceiver 234 and/or transducer 264 may be configured to generate acoustic beams that produce acoustic returns in multichannel transducer 250, similar to operation of transmitter 230 and transmission channel 260, but from an oblique angle relative to multichannel transducer 250. In such embodiments, the oblique acoustic returns may be used to generate sonar imagery with increased spatial differentiation and/or contrast between objects in the water column ensonified by transducer assembly 210.

Transducer assembly 210 may include water temperature sensor 266, which may be a digital and/or analog thermometer, sound cell, and/or other analog or digital device configured to measure a temperature of water near emission surface 212 and provide a corresponding sensor signal to signal conditioner 236 and/or co-controller 222. For example, sound velocity and/or attenuation in water is at least partially dependent on water temperature, and so measured water temperatures may be used to determine accurate measurements of spatial displacements (e.g., depths, object dimensions, and/or other spatial displacements) ensonified by transducer assembly 210. Signal conditioner 236 may be one or more ADCs, filters, signal conditioning elements, amplifiers, timing circuitry, logic devices, and/or other digital and/or analog electronics configured to accept sensor signals from water temperature sensor 266, filter, amplify, linearize, and/or otherwise condition the sensor signals, and provide the conditioned sensor signals to co-controller 222. In some embodiments, signal conditioner 236 may be configured to provide reference signals and/or other control signals to water temperature sensor 266 to enable operation of a particular type of water temperature sensor, for example, and may be controlled by co-controller 222.

In FIG. 2A, each of multichannel transducer 250, transducer 262, and/or water temperature sensor 266 are coupled to their electronics over leads 218 and through shielding 219. In various embodiments, leads 218 and/or shielding 219 may be implemented as one or more shielded transmission lines configured to convey analog and/or digital signals between the various elements while shielding the transducers and/or temperature sensor from electromagnetic interference from each other, other elements of transducer assembly 210, and/or external sources. In some embodiments, leads 218 and shielding 219 may be integrated together to form a transmission system. For example, shielding 219 may be configured to provide a ground plane/return for signals conveyed by leads 218. In one embodiment, leads 218 may be implemented as a first conductive ribbon with multiple electrically isolated conductive traces (e.g., one for each channel/sensor), for example, and shielding 219 may be implemented as a second conductive ribbon with one or more relatively wide conductive traces electrically coupled to multiple channels of multichannel transducer 250, transducer 264, and/or water temperature sensor 266.

As shown, transducer assembly 210 may be implemented with sonar system orientation/position sensor 240. Orientation/position sensor 240 may be implemented as one or more orientation sensors, GPS sensors, differential GPS sensors, orientation/position reference transducers and/or optical sensor (e.g., for actuators), and/or other sensors configured to measure a relative and/or absolute orientation and/or position of transducer assembly 210 and/or multichannel transducer 250 and provide such measurements to controller 220 and/or co-controller 222. In some embodiments, controller 220 and/or co-controller 222 may be configured to combine sonar data and/or imagery according to such measurements and/or measurements of an orientation and/or position of a coupled mobile structure to produce combined sonar data and/or imagery, such as multiple co-registered sonar images, for example, and/or three dimensional sonar images. In other embodiments, controller 220 and/or co-controller 222 may be configured to use orientation and/or position measurements of transducer assembly 210 and/or a coupled mobile structure to control one or more actuators (e.g., other devices 280) to adjust a position and/or orientation of transducer assembly 210 and ensonify a particular position and/or orientation using transducer assembly 210 and/or multichannel transducer 250.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of transducer assembly 210. In some embodiments, other devices 280 may include a visible spectrum camera, an infrared camera, and/or other environmental sensors providing measurements and/or other sensor signals that can be displayed to a user and/or used by other devices of transducer assembly 210 (e.g., controller 220) to provide operational control of transducer assembly 210. In some embodiments, other devices 280 may include one or more actuators adapted to adjust an orientation (e.g., roll, pitch, and/or yaw) and/or a position (longitudinal, lateral, and/or vertical) of transducer assembly 210, multichannel transducer 250, and/or transducer 264, relative to a coupled mobile structure, in response to one or more control signals (e.g., provided by controller 220). In other embodiments, other devices 280 may include one or more brackets, such as a transom bracket, adapted to couple housing 211 to a mobile structure.

In various embodiments, transducer assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between transducer assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of transducer assembly 210.

In various sensor applications, including sonar, radar, and/or other transmission signal-based sensor systems, it is advantageous to be able to control the overall shape of the transmission signal (e.g., a burst of signals). From a processing perspective, shaping the transmission signal can reduce the number and magnitude of artifacts that typically occur along the range direction of the sensor system, which improves the quality and accuracy of resulting imagery and collateral processing, such as reducing false target detection. From a power amplifier design perspective, the shaping can reduce transients and associated issues with component saturation. From an electromagnetic compatibility (EMC)

perspective, the shaping can reduce harmonics and associated spurious interference. Switching methods such as pulse width modulation (PWM) or pulse density modulation (PDM) require expensive fast switching components that can introduce unwanted harmonics and otherwise cause degradation in operation of a sensor system.

Figure 2B:
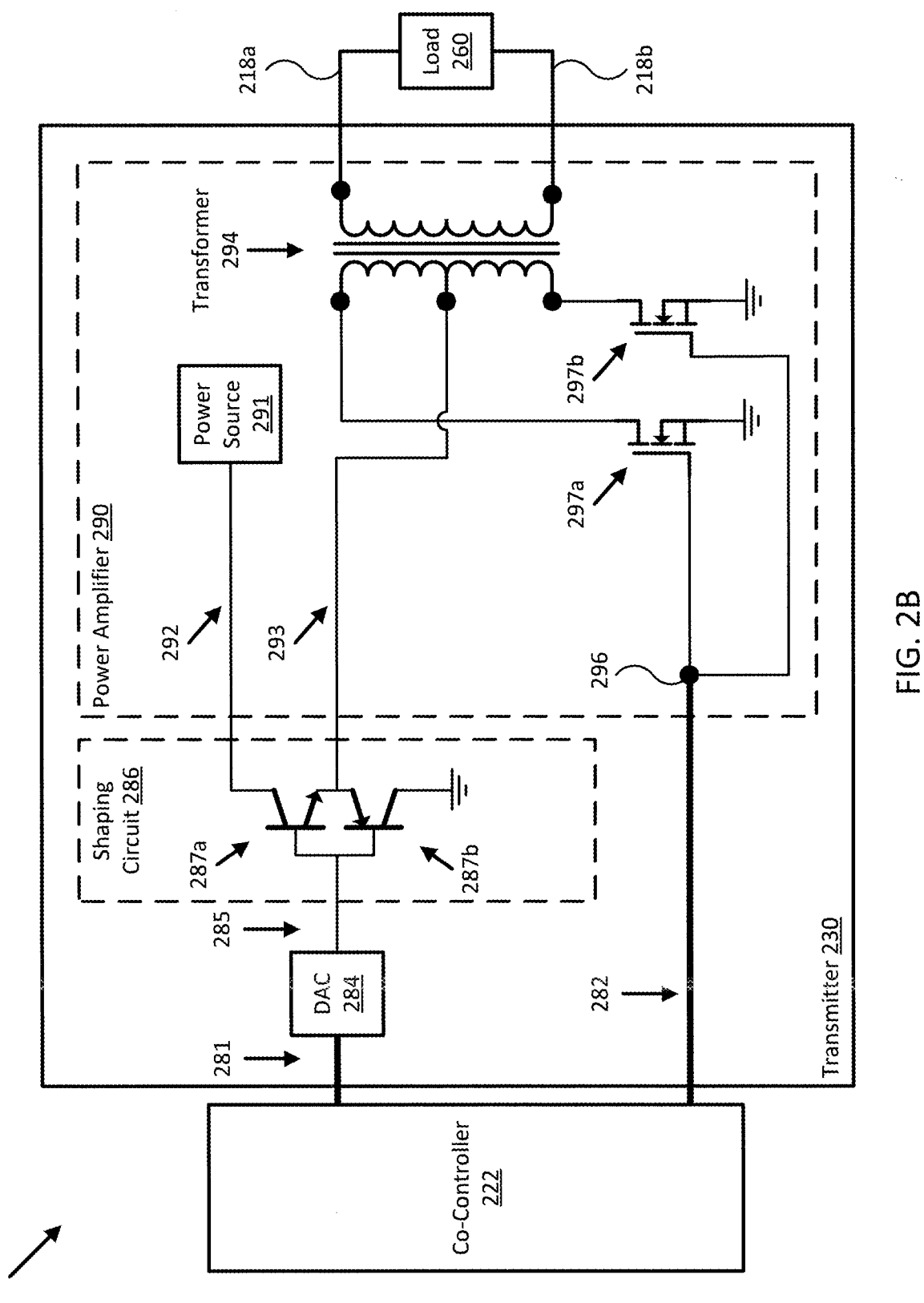
FIG. 2B illustrates a diagram of a sonar transmitter in accordance with an embodiment of the disclosure.

FIG. 2B illustrates a diagram of sonar transmitter 230 configured to implement a digitally controlled method of shaping a transmission signal without a need for fast switching components, in accordance with an embodiment of the disclosure. In the embodiment shown in FIG. 2B, system 201 includes co-controller 222 configured to provide a digital shaping control signal over lead 281, and a transmission control signal over lead 282, to transmitter 230, which in turn is configured to provide a shaped transmission signal to load 260 over leads 218a-b.

As shown in FIG. 2B, transmitter 230 may be implemented with shaping circuit 286 (e.g., an emitter follower type circuit) that is operated by co-controller 222 through DAC 284. This arrangement digitally controls the proportion of a reference voltage (e.g., provided by power source 291 over lead 292) that is presented to power amplifier 290 over lead 293 and hence shapes the transmission signal (e.g., corresponding to a transmission control signal provided over lead 282 by co-controller 222).

For example, in general operation, co-controller 222 may be configured to provide two digital control signals to transmitter 230: a digital shaping control signal over lead 281, and a transmission control signal over lead 282. Lead 281 may provide the digital shaping control signal to DAC 284 of transmitter 230, and DAC 284 may be configured to convert the digital shaping control signal to a corresponding analog shaping control signal that is provided to shaping circuit 286 over lead 285. Shaping circuit 286 may be configured to convert a reference voltage (e.g., provided by power source 291 of power amplifier 290) to a shaped voltage corresponding to the analog shaping control signal, for example, and the shaped voltage may be provided to power amplifier 290 over lead 293. Power amplifier 290 may be configured to convert the shaped voltage into a shaped transmission signal corresponding to both the digital shaping control signal and the transmission control signal provided by co-controller 222. Power amplifier 290 may also be configured to provide the shaped transmission signal to load 260 over leads 218a-b, as shown.

DAC 284 may be implemented with one or more logic devices, filters, amplifiers, timing circuitry, and/or other digital and/or analog electronics configured to convert the digital shaping control signal to a corresponding analog shaping control signal and provide the analog shaping control signal to shaping circuit 286. In some embodiments, DAC 284 may be configured to use the digital shaping control signal directly to charge one or more capacitors that are then controllably discharged in order to convert the digital shaping control signal into a corresponding analog shaping control signal without reliance on a digital interface between co-controller 222 and DAC 284.

Shaping circuit 286 may be implemented with one or more transistors, filter arrangements, amplifier arrangements, and/or other digital and/or analog electronics configured to receive an analog shaping control signal, convert a reference voltage to a corresponding shaped voltage, and provide the shaped voltage to power amplifier 290. In one embodiment, shaping circuit 286 may be configured to provide current gain and/or act as an analog current amplifier for the analog shaping control signal. For example, shaping circuit 286 may be implemented with one or more bipolar junction transistors (BJTs) arranged in an emitter follower and/or voltage buffer circuit, as shown. In some embodiments, shaping circuit 286 may include NPN BJT 287*a* and PNP BJT 287*b* with coupled emitters and bases, with the bases coupled to receive the analog shaping control signal, one collector coupled to the reference voltage, and the other collector coupled to ground.

Power amplifier 290 may be implemented with one or more power sources, transformers, transistors, and/or other digital and/or analog electronics configured to receive a shaped voltage from shaping circuit 286 and convert the shaped voltage into a corresponding shaped transmission signal. In some embodiments, power amplifier 290 may be implemented with power source 291 configured to supply a reference voltage and sufficient backing current to shaping circuit 286 in order to generate a shaped transmission signal across leads 218*a-b* using the shaped voltage supplied by shaping circuit 286, as described herein.

In one embodiment, power amplifier 290 may include transformer 294 and current switches 297*a-b* all configured to convert a shaped voltage provided over lead 293 and a transmission control signal provided over lead 282 into a corresponding shaped transmission signal. In such embodiments, transformer 294 may be implemented with a primary winding coupled to the shaped voltage and current switches 297*a-b*, and a secondary winding coupled to leads 218*a-b*. The primary and secondary windings may have the same or a different number of windings, for example, and the number of windings may depend on the expected currents and loads and may be configured to maximize the power delivered to load 260. The primary winding may be center tapped, for example, or may be tapped off-center to tune transmitter 230 to maximize the power delivered to load 260, and the tap may be coupled to the shaped voltage as shown. Ends of the primary winding may be coupled to switches 297*a-b*, which may be controlled by co-controller 222 using the transmission control signal provided over lead 282.

In one embodiment, the transmission control signal may include a positive signal component and a negative signal component transmitted on different conductors of lead 282. The different conductors may be split at node 296 and each coupled to control leads of current switches 297*a-b*. In some embodiments, current switches 297*a-b* may be implemented from one or more MOSFETs, such as one or more N-channel inductive channel MOSFETs, for example, and the control leads may correspond to gates of the MOSFETs. In various embodiments, a positive voltage at a control lead of either current switch 297*a-b* causes a first current to pass through the primary winding of transformer 294 from the tap to the top or bottom end and then to ground, and the amount of first current is determined, at least in part, by the shaped voltage provided by shaping circuit 286, as shown and described. The first current induces a second current in the secondary windings that in turn produces a corresponding second voltage across load 260. The amount and polarity of the second current and voltage are determined, at least in part, by the amount and polarity of the first current, which is in turn determined by the shaped voltage and operation of one of current switches 297*a-b*. Thus, when presented with a shaped voltage and a transmission control signal, power amplifier 290 converts the shaped voltage into a shaped transmission signal corresponding to both the digital shaping control signal and the transmission control signal provided by co-controller 222.

Figure 2C:
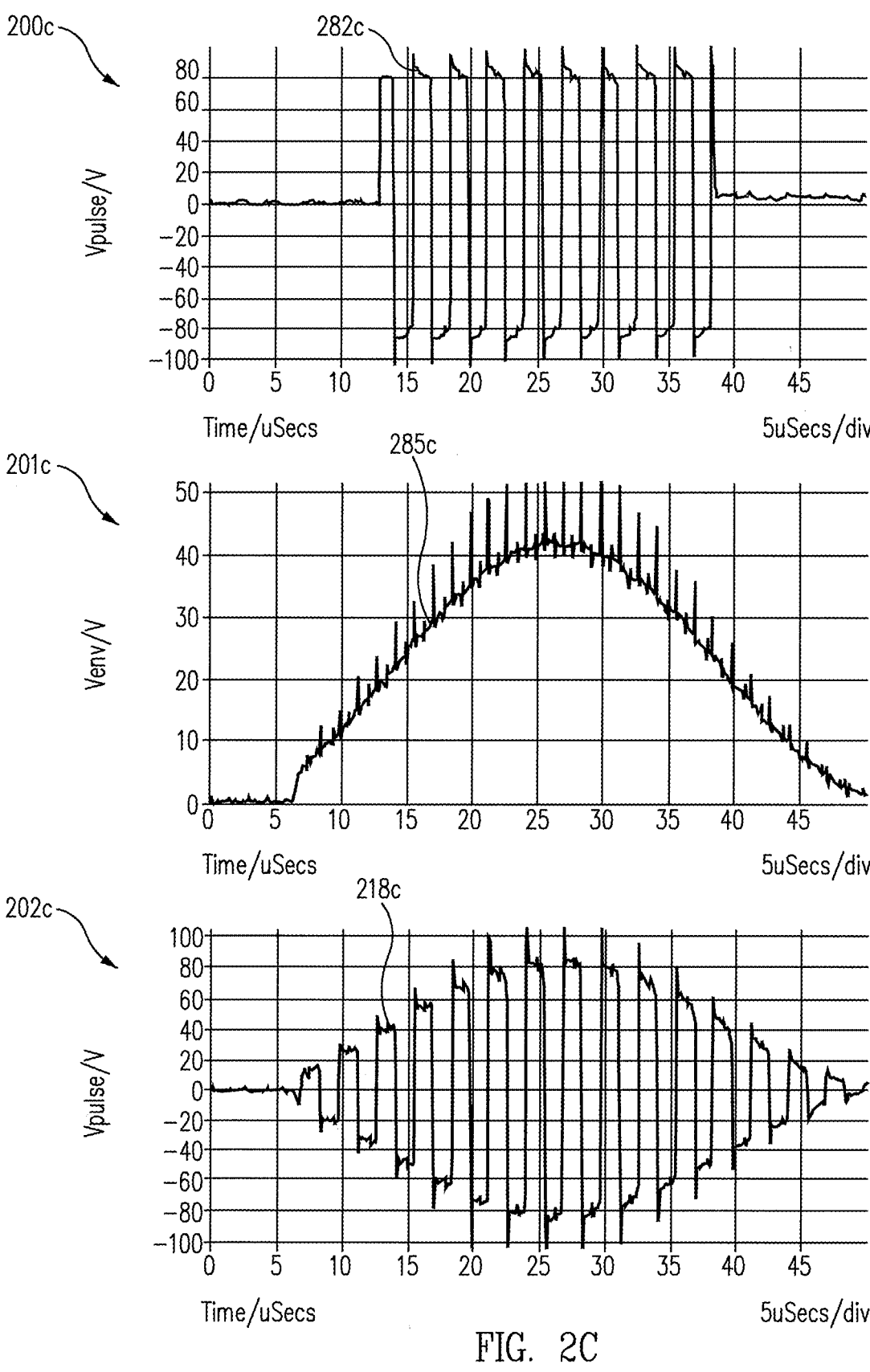
FIG. 2C illustrates various signals of a sonar transmitter in accordance with an embodiment of the disclosure.

FIG. 2C illustrates various signals of sonar transmitter 230 in accordance with an embodiment of the disclosure. Graphs 200C, 201C, and 202C show simulations of unshaped transmission signal 282*c*, analog shape control signal 285*c*, and shaped transmission signal 218*c*, respectively, where shaped transmission signal 218*c* has been formed using a slow changing envelope (e.g., analog shape control signal 285*c*) relative to the transmission control signal (e.g., corresponding to unshaped transmission signal 282*c*).

In some embodiments, transmitter 230 may be used to excite a transmission channel of multichannel sonar transducer 250, as illustrated in FIG. 2A, and/or may be used to implement a portion of transceiver 234 to excite transducer 264. In other embodiments, transmitter 230 may be used to excite a single sonar, radar, or other type sensor element and/or load, for example, or multiple sensor elements and/or sensor channels. In general, embodiments of transmitter 230 may be used with any type of sensor system that utilizes transmission signals to operate and that would benefit from shaped transmission signals, as described herein. For example, load 260 may be implemented as a sonar transducer, a radar antenna, a transducer and/or antenna array, and/or other loads adapted to accept an electrical transmission signal and produce corresponding sound and/or other types of propagating mechanical and/or electromagnetic pulses or waves.

Figure 3A:
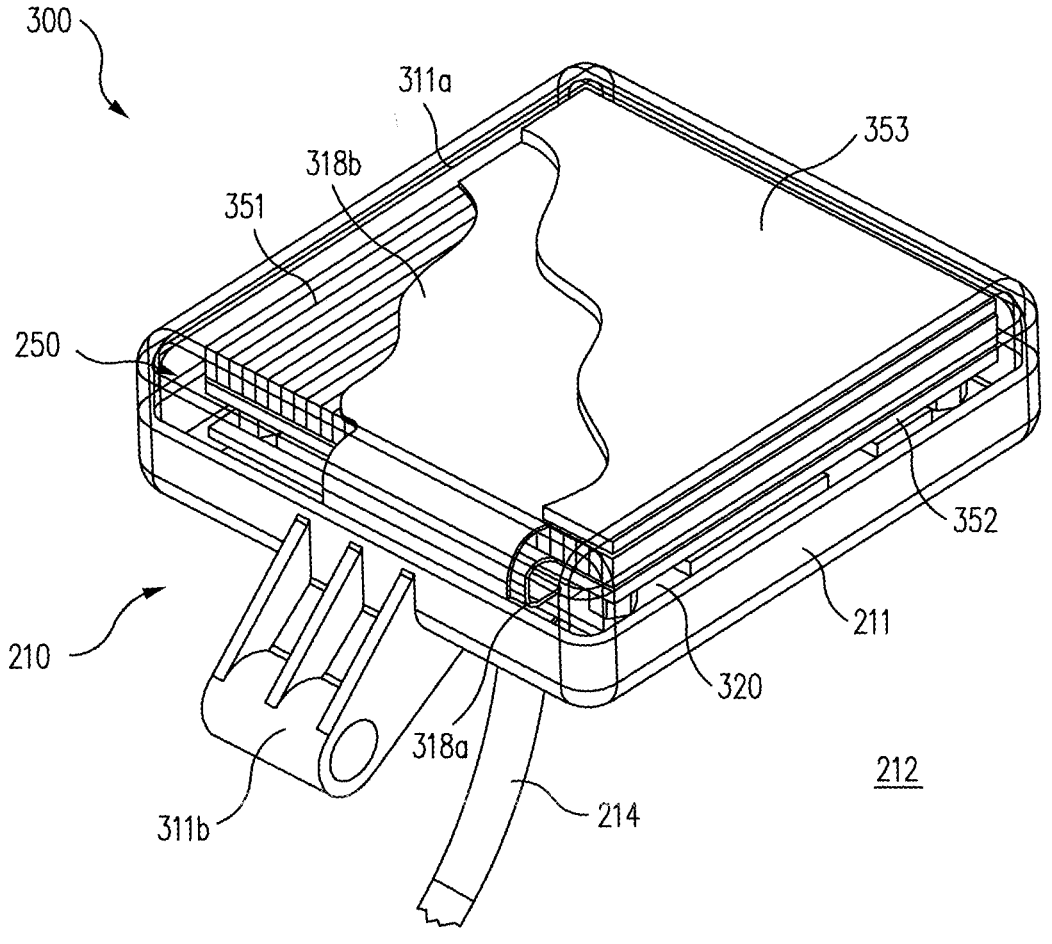
FIGS. 3A-B illustrate diagrams of multichannel sonar systems in accordance with embodiments of the disclosure.
Figure 3B:
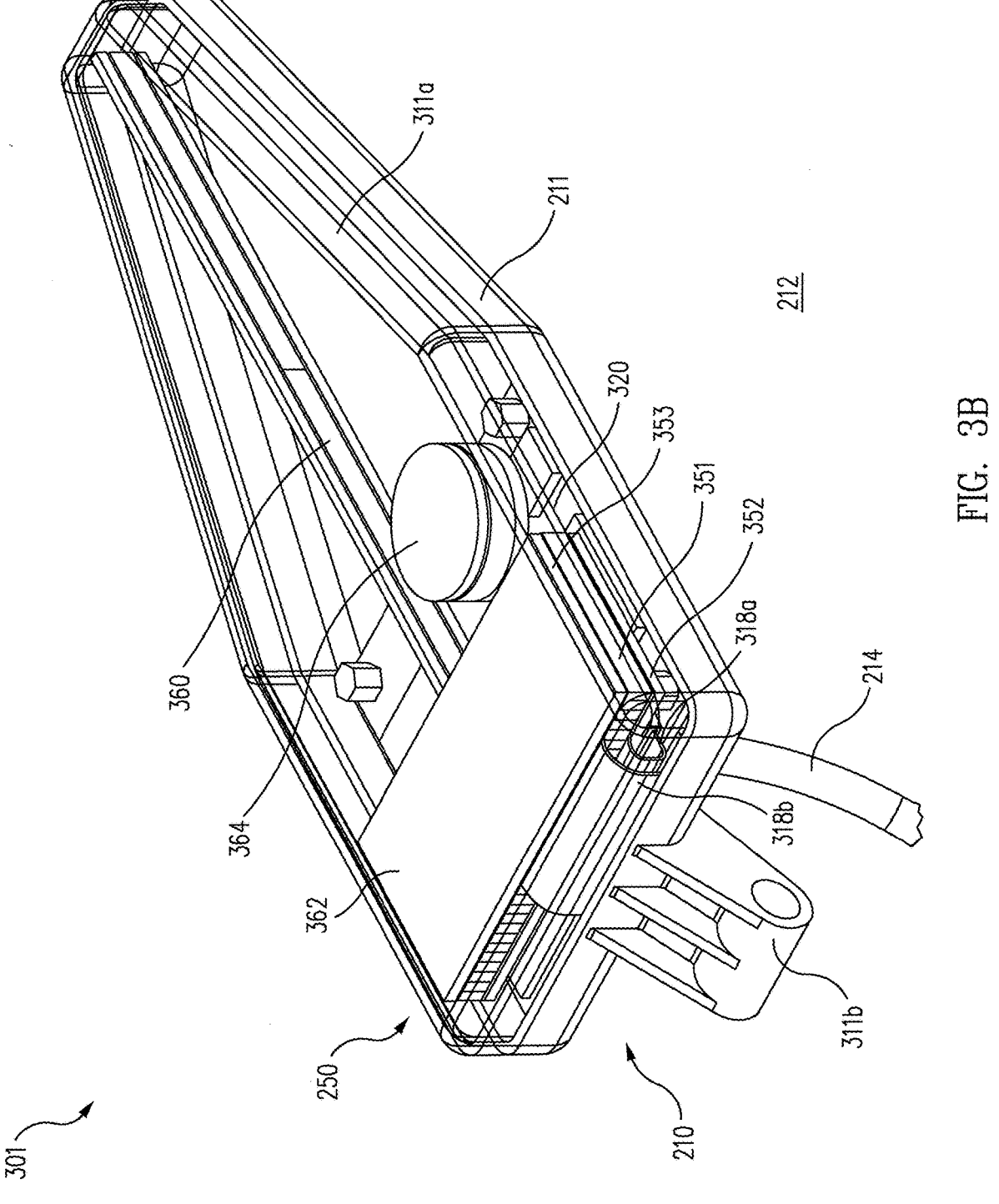

FIGS. 3A-B illustrate diagrams of multichannel sonar systems in accordance with embodiments of the disclosure. In the embodiment illustrated in FIG. 3A, multichannel sonar system 300 includes transducer assembly 210 with multichannel transducer 250 coupled to additional components (e.g., user interface 120) though cable 214. As shown, in some embodiments, multichannel transducer 250 may be implemented with multiple longitudinally adjacent linear transducer elements 351 coupled to integral electronics 320 (e.g., transmitters, receivers, transceivers, controllers, and/or other electronics) through conductive ribbons 318*a-b*. Each transducer element 351 may, in some embodiments, be implemented from a piezoelectric material and/or formed from one or more electrically coupled piezoelectric bars. Conductive ribbon 318*a* may be implemented with multiple conductive traces (e.g., one per channel), for example, and conductive ribbon 318*b* may be implemented with a single relatively wide conductive plane that may form a ground plane/current return and help to shield linear transducer elements 351 from external electromagnetic interference. In some embodiments, conductive ribbon 318*a* may be adapted to shield linear transducer elements 351 from electromagnetic interference from external sources and from integral electronics 320, such as by using relatively wide conductive traces to substantially cover the opposing face of multichannel transducer 250, for example, and/or by including a separate ground plane trace in addition to the multiple conductive traces coupled to the channels of multichannel transducer 250.

In typical embodiments, the number of transducer elements 351 equals the number of channels of multichannel transducer 250. However, in other embodiments, multiple transducer elements 351 may be electrically coupled to form a single channel. For example, in one embodiment, pairs of adjacent transducer elements may be electrically coupled to form a reduced number of channels in order to reduce electronics complexity and cost, form differently shaped acoustic beams and/or return patterns, and/or conform to other produce design specifications. In some embodiments, conductive ribbons 318*a-b* may be configured to electrically couple multiple transducer elements 351 into a reduced number of channels. In other embodiments, integral electronics 320 (e.g., co-controller 222) may be configured to operate multiple physical channels as a single channel and produce a similar result but without requiring physical changes to integral electronics 320, conductive ribbons 318*a-b*, and/or multichannel transducer 250.

As shown in FIG. 3A, multichannel transducer 250 may be disposed within housing 211 between an optional acoustic matching layer 353 adjacent an acoustic face 212 of transducer assembly 210 and an acoustic backing layer 352. In embodiments including acoustic matching layer 353, acoustic matching layer 353 may be configured (e.g., through selection of shape, thickness, and/or material, including variations in each) to allow multichannel transducer 250 (and transducer assembly 210) to be operated at a much wider frequency band (e.g., transmit and/or receive band) than conventional sonar systems. For example, acoustic matching layer 353 may be formed from a metal or metal oxide filled epoxy (e.g., alumina, stainless steel, copper, and/or other metal and/or metal oxide powder, flakes, microballs, and/or other type of filler). In some embodiments, a thickness of acoustic matching layer 353 may roughly correspond to a quarter-wavelength of the excitation signal (e.g., of a central frequency of the excitation signal) used to generate acoustic beams using multichannel transducer 250.

Acoustic backing layer 352 may be configured to provide structural support for multichannel transducer 250, to help mechanically isolate multichannel transducer 250 from other components of transducer assembly 210, and/or to help shield multichannel transducer 250 from electromagnetic interference. In some embodiments, acoustic backing layer 352 may be formed from a relatively rigid substrate (e.g., fiberglass, other laminates, metal sheet, and/or other rigid substrates) substantially encapsulated in a relatively resilient material (e.g., rubber, foam, and/or other acoustic baffling materials).

As noted in FIG. 3A, in some embodiments, housing 211 may include waterproof layer 311*a* and/or mount bracket 311*b*. In some embodiments, waterproof layer 311*a* may be formed from a polyurethane plastic and/or other types of thermosetting polymers substantially transparent to acoustic signals and able to be overmoulded into and/or around housing 211 and/or multichannel transducer 250. For example, waterproof layer 311*a* may form acoustic face 212 of transducer assembly 210, for example, and be sealed to remaining portions of housing 211 to form housing 211. In general, housing 211 may be configured to provide structural and/or protective support for transducer assembly 210. In some embodiments, at least some portions of housing 211 may be implemented from a machined, cast, and/or injection moulded material, such as a metal, ceramic, and/or plastic (e.g., a polycarbonate, polyurethane, and/or other plastic) material that can be formed into one or more rigid, pliable, and/or combination of rigid and pliable structures. Mount bracket 311*b* may be formed from the same or different materials, for example, and may be configured to physically couple transducer assembly 210 to a mobile structure (e.g., transom 107*b* of mobile structure 101 in FIG. 1B). In some embodiments, mount bracket 311*b*, housing 211, and/or transducer assembly 210 may be implemented with one or more actuators to adjust an orientation and/or position of transducer assembly 210, as described herein.

In the embodiment illustrated in FIG. 3B, multichannel sonar system 301 includes transducer assembly 210 implemented with multichannel transducer 250 and optional transducer 364. As shown, in some embodiments, multichannel transducer 250 may be implemented with physically differentiated transmission channel 360 and receiver channels

362, so as to differentiate the shapes of the corresponding acoustic beams and acoustic returns, as described herein. In the illustrated embodiment, transmission channel 360 may extend centrally through and beyond receiver channels 362 into an end of housing 211, thereby producing an acoustic beam that is narrower that the acoustic returns for receiver channels 362. Although the beamwidths of receiver channels 362 are wider, the effective system beamwidth would be equal to the narrower beam (e.g., the acoustic beam produced by transmission channel 360). Transmission channel 360 may be formed from one relatively long transducer element, for example, or from multiple relatively short electrically coupled transducer elements in order to reduce differentiated manufacturing costs and/or to reduce a risk of thermal warping and/or related damage.

Also shown in FIG. 3B, transducer assembly 210 may be implemented with optional transducer 364. In various embodiments, transducer 364 may be configured to produce acoustic beams with shapes, orientations, and/or frequencies different from those produced by multichannel transducer 250. For example, transducer 364 may be implemented with a circular transducer element configured to produce relatively narrow conical acoustic beams, for example, to facilitate depth measurements in deep water. In other embodiments, transducer 364 may be configured to produce acoustic beams configured to compliment operation of multichannel transducer 250.

Figures 3C, 3D:
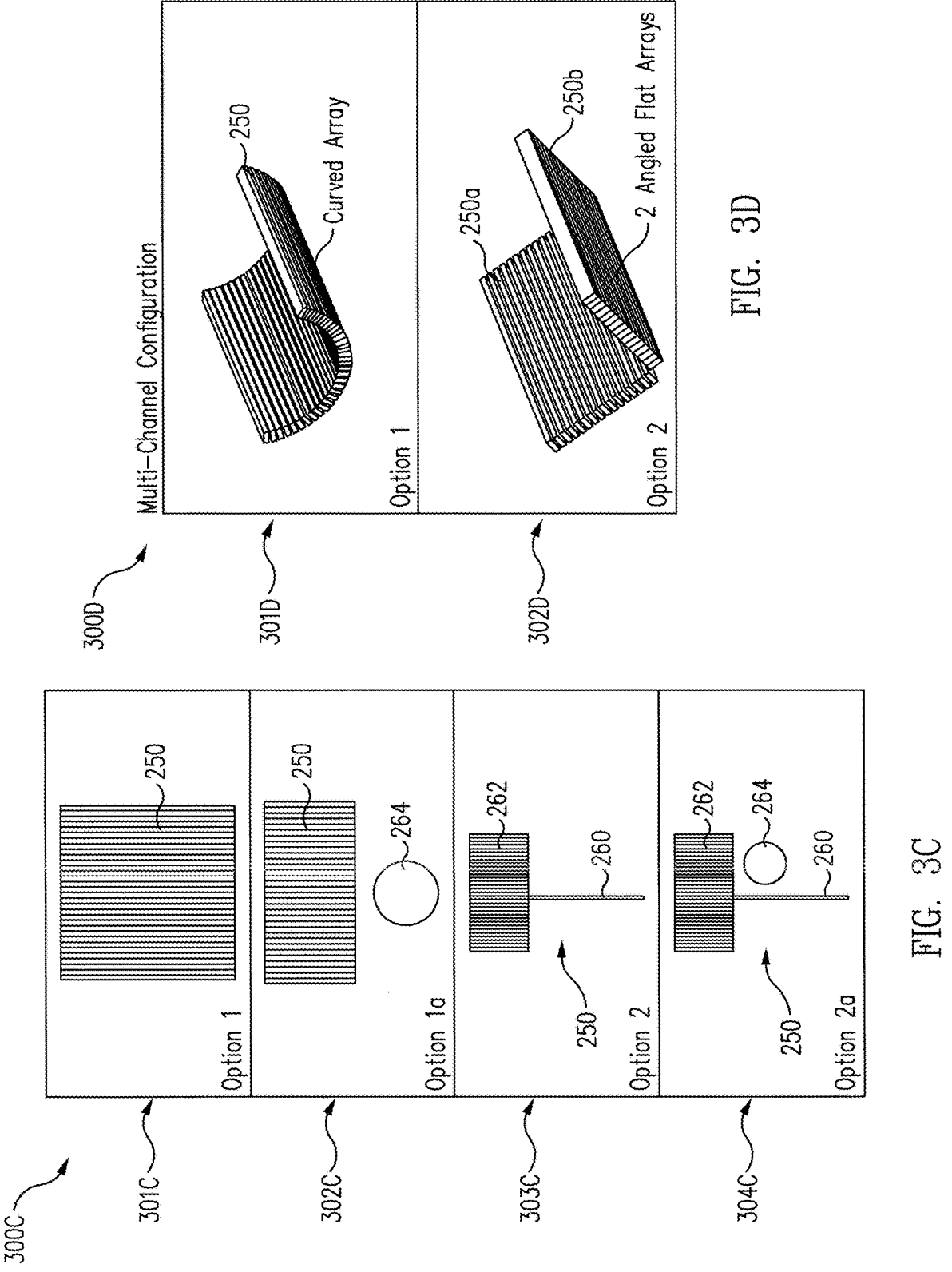
FIGS. 3C-D illustrate diagrams of various transducer configurations for multichannel sonar systems in accordance with embodiments of the disclosure.

FIGS. 3C-D illustrate diagrams 300C and 300D of various transducer configurations for multichannel sonar systems in accordance with embodiments of the disclosure. For example, configuration 301C in FIG. 3C includes a single substantially square multichannel transducer 250 with similarly sized linear transmission and receiver channels. Configuration 302C includes a single substantially rectangular multichannel transducer 250 and a circular transducer 264 laterally aligned with a center linear channel of multichannel transducer 250. Configuration 303C includes a single multichannel transducer 250 with an elongated transmission channel 260 relative to receiver channels 262. Configuration 304C includes a single multichannel transducer 250 with an elongated transmission channel 260 relative to receiver channels 262, and a circular transducer 264 offset from both transmission channel 260 and receiver channels 262. Diagrams 300D of FIG. 3D provide embodiments of multichannel transducer configurations adapted to provide additional width of coverage. For example, configuration 301D includes a single multichannel transducer 250 with similarly sized linear and transmission channels, but arranged in a curved array rather than a plane array. Configuration 302D includes two spatially differentiated planar arrays 250*a-b*, where planar arrays 250*a-b* are oriented differently and are adjacent and/or adjoining along one edge. In some embodiments, planar arrays 250*a-b* may form a single multichannel transducer, for example, or may form multiple multichannel transducers.

As described herein, each of these configurations may be implemented with integral electronics and within a single housing of a corresponding transducer assembly. In some embodiments, multiple such embodiments may be formed within a single housing, for example, and/or may be coupled together to form a more complex multichannel sonar system.

Figure 3E:
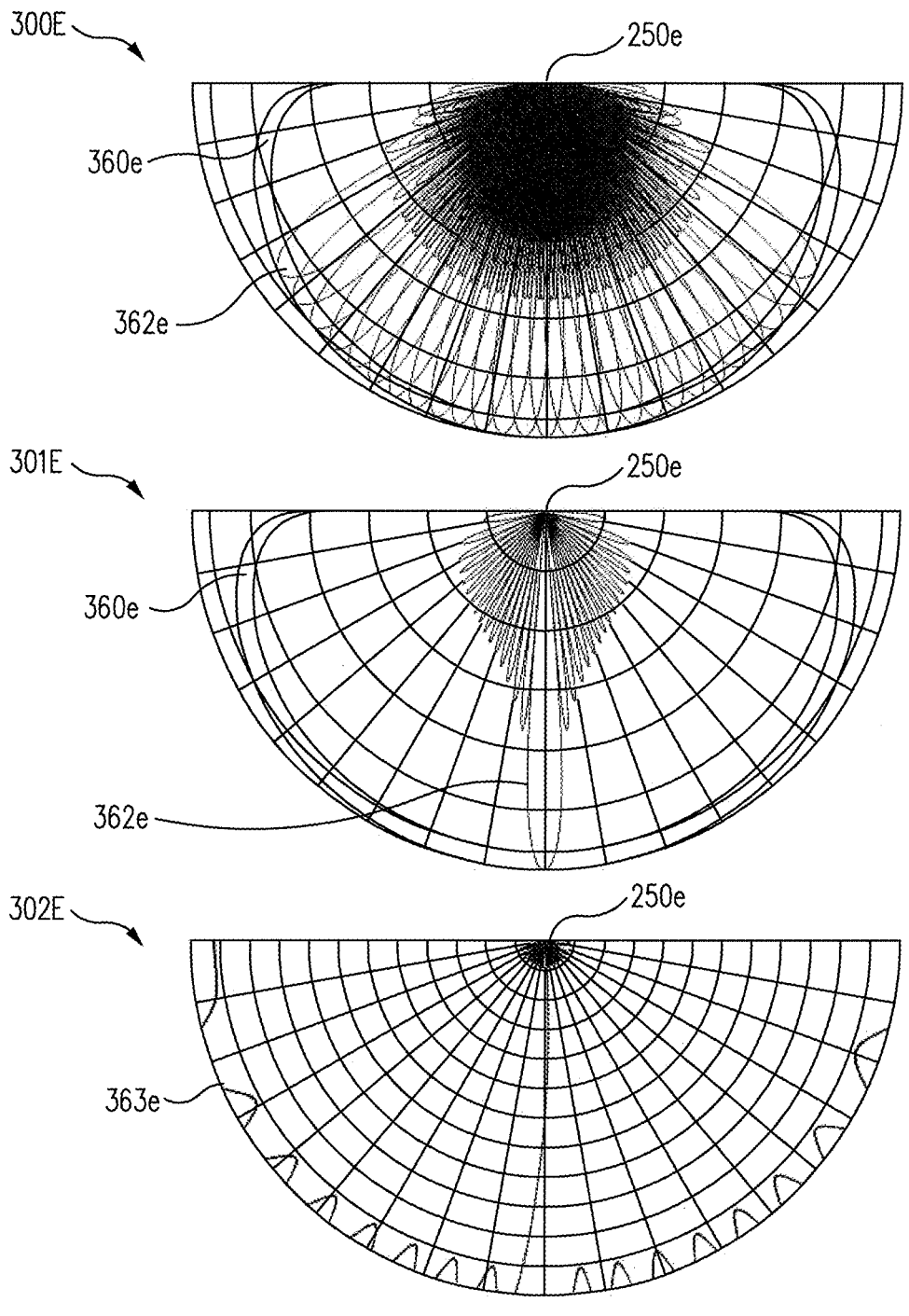
FIG. 3E illustrates various sonar beams produced by multichannel sonar systems in accordance with embodiments of the disclosure.

FIG. 3E illustrates various sonar beams produced by multichannel sonar systems (e.g., multichannel transducer 250) in accordance with embodiments of the disclosure. In each of graphs 300E, 301E, and 302E, position 250*e* indicates a spatial location of a center channel of multichannel transducer 250 relative to the corresponding graph elements, with constituent linear elements longitudinally aligned to extend perpendicularly into and/or out of the page. For example, graph 300E shows transmission beam 360e and return beams 362e corresponding to transmission channel 260 and receive channels 262 of multichannel transducer 250, similar to the arrangement shown in FIG. 3A, with a total of 32 channels and processed to form 27 return beams, as described herein.

As shown in graph 300E, transmission beam 360e is a fan-shaped beam extending laterally with respect to an orientation of transmission channel 260. Each of return beams 362e are sonar return beams formed radially between maximum operating angles within transmission beam 360e by beamforming and/or interferometry processing applied to acoustic returns received by one or more receive channels 262 of multichannel transducer 250. For example, pairs of acoustic returns from corresponding pairs of adjacent receive channels 262 may be processed (e.g., by co-controller 222) to form corresponding return beams for each pair, where each return beam may be characterized by an orientation, shape, and/or one or more beam widths. In some embodiments, three or more receive channels may be used to form each return beam. In various embodiments, return beams 362e (as shown in graph 300E) indicate the spatial equivalents of the programmatically formed beams, and co-controller 222 may be configured to form return beams 362e to be narrower and/or oriented differently from the acoustic returns corresponding to a receive channel acting alone (e.g., which would typically have relatively wide fan-shaped patterns similar in dimension, shape, and orientation to transmission beam 360e). As shown, in some embodiments, such beamforming and/or interferometry processing can be configured to produce relatively narrow multiple return beams 362 with a range of orientations, which can be used to generate higher resolution and higher quality sonar imagery relative to conventional sonar systems, as described herein.

Graph 301E includes a single sonar return beam 362e, which may be formed by processing acoustic returns received by two or more receive channels 262 of multichannel transducer 250, for example. Graph 310E illustrates the effective spatial sensitivity of return beam 362e relative to a position and orientation of multichannel transducer 250. Graph 302E includes inter-beam angle conversion basis 363e, which may be used to determine accurate signal amplitudes and corresponding relative angles for signal detail received by return beam 362e shown in graph 301E and one or more other return beams 362 shown in graph 300E. For example, a signal detail may include a signal spike associated with an object in a water column, and that signal spike may be recognizable in acoustic returns provided by multiple receive channels, but be offset in time due to different signal path lengths. After the acoustic returns are converted into sonar return beams, inter-beam angle conversion basis 363e may be used to resolve the position of the object from the signal spikes as reproduced in return beams 362e. With one or more such inter-beam conversion bases, acoustic returns received by multiple channels and/or return beams can be more accurately localized to a specific orientation and/or position relative to multichannel transducer 250.

Figure 4A:
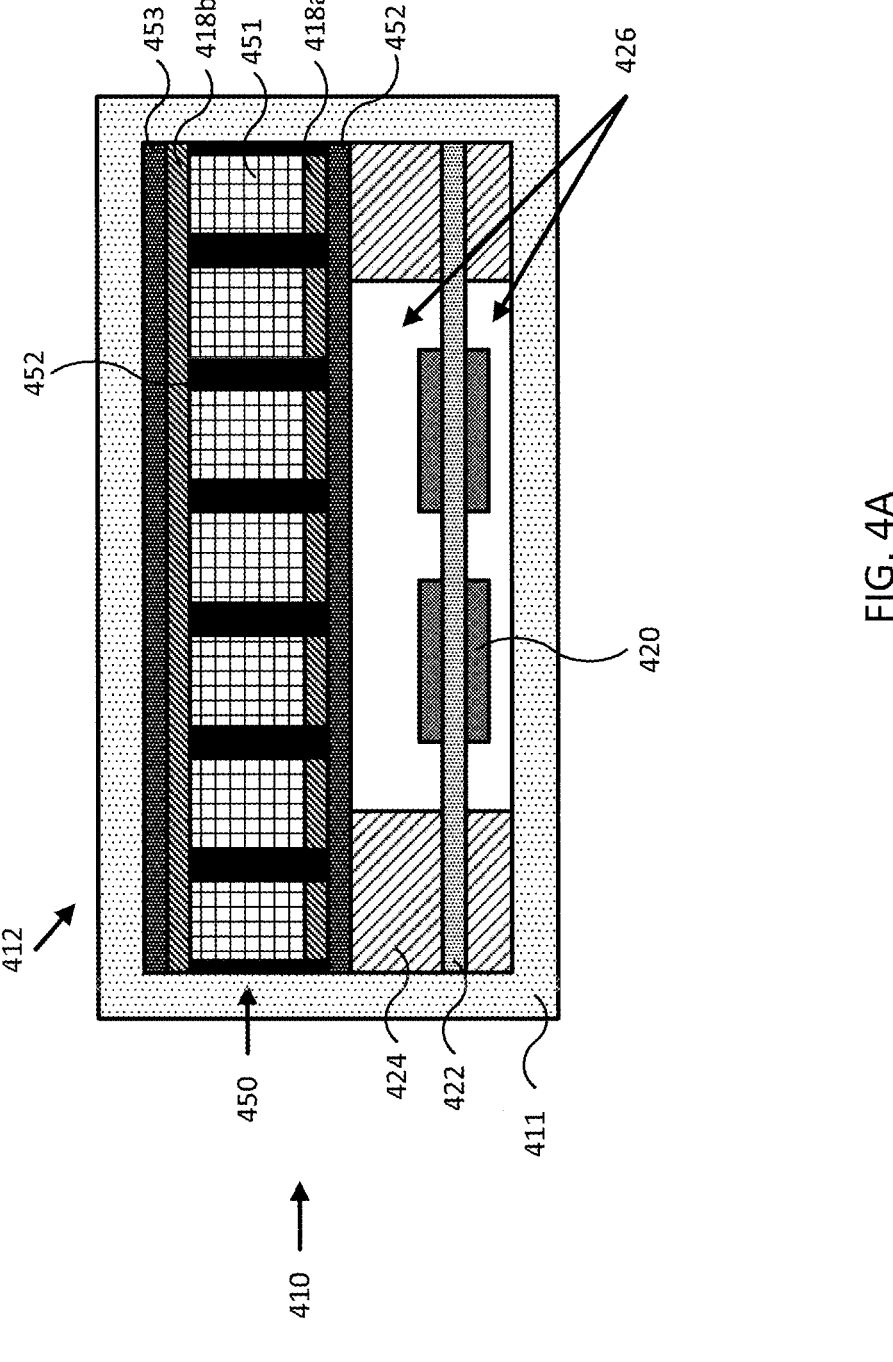
FIG. 4A illustrates a diagram of a cross section of a multichannel sonar system in accordance with an embodiment of the disclosure.

FIG. 4A illustrates a cross section 400 of a transducer assembly 410 (e.g., similar to transducer assembly 210 of FIG. 3A) in accordance with an embodiment of the disclosure. In the embodiment shown in FIG. 4A, transducer assembly 410 includes multichannel transducer 450 configured to emit acoustic beams and receive acoustic returns through surface 412 of housing 411. Integral electronics 420 are configured to control operation of transducer assembly 410 and are electrically coupled to multichannel transducer 450 through traces 418a and foil 418b, which may be routed, at least in part, through or around acoustic backing layer 452, and through cavities 426, spacers 424, and/or substrate 422. Substrate 422 may be configured to provide structural support for and/or electrical coupling between various elements of integral electronics 420, for example, and, in some embodiments, may be configured to provide thermal sinking for integral electronics 420 to and/or through housing 411. Spacers 424 may be configured to provide structural support for various elements of transducer assembly 410, including substrate 422, integral electronics 420, and/or multichannel transducer 450 for example, and may be configured to help provide mechanical isolation of integral electronics 420 from multichannel transducer 450. In some embodiments, cavities 426 may be filled with a material configured to enhance thermal sinking of integral electronics 420, to increase mechanical isolation of integral electronics 420, and/or to minimize thermal stress within housing 411 caused by thermal cycling of transducer assembly 410, for example.

As shown, multichannel transducer 450 may include multiple transducer elements 451 substantially electrically and/or mechanically isolated from each other and/or a side of housing 411 by spacers 452. In some embodiments, one or more of spacers 452 may be implemented substantially as cavities. Each transducer element 451 may be individually and/or collectively electrically coupled (e.g., soldered, clamped, conductively glued, and/or otherwise electrically coupled) to traces 418a and foil 418b and thereby to integral electronics 420. In some embodiments, multichannel transducer 450 may include acoustic matching layer 453 disposed adjacent to emission surface 412, which may be configured to broaden an operational bandwidth of multichannel transducer 450.

In some embodiments, transducer assembly 410 may include additional transducers and/or more than one multichannel transducer, for example, and may be arranged differently from the arrangement shown in FIG. 4A. In various embodiments, multichannel transducer 450 may include a different number of transducer elements 451 than shown in FIG. 4A. Each of transducer elements 451 may be implemented as one or more substantially linear and/or conical transducer elements, for example, and be made of a ceramic material, a metal or alloy material, a piezoelectric material, a combination of insulating and conductive materials, and/or other single or multi-layered transducing materials that can be energized by an electrical signal to produce an acoustic beam and/or that can produce electrical signals in response to acoustic returns (e.g., received through emission surface 412).

In one embodiment, one or more of transducer elements 451 may be implemented from polarized polyvinylidene difluoride (PVDF) and/or other thermoplastic polymers. In such embodiment, all transducer elements 451 may be manufactured from a single sheet of the material by forming electrodes into the required shapes and patterns for each transducer element. Such shapes can be rectangular, circular, and/or other patterns, and/or can be formed into shapes or patterns designed to reduce side lobe levels. Once formed, the shaped electrodes may be cut from the sheet and assembled to form transducer elements 451, traces 418a, and/or foil 418b of multichannel transducer 450, for example, or the entire sheet may be used to form transducer elements 451, traces 418a, foil 418b, and/or spacers 452, where spacers 452 may be implemented by portions of the material without electrodes.

Figure 4B:
FIGS. 4B-C illustrate diagrams of sonar transducers and corresponding beams for use in a multichannel sonar system in accordance with embodiments of the disclosure.
Figure 4B:
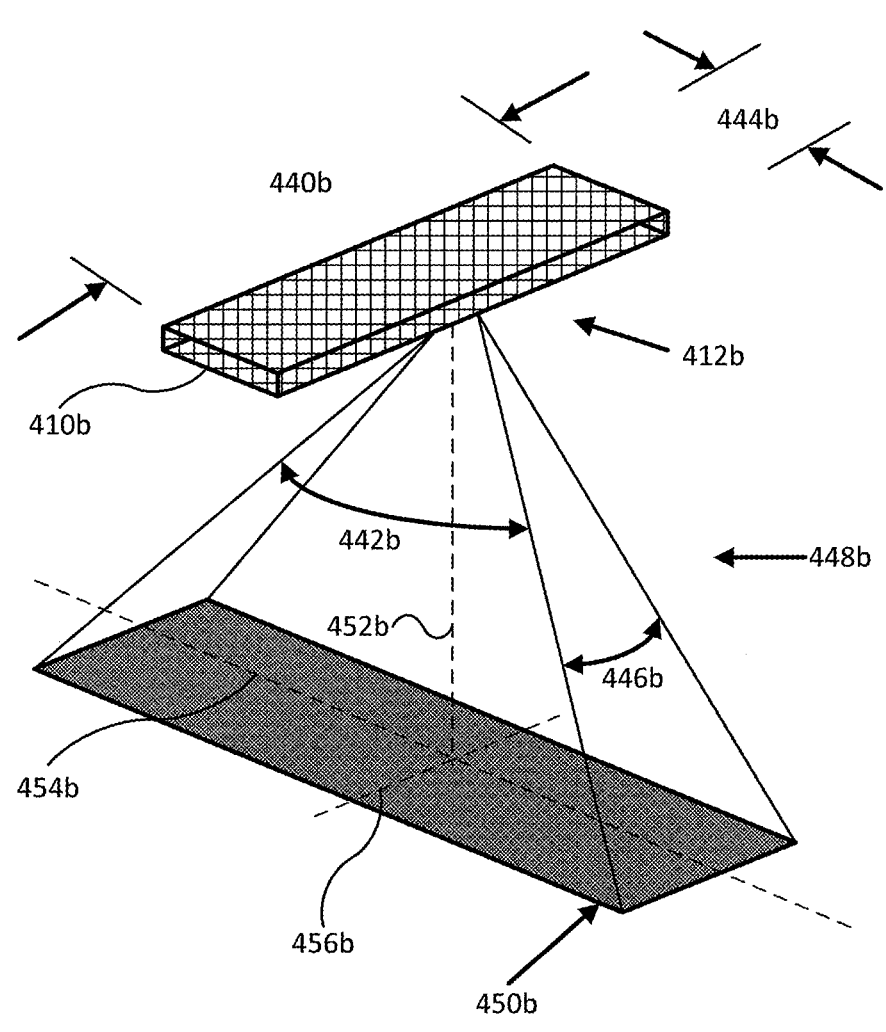
Figure 4C:
Figure 4C:
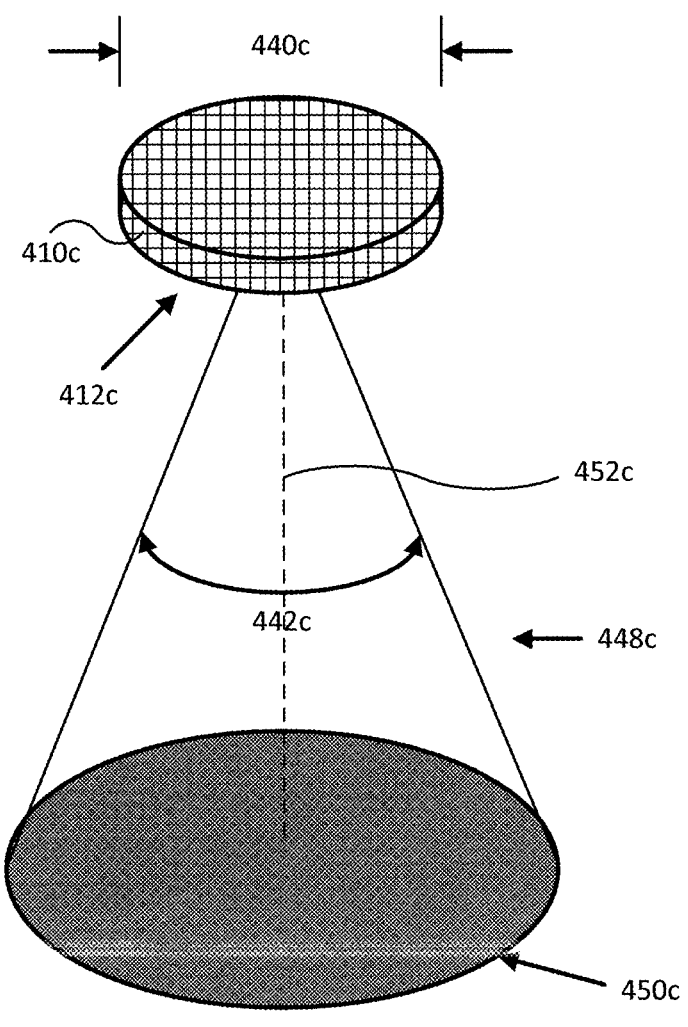

FIGS. 4B-4C illustrate diagrams 400B and 400C of various transducer elements and their corresponding acoustic beams in accordance with embodiments of the disclosure. FIG. 4B shows linear transducer element 410b producing a fan shaped acoustic beam 448b from emission surface 412b having footprint 450b, where linear transducer element 410b and emission surface 412b may correspond to transducer element 451 and emission surface 412 of transducer assembly 410. The overall dimensions and shape of fan shaped acoustic beam 448b roughly correspond to the radiation pattern produced by linear transducer element 410b as referenced to half power (−3 dB) beamwidth limits of the pattern, as is known in the art. For example, longitudinal length 440b (L1) of transducer element 410b may be roughly related to the lateral beamwidth 446b (B1) by: B1~50*λ/L1, and lateral length 444b (L2) of transducer element 410b may be roughly related to the longitudinal beamwidth 442b (B2) by: B2~50*λ/L2, where λ is the wavelength of the signal used to excite transducer element 410b. Also shown are center axis 452b and orthogonal axes 454b and 456b, which may be used as references to define an orientation and/or aiming angles of transducer element 410b and/or footprint 450b, such as a depression/emission angle and/or a roll, pitch, and/or yaw of transducer element 410b and/or acoustic beam 448b. Acoustic returns received by transducer element 410b exhibit a spatial pattern similar to that of the acoustic beam shown in FIG. 4B.

FIG. 4C shows circular transducer element 410C producing a conical acoustic beam 448c from emission surface 412c having footprint 450c, where circular transducer element 410c and emission surface 412c may correspond to transducer element 451 (e.g., and/or transducer 363 of FIG. 3B) and emission surface 412 of transducer assembly 410. The overall dimensions and shape of conical acoustic beam 448c roughly correspond to the radiation pattern produced by circular transducer element 410c as referenced to half power (−3 dB) beamwidth limits of the pattern, as is known in the art. For example, diameter 440c (D1) of transducer element 410c may be roughly related to the beamwidth 442c (B1) by: B1~65*λ/D1, where λ is the wavelength of the signal used to energize transducer element 410c. Also shown is center axis 452c, which may be used as a reference to define an orientation and/or aiming/emission angle of transducer element 410c and/or footprint 450c, such as a depression angle and/or a roll and/or pitch of transducer element 410c and/or acoustic beam 448c.

In some embodiments, linear transducer element 410b and/or circular transducer element 410c may be implemented as a transducer element assembly, for example, including multiple individual transducer elements coupled together electrically and/or physically to act as a single transducer element. For instance, in one embodiment, linear transducer element 410b may be implemented as multiple rectangular, circular, and/or otherwise shaped elements soldered together and arranged in a shape roughly corresponding to the shape of linear transducer element 410b, so as to collectively produce fan shaped acoustic beam 448b. In another embodiment, circular transducer element 410c may be implemented as multiple circular, rectangular, and/or otherwise shaped elements soldered together and arranged in an overall shape roughly corresponding to the circular shape of circular transducer element 410c, so as to collectively produce conical acoustic beam 448c. In such embodiments, interstitial spaces between elements may be filled with a material to help secure the elements to each other and form a transducer element assembly. In one embodiment, the interstitial material may be similar the material used for acoustic matching layer 453.

In various embodiments, the orientation and/or aiming angles, the longitudinal beamwidth 442b, lateral beamwidth 446b, and/or beamwidth 442c may be selected (e.g., by adjusting the orientation and/or angles, by selecting a shape and/or size of linear transducer element 410b and/or circular transducer 410c, and/or by adjusting the excitation wavelength) to emphasize detail (e.g., narrower acoustic beams and/or smaller excitation wavelengths) in a particular direction, to emphasize breadth of coverage (e.g., broader acoustic beams and/or larger excitation wavelengths) in a particular direction, and/or to emphasize penetration distance (e.g., narrower acoustic beams and/or larger excitation wavelengths), for example, among other sonar system characteristics. Embodiments of the present disclosure provide the ability to adjust such characteristics according to the local environment (e.g., shallow water, deep sea, approach to a shallow submerged object, tracking of a deep school of fish), according to an operational state of a coupled mobile structure (e.g., narrow, forward looking, and quickly updated depth measurements while at speed, broad side and down looking and/or target searching while at rest searching for fish), and/or according to other orientation, position, and/or operational characteristics of a coupled mobile structure.

Figure 5:
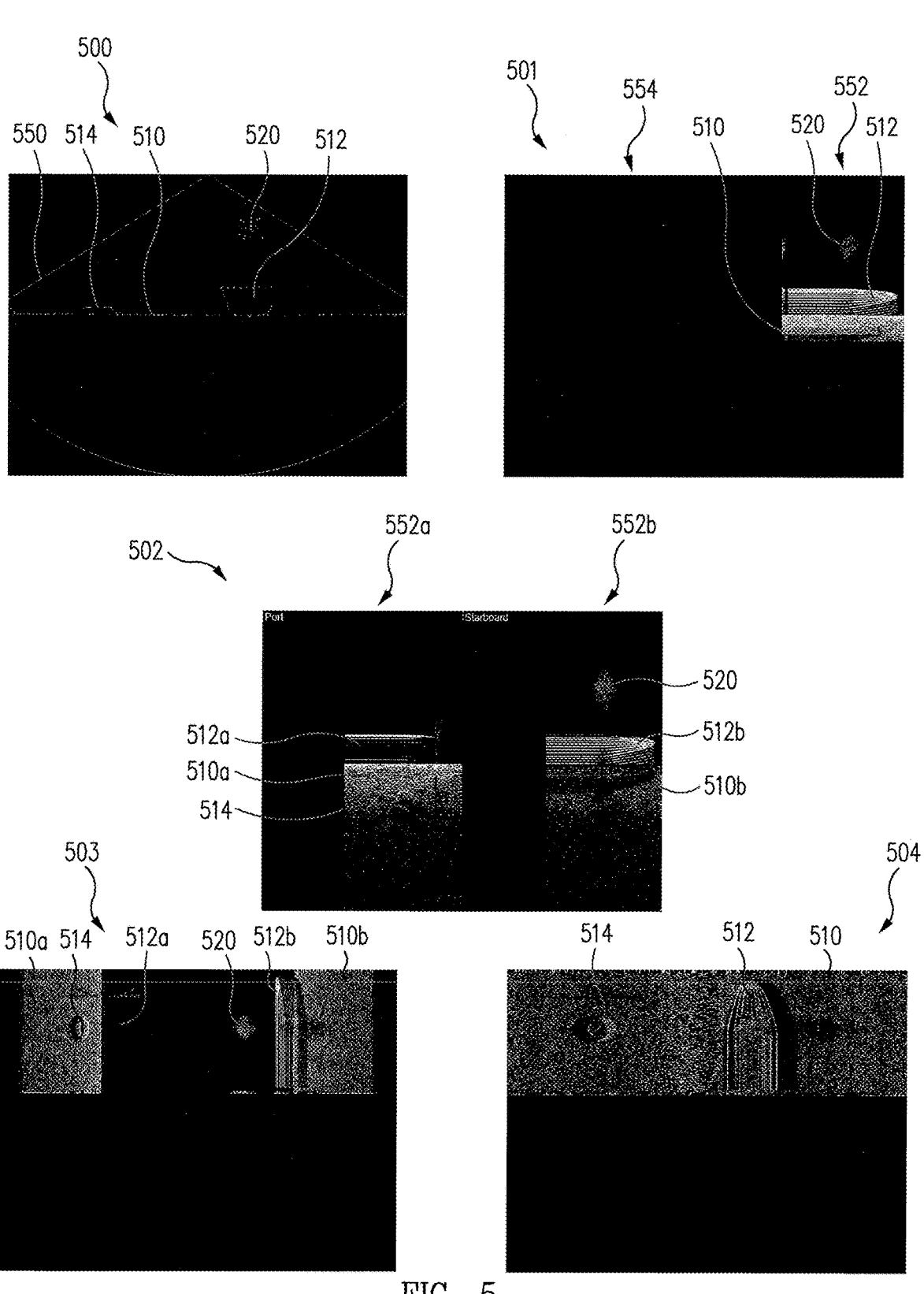
FIGS. 5-7 illustrate various display views of sonar data provided by a multichannel sonar system in accordance with embodiments of the disclosure.
Figure 6:
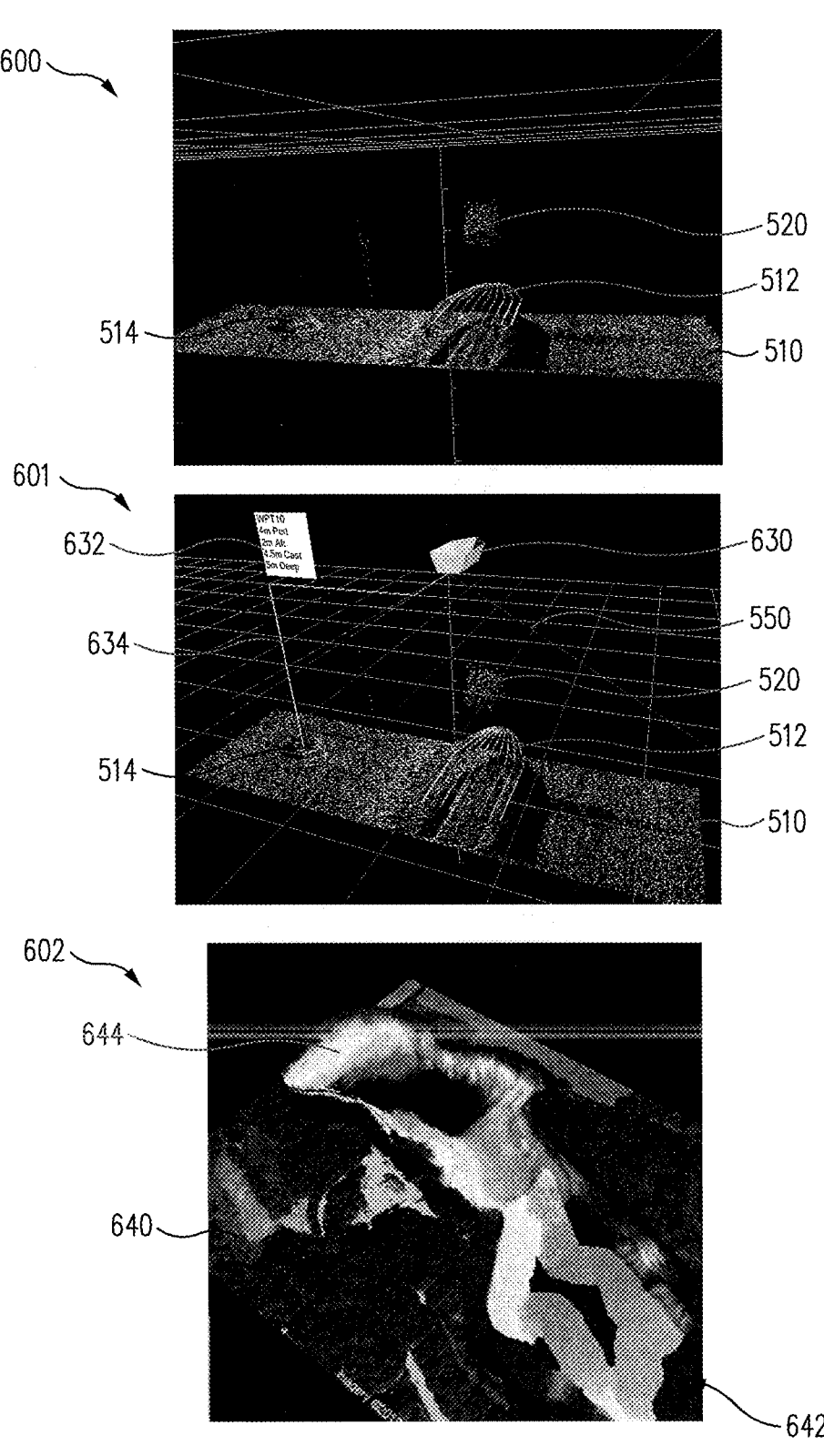
Figure 7:
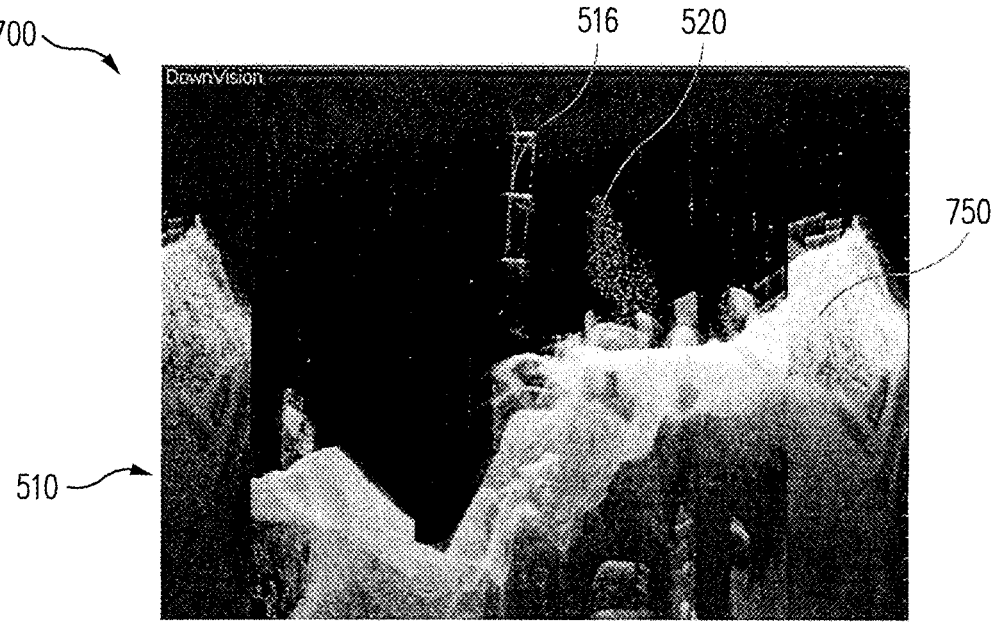
Figure 7:
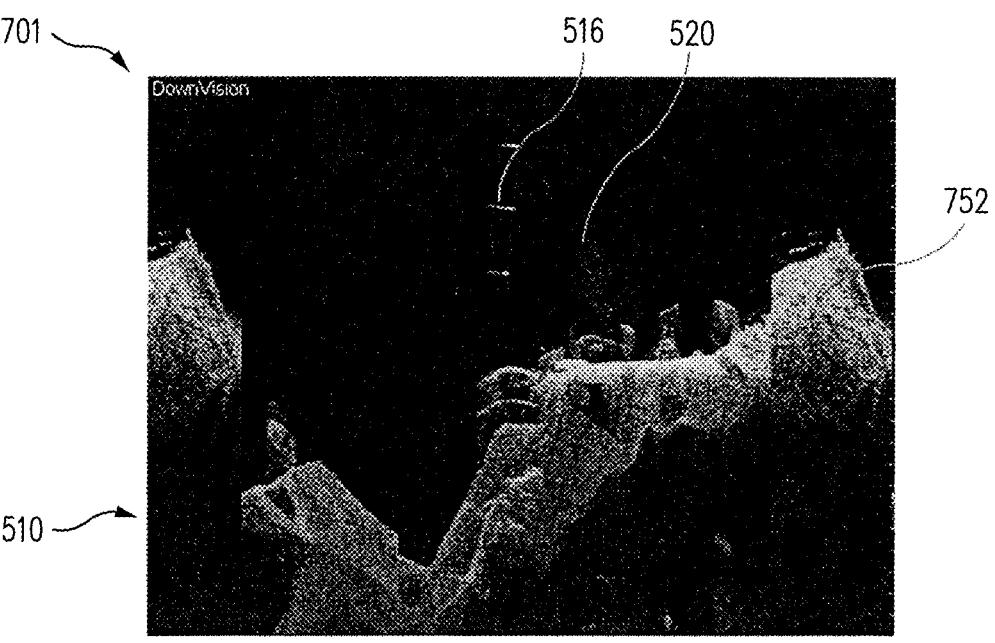

FIGS. 5-7 illustrate various display views of sonar data provided by a multichannel sonar system in accordance with embodiments of the disclosure. For example, display view 500 of FIG. 5 illustrates an instantaneous side view of a water column and bed ensonified by multichannel transducer 250 and/or transducer assembly 210. As shown, display view 500 includes imagery depicting bed 510, sunken boat 512, tire 514, and school of fish 520, combined with a graphic 550 indicating an outline of a transmission beam/return beam area for multichannel transducer 250. Importantly, display view 500 illustrates how embodiments of multichannel transducer 250 may be used to produce sonar data and/or imagery instantaneously indicating water column and bed characteristics that are differentiated both by their depth and their relative port or starboard position without a central missing trough. Additionally, display view 500 illustrates how embodiments of multichannel transducer 250 may be used to produce sonar imagery of relatively broad areas instantaneously and be detailed enough to detect tire 514 and/or school of fish 520 (e.g., relatively small objects).

In some embodiments, embodiments of the disclosed multichannel sonar system (e.g., system 100B of FIG. 1B and/or transducer assembly 210 of FIG. 2A) may be configured to detect an orientation and/or position of mobile structure 101 and/or multichannel transducer 250 and adjust an orientation and/or position of multichannel transducer 250 and/or adjust processing of acoustic returns received by multichannel transducer 250 to substantially align the orientations and/or positions of multiple instantaneous views with each other and/or with a vertical down direction. For example, transducer assembly 210 may be configured to apply a translational and/or rotational coordinate frame transformation to sonar data and/or imagery to align multiple instantaneous views.

Display view 501 of FIG. 5 illustrates an aggregate side view of a water column and bed ensonified by multichannel transducer 250 and/or transducer assembly 210. As shown, display view 501 includes imagery depicting bed 510, sunken boat 512, and school of fish 520, including sampled and un-sampled time series 552 and 554. In some embodiments, display view 501 may be formed from multiple instances of display view 500 rotated 90 degrees about a vertical axis, and may include similar detail and breadth enhancements. For example, port and/or starboard image detail occupying the same position in a rotated display view 501 may be overlaid, blended, and/or otherwise combined in display view 501. In other embodiments, transducer assembly 210 may be configured to form display view 501 by using transmission channel 260 to produce a time series of acoustic beams and only a subset of receive channels 262 (e.g., between one and five channels) to receive a corresponding time series of acoustic returns, and then processing the acoustic returns to produce sampled time series 552, similar to operation of a conventional single channel transducer. In some embodiments, transducer assembly 210 may be configured to substantially align the orientations and/or positions of each sample within sampled time series 552 through physical adjustments and/or processing.

Display view 502 of FIG. 5 illustrates port and starboard differentiated aggregate side views of a water column and bed ensonified by multichannel transducer 250 and/or transducer assembly 210. As shown, display view 502 includes port and starboard sampled time series 552*a*-*b* depicting port and starboard perspectives of bed 510*a* and 510*b* and sunken boat 512*a* and 512*b*, and port view of tire 514 and starboard view of school of fish 520. In some embodiments, display view 502 may be formed from multiple instances of display view 500 differentiated into port and starboard portions and rotated 90 degrees about a vertical axis. In other embodiments, transducer assembly 210 may be configured to form display view 502 by using transmission channel 260 to produce a time series of acoustic beams and port and starboard subsets of receive channels 262 to receive corresponding time series of port and starboard acoustic returns, and then processing the port and starboard acoustic returns to produce port and starboard sampled time series 552*a*-*b*. In some embodiments, transducer assembly 210 may be configured to substantially align the orientations and/or positions of each sample within port and starboard sampled time series 552*a*-*b*.

In related embodiments, transducer assembly 210 may be configured to adjust an effective depression angle and/or range of angles defining the port and starboard perspectives using beamforming and/or interferometry processing, as described herein. For example, display view 502 may be characterized as port and starboard differentiated down perspectives. In some embodiments, transducer assembly 210 may be configured to adjust the effective depression angle and/or range of angles according to a measured depth of the water column, a speed of mobile structure 101, and/or other operational states of transducer assembly 210 and/or mobile structure 101.

Display view 503 of FIG. 5 illustrates port and starboard differentiated aggregate side views of a water column and bed ensonified by multichannel transducer 250 and/or transducer assembly 210, similar to but oriented differently from display view 502. In addition, display view 503 illustration an embodiment where transducer assembly 210 is configured to adjust the effective depression angle and/or range of angles defining the port and starboard perspectives such that display view 503 may be characterized as port and starboard differentiated side perspectives (e.g., similar to conventional side scan sonar).

As shown, display view 503 includes depicts port and starboard perspectives of bed 510*a* and 510*b* and sunken boat 512*a* and 512*b*, and port view of tire 514 and starboard view of school of fish 520. In some embodiments, display view 503 may be formed from multiple instances of display view 500 differentiated into port and starboard portions and rotated to produce display view 503. In other embodiments, transducer assembly 210 may be configured to form display view 503 by using transmission channel 260 to produce a time series of acoustic beams and port and starboard subsets of receive channels 262 to receive corresponding time series of port and starboard acoustic returns, and then processing the port and starboard acoustic returns to produce display view 503. In some embodiments, transducer assembly 210 may be configured to substantially align the orientations and/or positions of each sample derived from the port and starboard acoustic returns to form display view 503.

Display view 504 of FIG. 5 illustrates an aggregate vertical down view of a water column and bed ensonified by multichannel transducer 250 and/or transducer assembly 210. As shown, display view 504 includes imagery depicting bed 510, sunken boat 512, and tire 514. In some embodiments, display view 504 may be formed from multiple instances of display view 500 rotated 90 degrees about a horizontal axis. For example, different depth image detail occupying the same position in a rotated display view 504 may be overlaid, blended, and/or otherwise combined in display view 504. In other embodiments, transducer assembly 210 may be configured to form display view 504 by using transmission channel 260 to produce a time series of acoustic beams and receive channels 262 to receive a corresponding time series of acoustic returns, and then processing the acoustic returns to produce display view 504. In some embodiments, transducer assembly 210 may be configured to process the acoustic returns using inter-beam interpolation processing, for example, in addition to and/or alternatively to processing the acoustic returns using beamforming and/or interferometry processing. In some embodiments, transducer assembly 210 may be configured to substantially align the orientations of each sample derived from the acoustic returns to form display view 504 through physical adjustments and/or processing. Such processing may be used generally to improve image accuracy and/or aspect ratio, and therein overall image quality.

Display view 600 of FIG. 6 illustrates a three dimensional adjustable perspective view of a water column and bed ensonified by multichannel transducer 250 and/or transducer assembly 210. As shown, display view 600 includes imagery depicting bed 510, sunken boat 512, tire 514, and school of fish 520. In some embodiments, display view 600 may be formed from multiple instances of display view 500 arranged in a volumetric rendering and adjustably rotated to produce display view 600. For example, overlapping image detail in display view 600 may be overlaid, blended, and/or otherwise combined in display view 600. In other embodiments, transducer assembly 210 may be configured to form display view 600 by using transmission channel 260 to produce a time series of acoustic beams and receive channels 262 to receive a corresponding time series of acoustic returns, and then processing the acoustic returns to produce display view 600. In some embodiments, transducer assembly 210 may be configured to process the acoustic returns using inter-beam interpolation processing, for example, in addition to and/or alternatively to processing the acoustic returns using beamforming and/or interferometry processing. In some embodiments, transducer assembly 210 may be configured to substantially align the orientations of each sample derived from the acoustic returns to form display view 600 through physical adjustments and/or processing.

Such processing may be used generally to improve image accuracy and/or aspect ratio, and therein overall image quality.

Display view 601 of FIG. 6 illustrates a three dimensional adjustable perspective view of a water column and bed ensonified by multichannel transducer 250 and/or transducer assembly 210. As shown, display view 601 includes imagery depicting bed 510, sunken boat 512, tire 514, and school of fish 520, combined with graphic 550 indicating an outline of a transmission beam/return beam area for multichannel transducer 250, graphic 630 indicating a relative position and/or orientation of mobile structure 101, graphic 632 indicating waypoint information, and graphic 634 indicating an absolute and/or relative position of the waypoint. In various embodiments, display view 601 may be formed using the same or similar techniques as described with respect to display view 600. In addition, transducer assembly 210 may be configured to receive user input (e.g., provided to user interface 120) selecting a position, depth, and/or other characteristics for the waypoint. In some embodiments, transducer assembly 210 may be configured to estimate a range-to-cast from mobile structure 101 to position 634 and use graphic 632 to display the range-to-cast to a user. Such estimate may be based, at least in part, on an absolute and/or relative position of mobile structure 101, a speed of mobile structure 101, and/or other operational states of mobile structure 101. In various embodiments, a range-to-cast estimation may include multiple orthogonal distance estimations, for example, and/or a relative or absolute heading and radius estimation.

Display view 602 of FIG. 6 illustrates a three dimensional adjustable bathymetric view of portions of a water channel or bed ensonified by multichannel transducer 250 and/or transducer assembly 210. As shown, display view 602 includes chart 640 and graphics 644 configured to indicate variable depth along the sonar sweeps 642. In various embodiments, display view 602 may be formed by rendering chart 640, which may include various land features in addition to an outline of a body of water, and rendering point cloud graphics 644 corresponding to acoustic returns received by multichannel transducer 250 as it is moved across sonar sweeps 642. In some embodiments, graphics 644 may be configured to indicate variable depths through differentiated colors, transparency, and/or other types of differentiated graphics characteristics. Portions of a body of water not ensonified by multichannel transducer 250 and/or transducer assembly 210 may be left blank, for example, or may be assigned a color or other graphics characteristic configured to indicate a lack of bathymetric sonar data.

Display views 700 and 701 of FIG. 7 illustrate aggregate side views of a water column and bed ensonified by multichannel transducer 250 and/or transducer assembly 210, similar to display view 501 of FIG. 5. As shown, display views 700 and 701 include imagery depicting bed 510, net 516, and school of fish 520. In various embodiments, display view 700 may be formed using the same or similar techniques as described with respect to display view 501. In such embodiments, portion 750 of display view 700 may include overlaid, blended, or otherwise combined image data that partially or completely obscures port or starboard image detail that lie at the same depth. In some embodiments, transducer assembly 210 may be configured to provide additional image detail by forming display view 701, in which port and starboard data are differentiated graphically, such as through use of differentiated colors (e.g., red for port-side sonar data and green for starboard-side sonar data), as shown in portion 752 of display view 701.

In various embodiments, each of the display views illustrated in FIGS. 5-7 may be formed using the same transducer assembly 210 and/or multichannel transducer 250, for example, and/or approximately the same set of data processed differently by transducer assembly 210 according to user input, configuration parameters, and/or other operational states of transducer assembly 210. This contrasts with conventional sonar transducers which would typically require multiple individual transducer systems, relatively expensive and large transducer assemblies, and multiple processing systems to produce a similar set of perspectives but without the image quality made possible by embodiments of the present disclosure. Additionally, transducer assembly 210 may be configured to render and/or display (e.g. using user interface 120) multiple different display views side by side, for example, and display characteristics and/or arrangements in each of the display views depicted in FIGS. 5-7 may be used in any combination or sub-combination to form different display views with one or more of the described display characteristics and/or arrangements.

Figure 8:
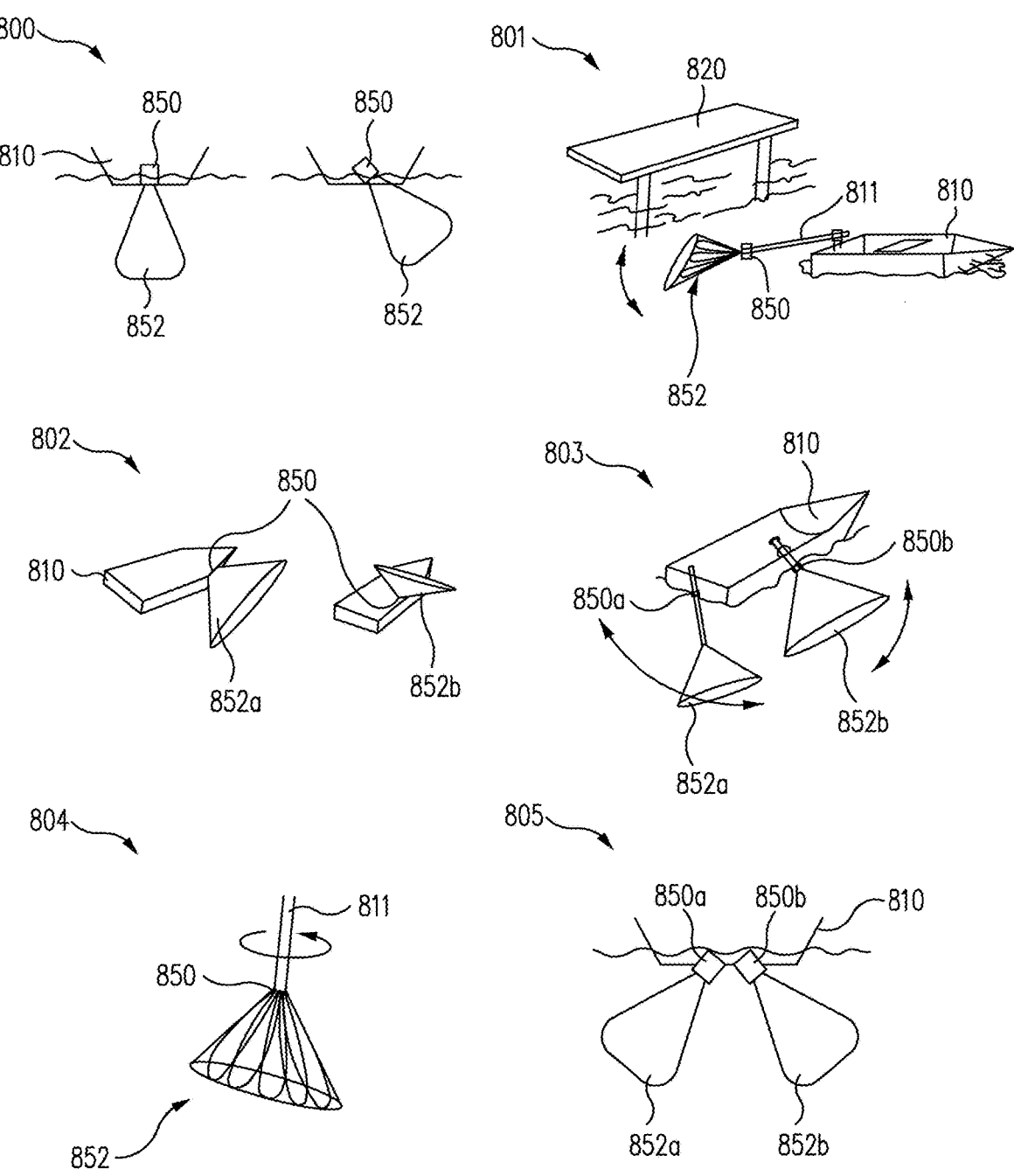
FIGS. 8-9 illustrate various configurations of multichannel sonar systems in accordance with embodiments of the disclosure.
Figure 9:
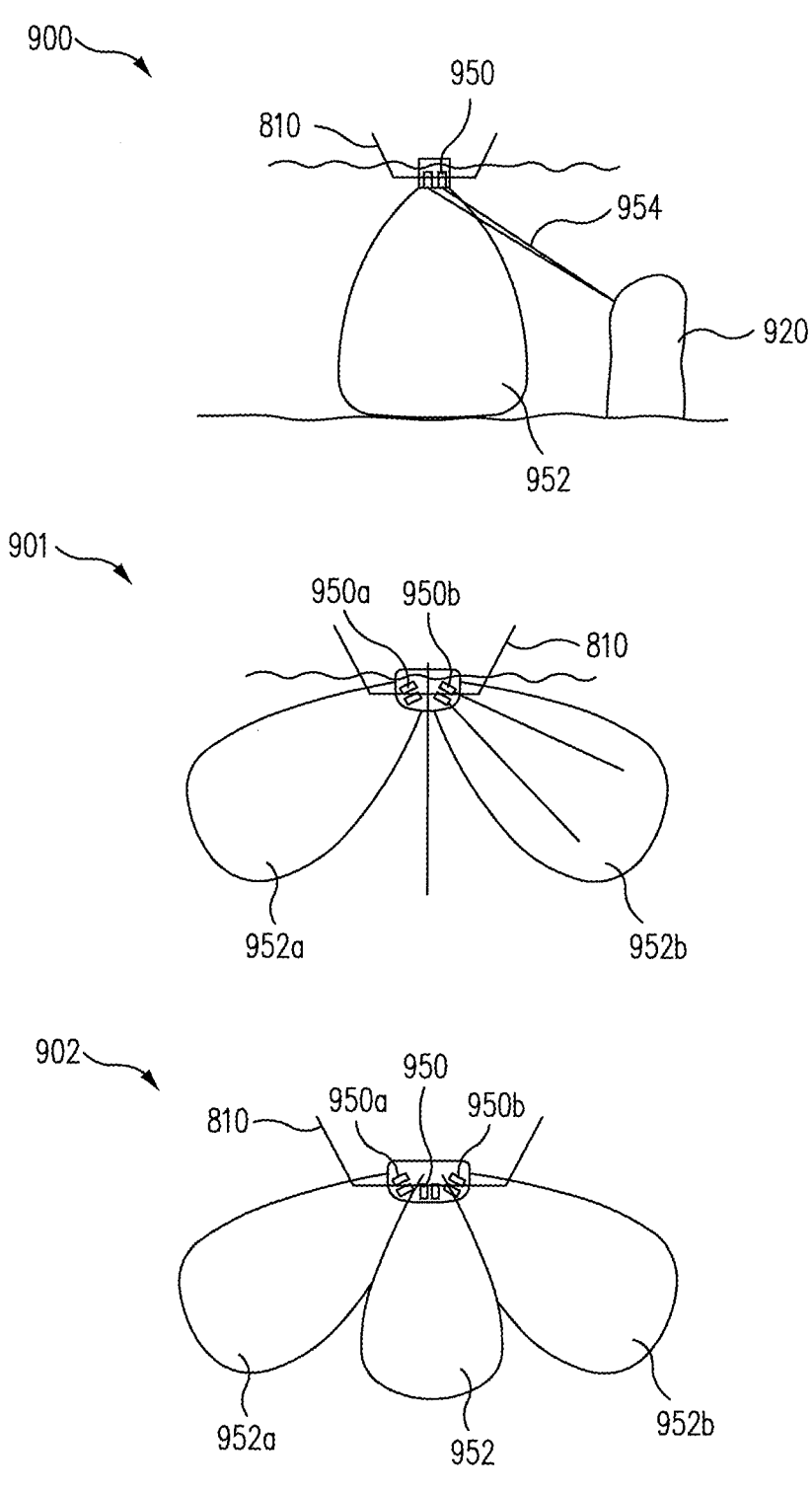

FIGS. 8-9 illustrate various configurations of multichannel sonar systems in accordance with embodiments of the disclosure. For example, diagram 800 shows ship 810, transducer assembly 850 (e.g., an embodiment of transducer assembly 210 including multichannel transducer 250), and acoustic beam 852 before and after rotation of transducer assembly 850 from a first downward fixed position to a second starboard fixed position. In some embodiments, transducer assembly 850 may be implemented with a bracket (e.g., transom bracket 311*b*) and/or actuators configured to provide adjustment of an orientation of transducer assembly 850, which may be used to rotate transducer assembly 850 about a longitudinal axis to extend ensonification to port or starboard, as shown. For example, one embodiment of transducer assembly 850 may be implemented with a 120 degree beamwidth that limits the extent of its ensonifications to approximately twice the depth to either side of ship 810. By rotating transducer assembly 850, transducer assembly 850 can be used with a bias to port or starboard in order to provide improved side scan imagery in a corresponding direction. In various embodiments, transducer assembly 850 may be configured to measure an orientation and/or position of transducer assembly 850 while operating, for example, and then use such sensor information to align corresponding samples with each other and/or with a down direction, as described herein.

Diagram 801 shows ship 810, transducer assembly 850 coupled to pole 811, and acoustic beam 852 used to ensonify portions of a water column and/or bed under dock 820. In some embodiments, transducer assembly 850 may be physically coupled to a pole or other type of manual or actuated probe configured to insert transducer assembly 850 into areas where ship 810 cannot easily reach, such as under dock 820 and/or within a submerged tree. Embodiments of the present disclosure make this possibly by providing a relatively compact transducer assembly and/or multichannel transducer. In various embodiments, transducer assembly 850 may be configured to measure an orientation and/or position of transducer assembly 850 while operating, for example, and then use such sensor information to align corresponding samples with each other and/or with a down or other relative or absolute direction to form various display views, including three dimensional display views, as described herein. In one embodiment, transducer assembly 850 may be configured to compare samples and/or images to each other and align the samples/images based on one or more common structures detected in the samples/images.

Diagram 802 shows ship 810, transducer assembly 850 coupled to a front of ship 810, and acoustic beams 852*a* (e.g., a longitudinally aligned acoustic beam) and 852*b* (a laterally aligned acoustic beam) that may be used to ensonify portions of a water column and/or bed under or near a front of ship 810. In some embodiments, transducer assembly 850 may be adjustably coupled to a hull of ship 810 near its bow so as to aid in navigation. In various embodiments, transducer assembly 850 may be configured to measure an orientation and/or position of transducer assembly 850 while operating, for example, and then use such sensor information to align corresponding samples with each other and/or with a down or other relative or absolute direction to form various display views, including three dimensional display views, as described herein. In one embodiment, transducer assembly 850 may be configured to receive a speed of ship 810 and adjust (e.g., using one or more actuators) a depression angle and/or an acoustic beam orientation of transducer assembly 850 (e.g., from acoustic beam 852*a* to 852*b*) to provide further forward imagery as the speed is increased.

Diagram 803 shows ship 810, transducer assembly 850*a* coupled to a transom of ship 810, transducer assembly 850*b* coupled to a starboard side of ship 810, and corresponding laterally aligned acoustic beam 852*a* and longitudinally aligned acoustic beam 852*b*. In some embodiments, transducer assembly 850*a* may be implemented with a bracket (e.g., transom bracket 311*b*), hinge, and/or actuators configured to provide adjustment of an orientation and/or position of transducer assembly 850*a*, which may be used to rotate transducer assembly 850*a* about a lateral axis to sweep acoustic beam 852*a* from the stern surface of the water to the bed, for example, and provide a substantially three dimensional stern view, among other display views described herein. Similarly, transducer assembly 850*b* may be implemented with a bracket, hinge, and/or actuators that may be used to rotate transducer assembly 850*b* about a longitudinal axis to sweep acoustic beam 852*b* from the starboard surface of the water to the bed, for example, and provide a three dimensional starboard view. In various embodiments, transducer assemblies 850*a-b* may be configured to measure their orientations and/or positions while operating and then use such sensor information to align corresponding samples with each other and/or with a down or other relative or absolute direction to form various high quality and aligned display views, including three dimensional display views, as described herein.

Diagram 804 shows transducer assembly 850 coupled to rotating pole 811 and corresponding acoustic beams 852. In some embodiments, transducer assembly 850 may be physically coupled to a pole or other type of manual or actuated probe configured to rotate transducer assembly 850 about a probe axis. In addition, transducer assembly 850 may be implemented with a bracket (e.g., transom bracket 311*b*), hinge, and/or actuators configured to provide adjustment of an orientation and/or position of transducer assembly 850 relative to an end of pole 811. Pole 811 may be used to rotate transducer assembly 850 about a corresponding probe axis to provide radar-like, periodically updated two and/or three dimensional views, for example, among other display views described herein. In various embodiments, transducer assembly 850 may be configured to measure an orientation and/or position of transducer assembly 850 while operating, for example, and then use such sensor information to align corresponding samples with each other and/or with a down or other relative or absolute direction to form various display views, including three dimensional display views, as described herein.

Diagram 805 shows port and starboard transducer assemblies 850*a* and 850*b* coupled to ship 810 and oriented to produce respective port and starboard acoustic beams 852*a* and 85*sb*. In some embodiments, transducer assemblies 850*a* and 850*b* may be oriented to ensonify a larger arc of water column and bed than a single transducer assembly, for example, and/or to provide display views with finer image detail than offered by a single transducer assembly. A multichannel sonar system including two or more transducer assemblies (e.g., transducer assemblies 850*a* and 850*b*) may be configured to time ensonifications of each assembly in a coordinated fashion, for example, to synchronize ensonifications (e.g., to reduce a risk of electrical interference) and/or to stagger or otherwise pattern (e.g., spatially and/or temporally)) ensonifications to reduce a risk of acoustic interference. Such timing may be implemented over an interface supported by cable 214 and/or controllers 220 and/or 222, for example In one embodiment, such timing may be implemented according to the IEEE 1588 Precision Timing Protocol. In various embodiments, transducer assemblies 850*a* and 850*b* may be configured to measure their orientations and/or positions while operating, for example, and then use such sensor information to align corresponding samples with each other and/or with a down or other relative or absolute direction to form various display views, including three dimensional display views, as described herein.

FIG. 9 illustrates various configurations of a limited (e.g., with two channels) multichannel embodiment of transducer assembly 210 and multichannel transducer 250. Such embodiments would not produce sonar imagery with as much of the detail provided by embodiments with additional channels, but such embodiments could be configured to provide rough angular information that is not available with conventional single channel sonar systems. For example, conventional single channel sonar systems produce sonar imagery that is a combination of acoustic returns from all sides of the ship/transducer, meaning a user would not know on which side an imaged target of interest lies. A transducer assembly implemented with a two channel multichannel transducer may be configured to use interferometry and/or time of arrival processing to discriminate targets closer to one channel than another, for example, and in some embodiments provide a user with an indication of the true range to the target from the ship. Such systems could be implemented inexpensively, as compared to alternative systems with many more channels, for example, and need not be configured to perform certain processing steps, such as beamforming processing.

For example, diagram 900 of FIG. 9 shows transducer assembly 950 (e.g., implemented with a two channel multichannel transducer) coupled to ship 810, target 920, acoustic beam 952, and differentiated return paths 954. As shown, return paths 954 from target 920 to transducer assembly 950 are slightly different for the two channels of transducer assembly 950, and transducer assembly 950 may be configured to detect that difference and determine a corresponding side (e.g. starboard) for samples including acoustic returns from target 920. In some embodiments, transducer assembly 950 may be configured to use one or both channels as combined transmission and receive channels, as described herein. In other embodiments, transducer assembly 950 may additionally include a separate transmission channel In further embodiments, a transducer assembly implemented with a many channel multichannel transducer may be configured to operate with only two channels, similar to transducer assembly 950. In various embodiments, transducer assembly 950 may be configured to measure its orientation and/or position and then use such sensor information to align corresponding samples with each other and/or with a down or other relative or absolute direction to form various display views, including three dimensional display views, as described herein.

Diagram 901 shows multiple transducer assemblies 950a and 950b (e.g., both implemented with a two channel multichannel transducer) coupled to ship 810, and corresponding acoustic beams 952a and 952b. Diagram 902 shows transducer assemblies 950, 950a, and 950b of diagrams 900 and 901 coupled to ship 810, and corresponding acoustic beams 950, 952a, and 952b. Diagrams 901 and 902 illustrate how multiple two channel transducer assemblies can be combined with a single mobile structure to provide port and starboard, or port, starboard, and down ensonifications and thereby increase the coverage of the associated water column and/or bed. In various embodiments, transducer assemblies 950, 950a, and/or 950b may be configured to measure their orientations and/or positions and then use such sensor information to align corresponding samples with each other and/or with a down or other relative or absolute direction to form various display views, including three dimensional display views, as described herein.

Figure 10A:
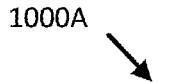
FIG. 10A illustrates a flow diagram of various operations to operate a multichannel sonar system in accordance with an embodiment of the disclosure.
Figure 10A:
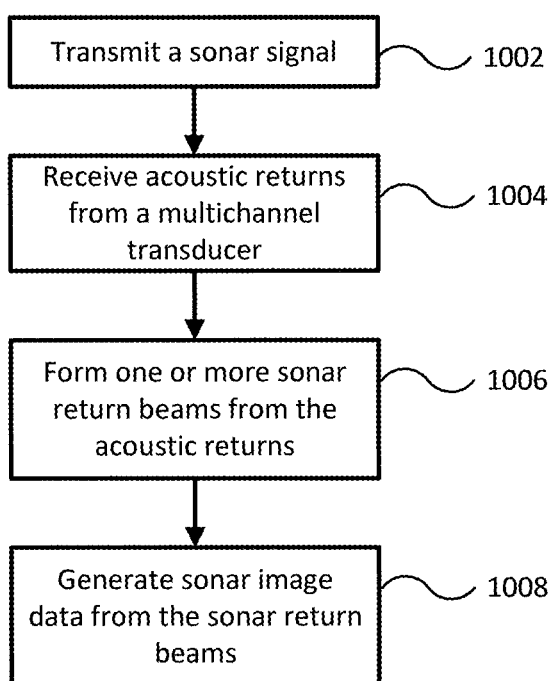

FIGS. 10A-B illustrate flow diagrams of respective processes 1000A and 1000B to provide sonar data and/or imagery for mobile structure 101 in accordance with embodiments of the disclosure. In some embodiments, the operations of FIGS. 10A-B may be implemented as software instructions executed by one or more logic devices associated with corresponding electronic devices, sensors, and/or structures depicted in FIGS. 1A through 4C. More generally, the operations of FIGS. 10A-B may be implemented with any combination of software instructions and/or electronic hardware (e.g., inductors, capacitors, amplifiers, actuators, or other analog and/or digital components).

It should be appreciated that any step, sub-step, sub-process, or block of processes 1000A and 1000B may be performed in an order or arrangement different from the embodiments illustrated by respective FIGS. 10A-B. For example, in other embodiments, one or more blocks may be omitted from the various processes, and blocks from one process may be included in another process. Furthermore, block inputs, block outputs, various sensor signals, sensor information, calibration parameters, and/or other operational parameters may be stored to one or more memories prior to moving to a following portion of a corresponding process. Although processes 1000A and 1000B are described with reference to systems 100, 100B, 200, 201, 300, 301, and/or 400 and FIGS. 1A-4C, processes 1000A and 1000B may be performed by other systems different from those systems and including a different selection of electronic devices, sensors, assemblies, mobile structures, and/or mobile structure attributes.

Process 1000A represents a method for providing sonar data and/or imagery for mobile structure 101 using systems 100, 100B, 200, 201, 300, 301, and/or 400 in accordance with embodiments of the disclosure. At the initiation of process 1000A, various system parameters may be populated by prior execution of a process similar to process 1000A, for example, or may be initialized to zero and/or one or more values corresponding to typical, stored, and/or learned values derived from past operation of process 1000A, as described herein.

In block 1002, a logic device transmits a sonar signal. For example, controller 220 and/or co-controller 222 of transducer assembly 210 may be configured to control transmitter 230 to provide a shaped or unshaped transmission signal to transmission channel 260 of multichannel transducer 250 and produce a corresponding acoustic beam. In some embodiments, controller 220 and/or co-controller 222 may be configured to control transceiver 234 to provide a shaped or unshaped transmission signal to transducer 264 and produce a corresponding acoustic beam. In various embodiments, transducer assembly 210 may be configured to use temperature sensor 266 and/or orientation/position sensor 240 to record corresponding measurements at substantially the same time. Notification of transmission and/or other sensor information may be relayed to other devices of system 100 through cable 214.

In block 1004, a logic device receives acoustic returns from a multichannel transducer. For example, controller 220 and/or co-controller 222 may be configured to control one or more of receivers 232 to receive acoustic returns from one or more of receive channels 262 of multichannel transducer 250, for example, and provide the received acoustic returns (e.g., in digital form) to co-controller 222. In other embodiments, controller 220 and/or co-controller 222 may be configured to control transceiver 234 to receive acoustic returns from transducer 264 and provide the received acoustic returns (e.g., in digital form) to co-controller 222. In some embodiments, receivers 232 and/or transceiver 234 may be configured to convey the acoustic returns to co-controller 222 over a baseband channel In other embodiments, receivers 232, transceiver 234, and/or co-controller 222 may be configured to decimate the acoustic returns before performing further processing. In various embodiments, transducer assembly 210 may be configured to use temperature sensor 266 and/or orientation/position sensor 240 to record corresponding measurements at substantially the same time. Notification of reception and/or other sensor information may be relayed to other devices of system 100 through cable 214.

In block 1006, a logic device forms one or more sonar return beams from the acoustic returns. For example, controller 220 and/or co-controller 222 may be configured to perform beamforming, interferometry, and/or inter-beam interpolation processing on the acoustic returns received in block 1004 to form the one or more sonar return beams. In some embodiments, such processing may be performed on acoustic returns grouped from two, three, or more receive channels, for example, depending on the desired number of beams, the desired range of beam orientations, and/or other system configuration parameters. In various embodiments, controller 220 and/or co-controller 222 may be configured to determine an inter-beam angle conversion basis for each sonar return beam, which may be used to determine accurate return beam signal amplitudes as a function of the angle for each sonar return beam, as described herein. In some embodiments, controller 220 and/or co-controller 222 may be configured to decimate, scale, filter, and/or otherwise process or post-process the sonar return beams before storing the amplitudes, inter-beam angles, and/or other characteristics of the sonar return beams (e.g., for each sample) and proceeding to block 1008. Notification of processing and/or other sensor information may be relayed to other devices of system 100 through cable 214.

In block 1008, a logic device generates sonar image data from the sonar return beams. For example, controller 220 and/or co-controller 222 may be configured to process the individual sonar return beams (e.g., according to their corresponding orientation angles and/or signal amplitudes) into depth (e.g., time from transmission to reception), position (e.g., orientation angle for the sonar return beam), and/or intensity (e.g., signal amplitude) sonar data, for each sample. Controller 220 and/or co-controller 222 may be configured to convert such sonar data and/or samples into two dimensional and/or three dimensional sonar imagery and/or display views, as described herein. In some embodiments, controller 220 and/or co-controller 222 may be configured to use corresponding recorded temperature, orientation, and/or position measurements to align acoustic returns, samples, sonar data, and/or imagery with each other and/or one or more directions, such as down. Sonar data, imagery, display views, and/or other sensor information may be relayed to other devices of system 100 (e.g., user interface 120) through cable 214. In some embodiments, transducer assembly 210 may be configured to display sonar data, imagery, display views, and/or other sensor information to a user through use of user interface 120, for example, such as receiving user selection of a desired display view and then relaying corresponding sonar data and/or imagery to user interface 120.

It is contemplated that any one or combination of methods to provide sonar data and/or imagery may be performed according to one or more operating contexts of a control loop, for example, such as a startup, learning, running, and/or other type operating context. For example, process 1000A may proceed back to block 1002 and proceed through process 1000A again to produce updated sonar data and/or imagery, as in a control loop.

Process 1000B represents a method for providing sonar data and/or imagery for mobile structure 101 using systems 100, 100B, 200, 201, 300, 301, and/or 400 in accordance with embodiments of the disclosure. At the initiation of process 1000B, various system parameters may be populated by prior execution of a process similar to process 1000B, for example, or may be initialized to zero and/or one or more values corresponding to typical, stored, and/or learned values derived from past operation of process 1000B, as described herein.

In block 1010, a logic device receives sonar image data from a multichannel sonar system. For example, controller 220 of transducer assembly 210 may be configured to receive sonar image data generated by co-controller 222 in communication with multichannel transducer 250, similar to the process described in block 1008 of process 1000A. In various embodiments, controller 220 may be configured to receive an orientation and/or position of transducer assembly 210 with the sonar image data.

In block 1012, a logic device receives an updated orientation and/or position of a multichannel transducer system. For example controller 220 may be configured to receive an absolute and/or relative orientation (e.g., roll, pitch, and/or yaw) and/or position from an orientation/position sensor integrated with transducer assembly 210 (e.g., orientation/position sensor 240), bracket 311b, and/or assembly bracket/actuator 116. In various embodiments, the measured transducer orientation may be derived from one or more absolute and/or relative orientation measurements made by orientation sensors, actuators, stepper motors, and/or other devices coupled to mobile structure 101. In some embodiments, the updated measurements may be received substantially synchronously with processing of block 1014.

In block 1014, a logic device receives updated sonar image data from a multichannel sonar system. For example controller 220 may be configured to receive updated sonar image data generated by co-controller 222 in communication with multichannel transducer 250 at a subsequent time relative to processing of block 1010. In various embodiments, the updated sonar image data may be generated using a process similar to process 1000A.

In block 1016, a logic device combines sonar image data and updated sonar image data based on an updated orientation and/or position. For example controller 220 may be configured to combine the sonar image data received in block 1010 with the updated sonar image data received in block 1014 based on the updated orientation and/or position measurements received in block 1012. In various embodiments, controller 220 may be configured to user the sensor measurements to align the sonar image data with the updated sonar image data and/or align both to a particular direction (e.g., down) accurately, as described herein. In some embodiments, controller 220 may be configured to align the sonar image data using common image detail. Resulting imagery may be two dimensional and/or three dimensional, as described herein.

In block 1018, a logic device displays the combined sonar image data. For example controller 220 may be configured to relay the combined image data to user interface 120 to display the combined image data to a user of mobile structure 101. In some embodiments, controller 220 may be configured to render one or multiple different display views of the combined image data, for example, and relay the display views and/or corresponding sonar image data to user interface 120.

It is contemplated that any one or combination of methods to provide sonar data and/or imagery may be performed according to one or more operating contexts of a control loop, for example, such as a startup, learning, running, and/or other type operating context. For example, process 1000B may proceed back to block 1010 and proceed through process 1000B again to produce updated sonar data and/or imagery, as in a control loop.

FIGS. 11-20 illustrate diagrams of various active mills cross arrangements with two-plane interpolation in accordance with embodiments of the disclosure. Passive mills cross arrangements, such as a mills cross telescope, generally consists of a pair of receivers, configured as line arrays, which are positioned in orthogonal directions. Passive arrangements of the pair of receiver arrays are limited to only receiving signals that are emitted from objects. As described with reference to FIGS. 11-20, however, active mills cross arrangements or systems include a transmitter for emitting signals and at least one receiver arras to detect echo returns from objects or targets. Such arrangements are useful in ranging sensor systems, such as the multi-directional sonar system described above or other ranging systems (e.g., radar). As described more fully below, the active mills cross arrangements may interpolate the direction of arrival of the detected echo returns in multiple planes, thereby providing high resolution data in multiple dimensions (e.g., three dimensions).

Figure 11:
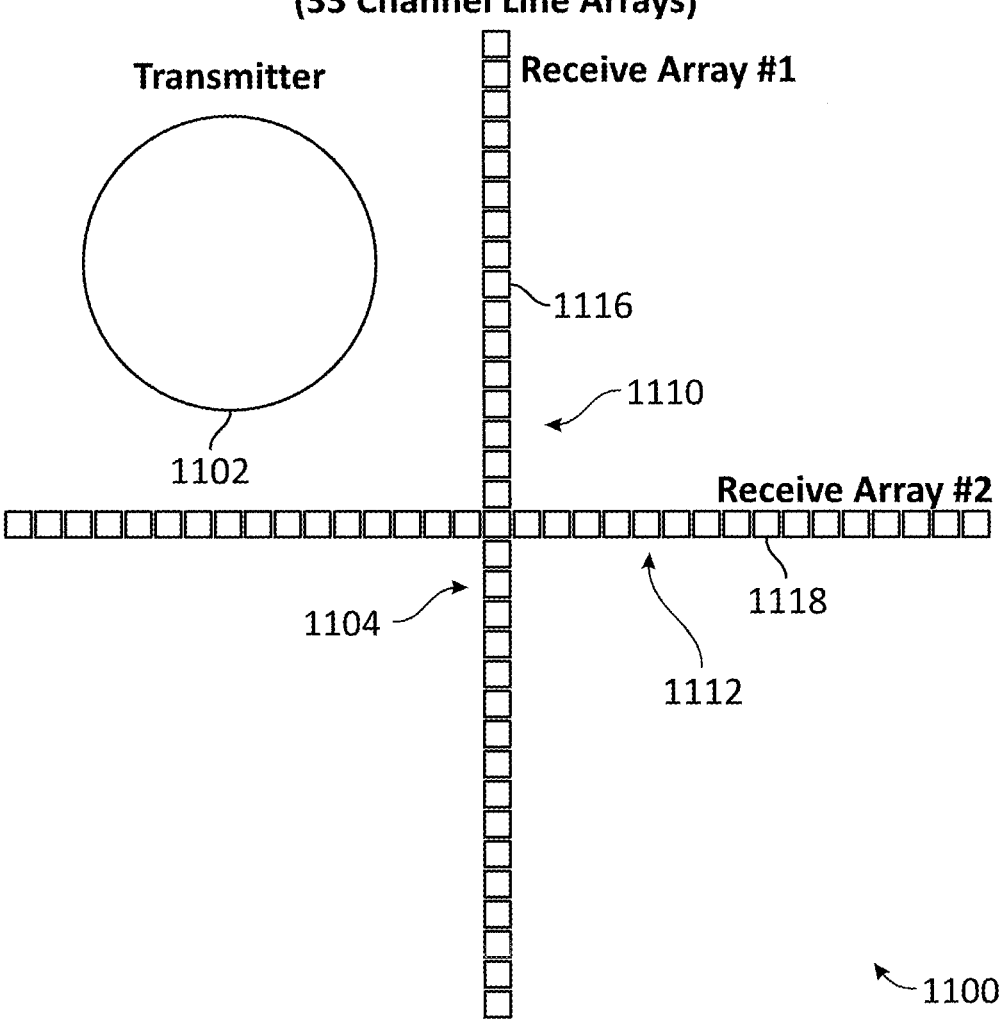
FIG. 11 illustrates a diagram of a first active mills cross arrangement with two-plane interpolation in accordance with an embodiment of the disclosure.
Figure 12:
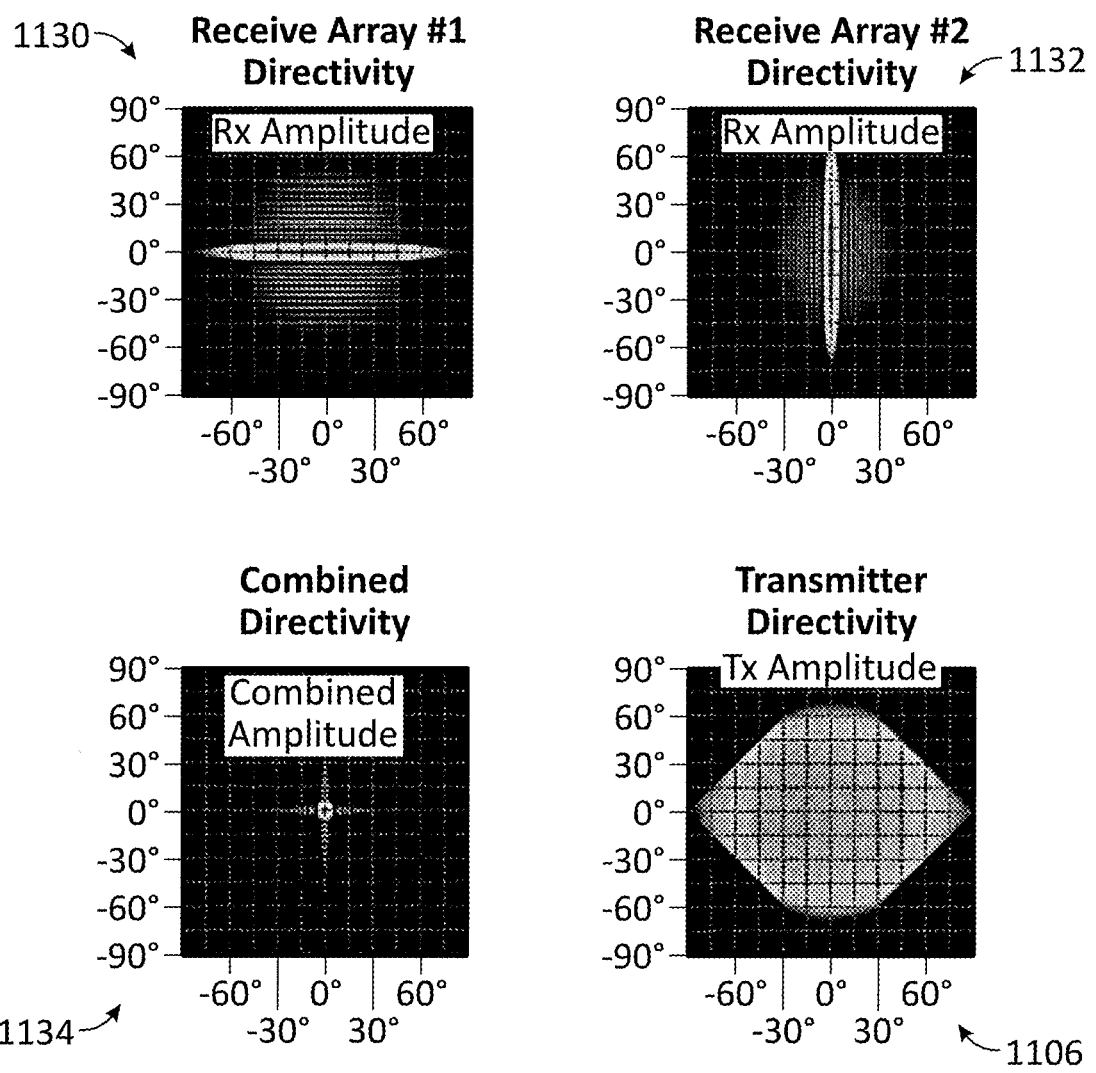
FIG. 12 illustrates diagrams of various unsteered response directivities of the first active mills cross arrangement of FIG. 11 in accordance with an embodiment of the disclosure.

FIG. 11 illustrates a diagram of a first active mills cross arrangement 1100 in accordance with an embodiment of the disclosure. FIG. 12 illustrates diagrams of various unsteered response directivities of the first active mills cross arrangement 1100 of FIG. 11 in accordance with an embodiment of the disclosure. As shown in FIG. 11, the first active mills cross arrangement 1100 may include a transmitter 1102 and at least one line array 1104. The transmitter 1102 may be configured to emit one or more signals of various frequencies, such as sonar. The transmitter 1102 may include many configurations. For instance, the transmitter 1102 may emit acoustic beams using a transmission channel and/or element of a multichannel transducer, such as multichannel transducer 250 described above. Depending on the application, the transmitter 1102 may have a wide or narrow signal beam, in one or more planes. For instance, as shown in FIG. 12, the transmitter 1102 may have a wide signal beam in multiple planes, such as in planes defined by the plurality of receiver arrays. FIG. 12 illustrates one such directivity 1106 of the transmitter 1102, with the emitted signal beam of the transmitter 1102 projecting in all or substantially all segments of the full three-dimensional volume. In this manner, the transmitter 1102 may provide a single transmission to interrogate the full three-dimensional volume.

As shown in FIG. 11, the first active mills cross arrangement 1100 may include a first line array 1110 and a second line array 1112. At least one of the first line array 1110 and the second line array 1112 may be configured to receive echo returns of the signal(s) emitted by the transmitter 1102 from one or more objects or targets. For instance, the first line array 1110 may include a first plurality of receiver elements 1116 for receiving echo returns of the signal(s) emitted from the transmitter 1102 from objects or targets. In this manner, the first line array 1110 may define a first receiver array for receiving echo returns of the emitted signals. The first plurality of receiver elements 1116 may be aligned in a first geometric pattern. For instance, the first plurality of receiver elements 1116 may be aligned end-to-end in a straight line or in a substantially straight line to define a first plane. The first line array 1110 may include any number of receiver elements to define the receiver array. For instance, the first line array 1110 may include thirty-three receiver elements, more than thirty-three receiver elements, or less than thirty-three receiver elements.

The second line array 1112 may be configured similar to the first line array 1110. For example, the second line array 1112 may include a second plurality of receiver elements 1118 for receiving echo returns of the emitted signal(s) from objects or targets. In this manner, the second line array 1112 may define a second receiver array for receiving echo returns of the emitted signals. The second plurality of receiver elements 1118 may be aligned in a second geometric pattern. The second geometric pattern may be similar to, or different from, the first geometric pattern of the first line array 1110. For instance, the second plurality of receiver elements 1118 may be aligned end-to-end in a straight line or in a substantially straight line to define a second plane. As shown, the second plane may be orthogonal to the first plane, though other configurations are contemplated. In this manner, the first line array 1110 may be orthogonal to the second line array 1112.

Depending on the application, the second line array 1112 may intersect the first line array 1110. For example, the first line array 1110 and the second line array 1112 may intersect to define a T-shape, an X-shape, a cross, or the like. The second line array 1112 may intersect the first line array 1110 at any receiver element along the first line array 1110. For instance, the second line array 1112 may intersect the first line array 1110 at an upper receiver element of the first line array 1110, at a lower receiver element of the first line array 1110, or as shown in FIG. 11, at a central receiver element of the first line array 1110. In like manner, the first line array 1110 may intersect the second line array 1112 at any receiver element along the second line array 1112. For example, the first line array 1110 may intersect the second line array 1112 at a left receiver element of the second line array 1112, at a right receiver element of the second line array 1112, or as shown in FIG. 11, at a central receiver element of the second line array 1112.

The transmitter 1102 may be positioned relative to the first line array 1110 and the second line array 1112. For instance, the transmitter 1102 may be positioned within one of the quadrants defined by the X-shaped cross of the first line array 1110 and the second line array 1112. As shown in FIG. 11, the transmitter 1102 may be positioned within an upper left quadrant of the X-shaped cross of the first line array 1110 and the second line array 1112, though other configurations are contemplated.

The second line array 1112 may include any number of receiver elements to define the receiver array. Like the first line array 1110, the second line array 1112 may include thirty-three receiver elements, more than thirty-three receiver elements, or less than thirty-three receiver elements. In some embodiments, the second line array 1112 may include the same number of receiver elements as the first line array 1110, or a different number of receiver elements as the first line array 1110. In some embodiments, one or more receiver elements may form both the first line array 1110 and the second line array 1112. For instance, a receiver element at the intersection of the first line array 1110 and the second line array 1112 may define both the first line array 1110 and the second line array 1112. In other embodiments, the receiver element at the intersection of the first line array 1110 and the second line array 1112 may be an element of only one of the first line array 1110 and the second line array 1112 (e.g., part of only the first line array 1110 or part of only the second line array 1112).

The first line array 1110 and the second line array 1112 may detect objects or targets based on the detected or received echo returns. As shown in FIG. 12, the first line array 1110 may be configured such that an unsteered response directivity 1130 of the first line array 1110 is generally fan shaped and focused along a first response line, though other configurations are contemplated. The second line array 1112 may be configured such that an unsteered response directivity 1132 of the second line array 1112 is generally fan shaped and focused along a second response line, though other configurations are contemplated. The second response line may be orthogonal to the first response line. Combining the response directivities of the first line array 1110 and the second line array 1112 may yield a combined directivity 1134 with a narrow beam to achieve direction of arrival interpolation in both planes.

Depending on the application, a logic device may correlate the signals of the first line array 1110 and the second line array 1112 to interpolate the received echo returns in two planes and achieve the combined directivity of the system in detecting objects or targets. The logic device may be any of the processing or logic devices described above with reference to FIGS. 1-10B. The logic device may utilize many interpolation techniques. For instance, the logic device may utilize one or more of the following interpolation techniques: estimation of signal parameters via rotational invariant techniques (ESPRIT), MUSIC, and half-beam processing. Such techniques are exemplary only, the other interpolation techniques may be utilized to interpolate the direction of arrival in multiple planes.

Figure 13:
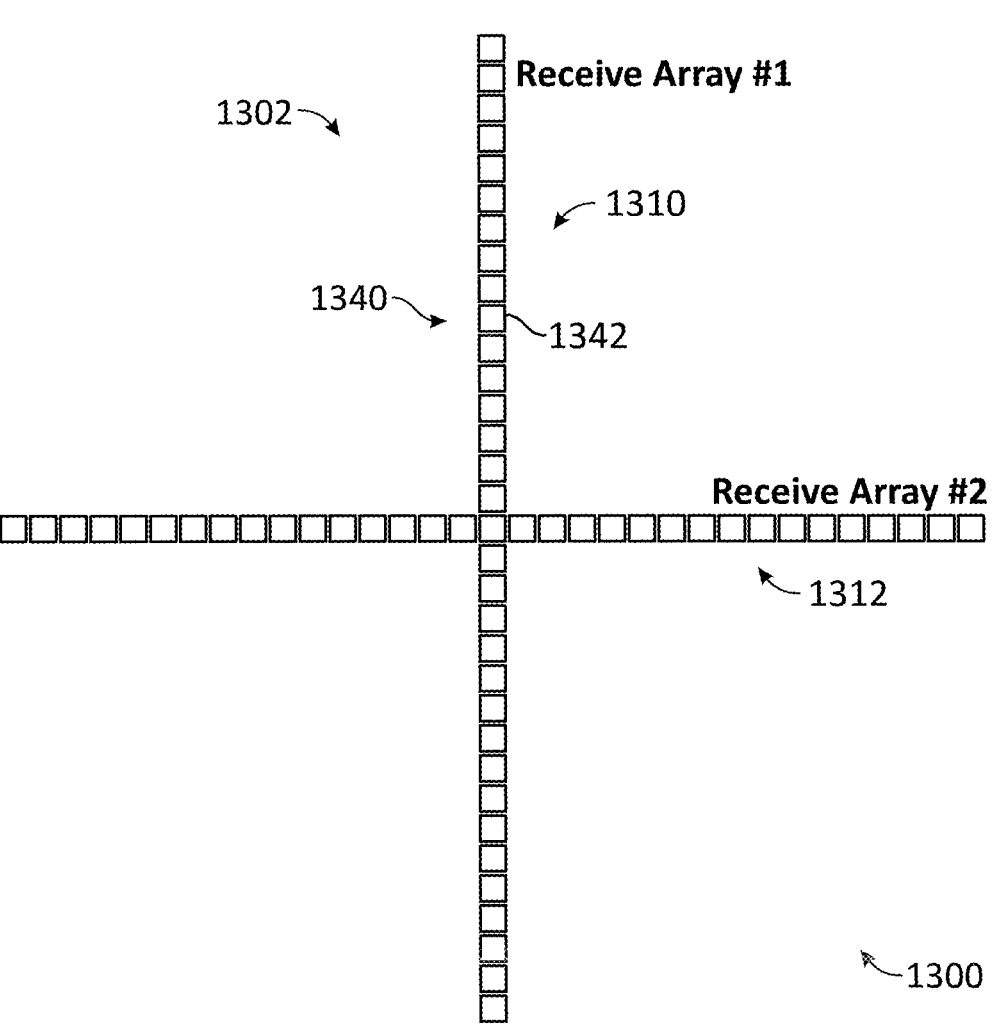
FIG. 13 illustrates a diagram of a second active mills cross arrangement with two-plane interpolation in accordance with an embodiment of the disclosure.
Figure 14:
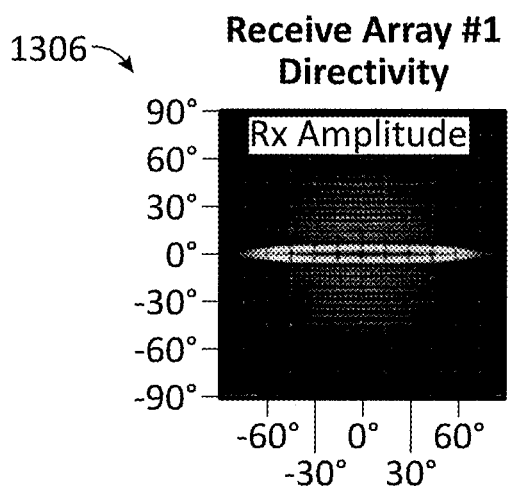
FIG. 14 illustrates diagrams of various unsteered response directivities of the second active mills cross arrangement of FIG. 13 in accordance with an embodiment of the disclosure.
Figure 14:
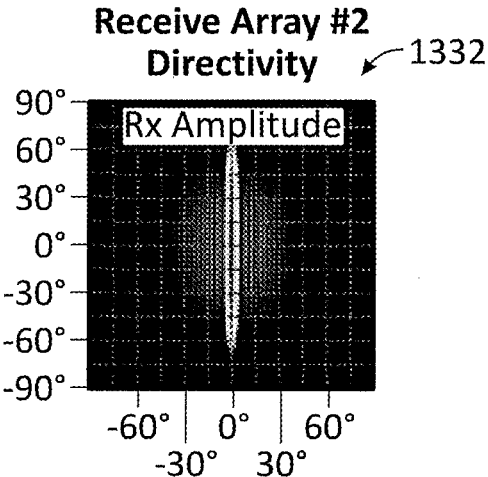
Figure 14:
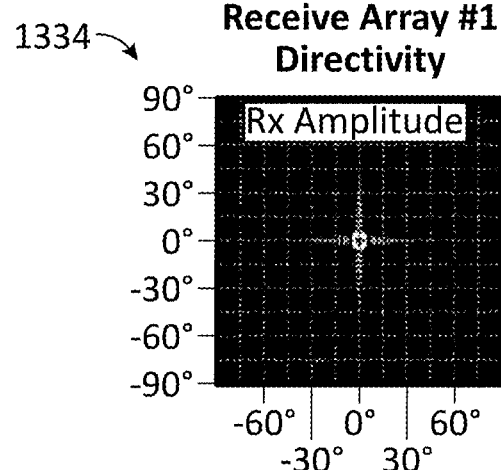

FIG. 13 illustrates a diagram of a second active mills cross arrangement 1300 in accordance with an embodiment of the disclosure. FIG. 14 illustrates diagrams of various unsteered response directivities of the second active mills cross arrangement 1300 of FIG. 13 in accordance with an embodiment of the disclosure. Unless otherwise described below, the second active mills cross arrangement 1300 may be similar to the first active mills cross arrangement 1100 of FIGS. 11 and 12, described above.

As shown in FIG. 13, rather than including a separate transmitter, the first line array 1310 of the second active mills cross arrangement 1300 may define the transmitter 1302 itself. In such embodiments, the transmitter 1302 may be defined as a transmitter array 1340 including a plurality of transmitter elements 1342 for transmitting or emitting one or more signals. In such embodiments, the second line array 1112 may define a receiver array for receiving echo returns of the signals emitted from the first line array 1310.

To provide the multi-plane interpolation of the received echo returns, the transmitter array 1340 may be configured to limit projection of the emitted signals in only a portion of the full three-dimensional volume, such as within one or more segments of the three-dimensional volume. For example, the transmitter array 1340 may concentrate the emitted signals into a narrower volume or segment of the full three-dimensional volume, thereby limiting the targets or objects that are subjected to the emissions, and the echo returns that are received by the second line array 1112. For instance, FIG. 14 illustrates the directivity 1306 of the transmitter array 1340 as being generally fan shaped and focused along a transmit line, similar to the first response line of FIG. 12, described above, which when combined with the directivity 1332 of the second line array 1112 produces the narrow combined directivity 1334 to determine the direction of arrival of the echo returns.

Figure 15:
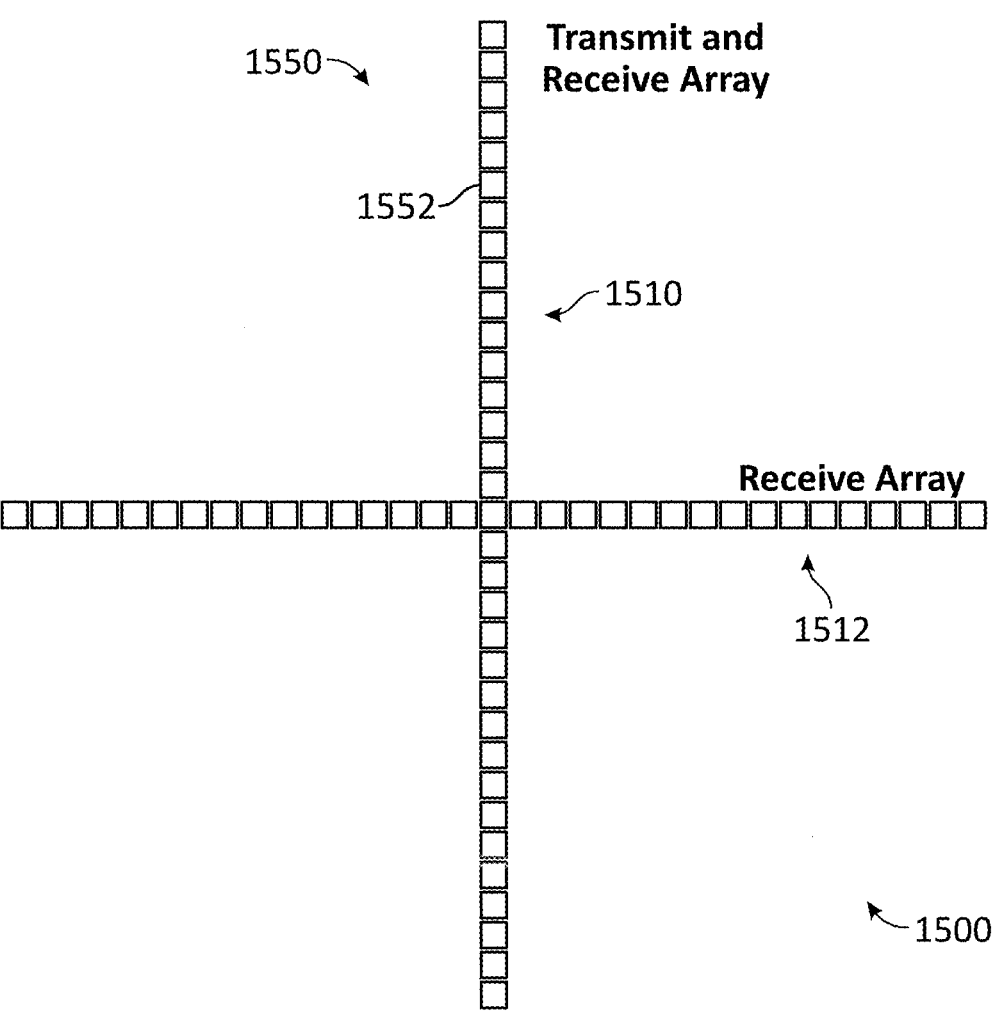
FIG. 15 illustrates a diagram of a third active mills cross arrangement with two-plane interpolation in accordance with an embodiment of the disclosure.
Figure 16:
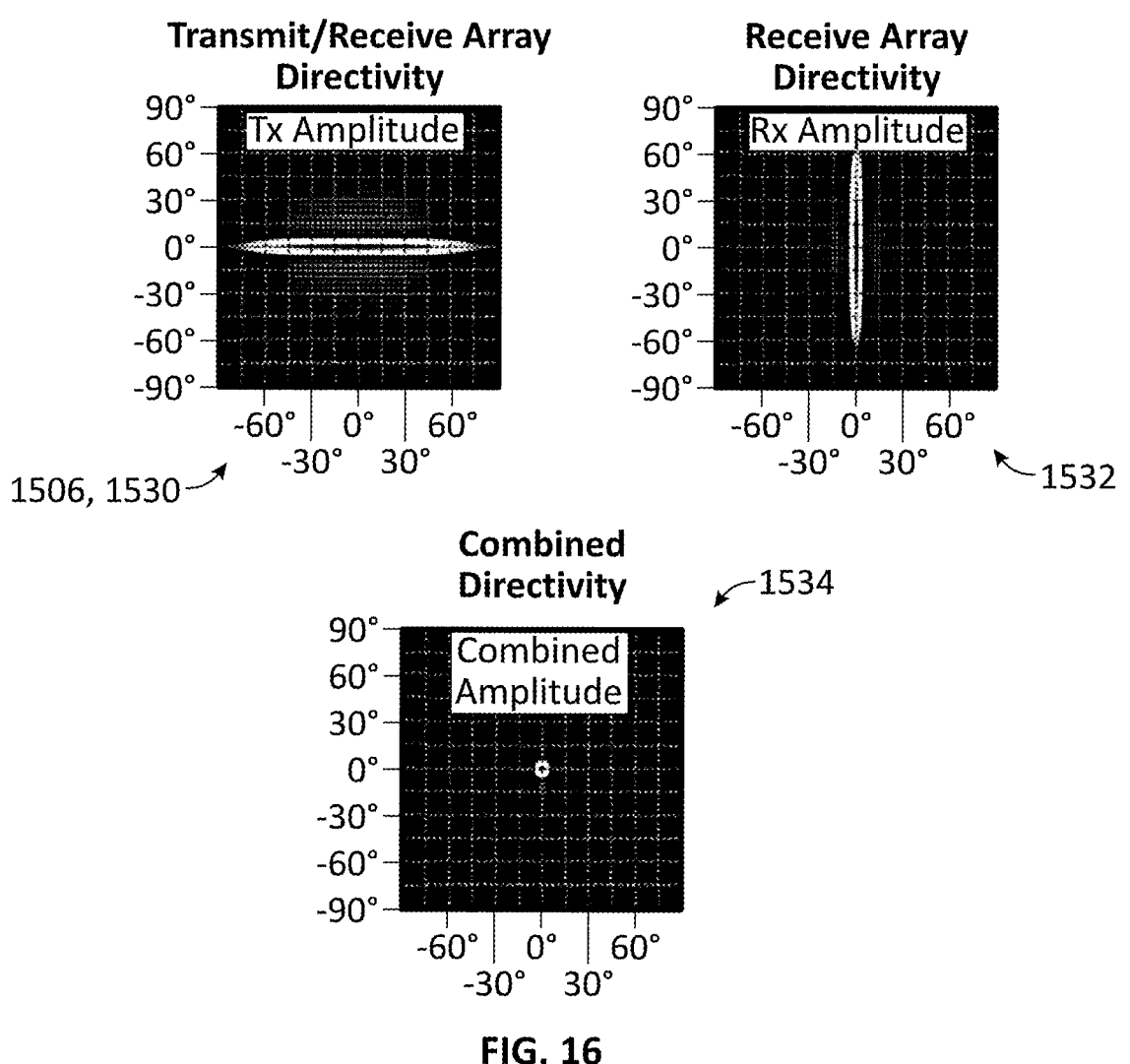
FIG. 16 illustrates diagrams of various unsteered response directivities of the third active mills cross arrangement of FIG. 15 in accordance with an embodiment of the disclosure.

FIG. 15 illustrates a diagram of a third active mills cross arrangement 1500 in accordance with an embodiment of the disclosure. FIG. 16 illustrates diagrams of various unsteered response directivities of the third active mills cross arrangement 1500 of FIG. 15 in accordance with an embodiment of the disclosure. Unless otherwise described below, the third active mills cross arrangement 1500 may be similar to the first active mills cross arrangement 1100 of FIGS. 11 and 12, described above, and/or the second active mills cross arrangement 1300 of FIGS. 13 and 14, described above.

Referring to FIG. 15, the first line array 1510 of the third active mills cross arrangement 1500 may define a transceiver 1550. For instance, the first line array 1510 may include a plurality of elements 1552 each or combining to transmit and receive signals. In such embodiments, the first line array 1510 may pick up any objects or targets that are in the transmit beam. As shown in FIG. 16, the transmit and receive array directivities of the third active mills cross arrangement 1500 may be similar to those of the second active mills cross arrangement 1300 of FIG. 14, described above.

Figure 17:
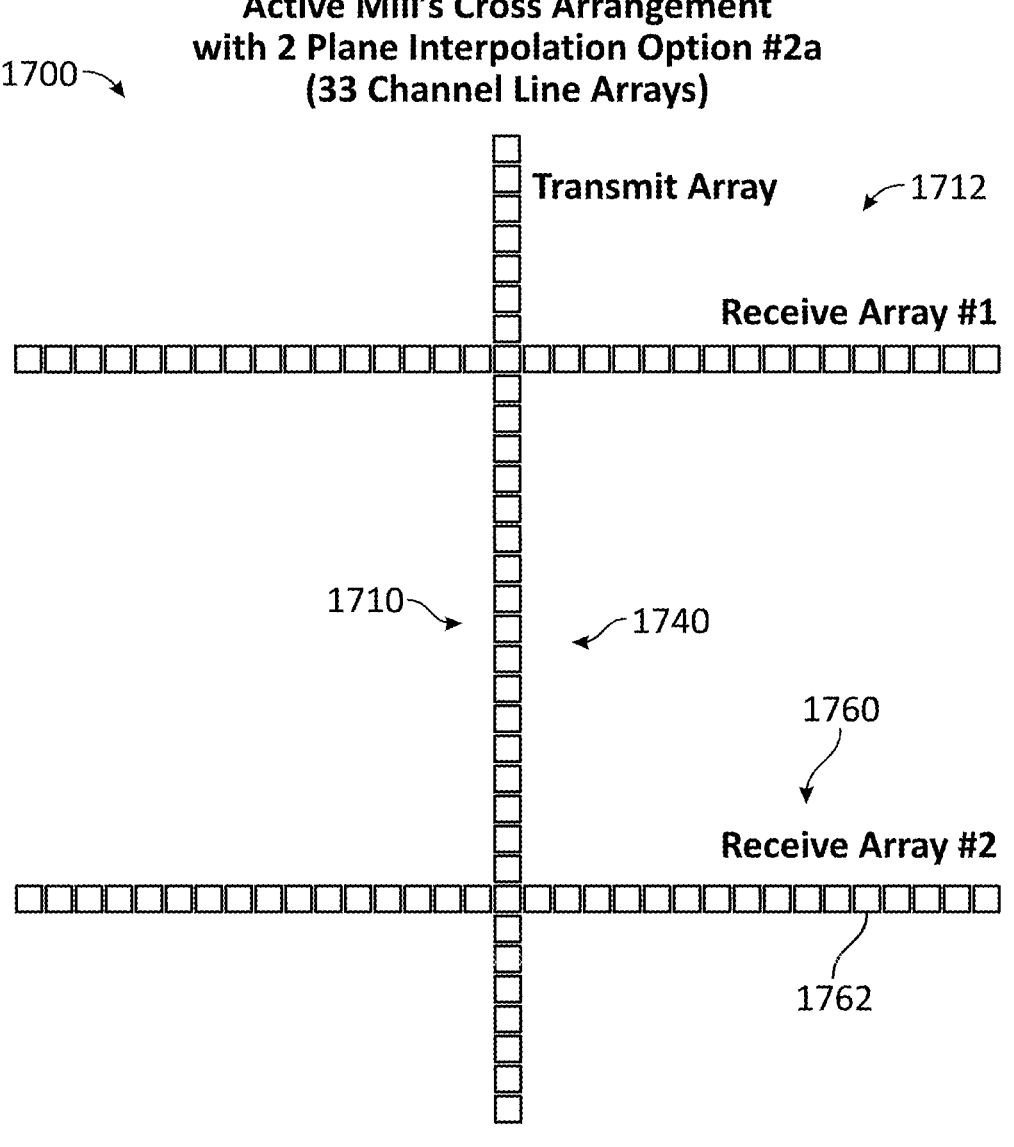
FIG. 17 illustrates a diagram of a fourth active mills cross arrangement with two-plane interpolation in accordance with an embodiment of the disclosure.
Figure 18:
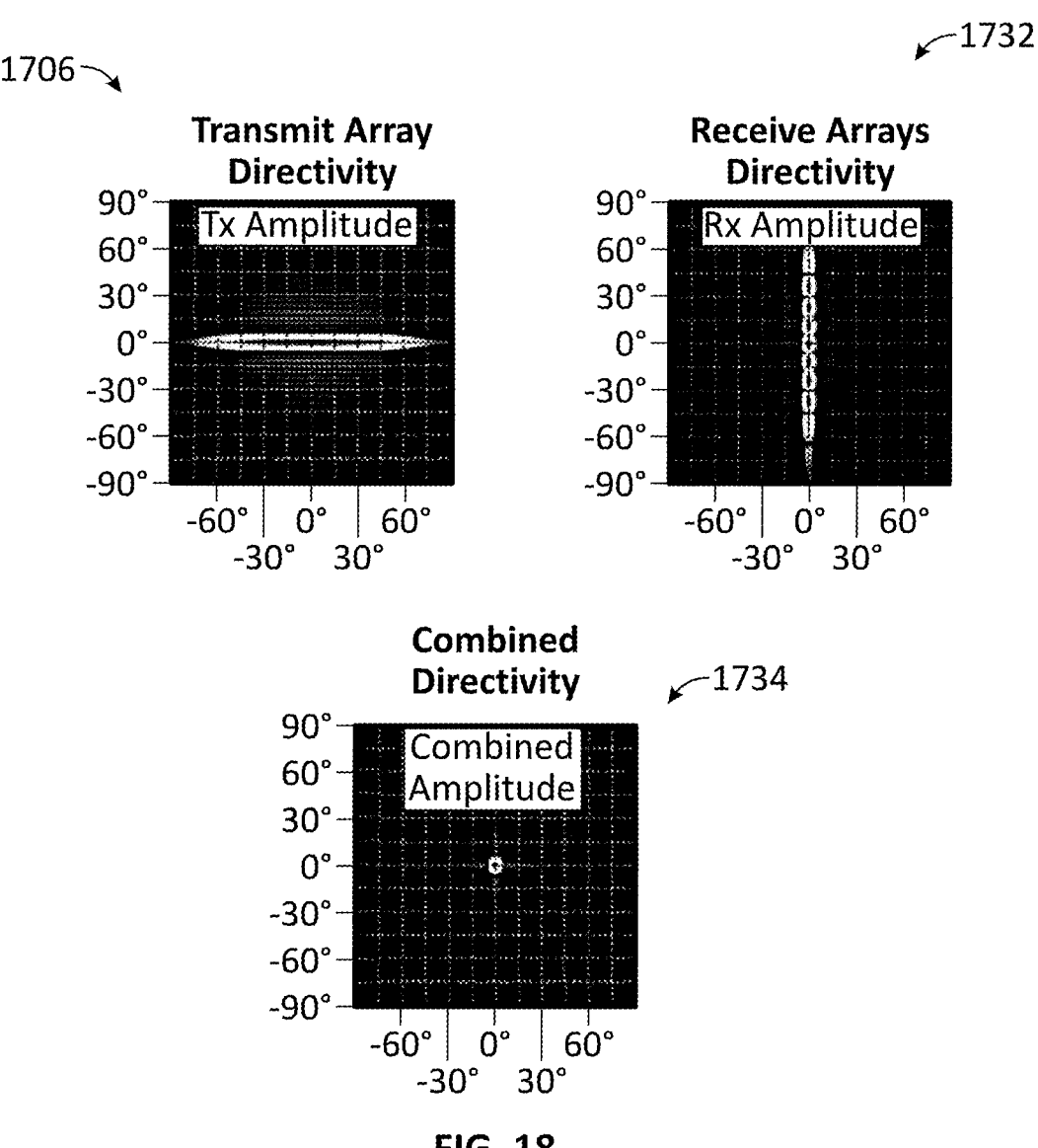
FIG. 18 illustrates diagrams of various unsteered response directivities of the fourth active mills cross arrangement of FIG. 17 in accordance with an embodiment of the disclosure.

FIG. 17 illustrates a diagram of a fourth active mills cross arrangement 1700 in accordance with an embodiment of the disclosure. FIG. 18 illustrates diagrams of various unsteered response directivities of the fourth active mills cross arrangement 1700 of FIG. 17 in accordance with an embodiment of the disclosure. Unless otherwise described below, the fourth active mills cross arrangement 1700 may be similar to the first active mills cross arrangement 1100 of FIGS. 11 and 12, described above, the second active mills cross arrangement 1300 of FIGS. 13 and 14, described above, and/or the third active mills cross arrangement 1500 of FIGS. 15 and 16, described above.

Referring to FIG. 17, the fourth active mills cross arrangement 1700 may include a third line array 1760. The third line array 1760 may be configured similar or identical to the second line arrays 1112, 1312, 1512 described above. For example, the third line array 1760 may include a third plurality of elements 1762. In some embodiments, the third plurality of elements 1762 may be receiver elements for receiving echo returns of the emitted signal(s) from objects or targets. In this manner, the third line array 1760 may define a receiver array for receiving echo returns of the emitted signal(s). In such embodiments, the second line array 1712 may define a first receiver array for receiving echo returns of the signals emitted from the first line array 1710, and the third line array 1760 may define a second receiver array for receiving echo returns of the signals emitted from the first line array 1710.

The third plurality of elements 1762 may be aligned in a third geometric pattern. The third geometric pattern may be similar to, or different from, the first geometric pattern and/or the second geometric pattern described above. For example, the third plurality of elements 1762 may be aligned end-to-end in a straight line or in a substantially straight line to define a third plane. As shown, the third plane may be orthogonal to the first plane such that the third line array 1760 is orthogonal to the first line array 1710, though other configurations are contemplated.

Depending on the application, the third line array 1760 may intersect the first line array 1710. For instance, the first line array 1710 and the third line array 1760 may intersect to define a T-shape, an X-shape, a cross, or the like. The third line array 1760 may intersect the first line array 1710 at any receiver element along the first line array 1710, such as at an upper receiver element of the first line array 1710, at a central receiver element of the first line array 1710, or as shown in FIG. 17, at a lower receiver element of the first line array 1710. Similarly, the first line array 1710 may intersect the third line array 1760 at any receiver element along the third line array 1760, such as at a left receiver element of the third line array 1760, a right receiver element of the third line array 1760, or as shown in FIG. 17, at a central receiver element of the third line array 1760.

The third line array 1760 may include any number of receiver elements to define the receiver array. Like the first line array 1710 and the second line array 1712, the third line array 1760 may include thirty-three receiver elements, more than thirty-three receiver elements, or less than thirty-three receiver elements. In some embodiments, the third line array 1760 may include the same number of receiver elements as the first line array 1710 and/or the second line array 1712, or a different number of receiver elements. In some embodiments, one or more receiver elements may form both the first line array 1710 and the third line array 1760, or the receiver element at the intersection of the first line array 1710 and the third line array 1760 may be an element of only one of the first line array 1710 and the second line array 1712 (e.g., part of only the first line array 1710 or part of only the third line array 1760).

As shown, the third line array 1760 may extend parallel to the second line array 1712. For example, the third line array 1760 may extend parallel to, but spaced away from, the second line array 1712. The third line array 1760 may be spaced away from the second line array 1712 along the first line array 1710. For instance, the second line array 1712 may intersect the first line array 1710 at an upper portion of the first line array 1710, and the third line array 1760 may intersect the first line array 1710 at a lower portion of the first line array 1710, though other configurations are contemplated. In some embodiments, the resolution of the interpolation, orthogonally to the second line array 1712 and the third line array 1760, may be proportional to the spacing between the second line array 1712 and the third line array 1760, with a larger spacing correlating to a higher resolution. For example, in the wide-spacing embodiment illustrated in FIG. 17 and as shown in FIG. 18, the combined receive array directivity 1732 may be wide vertically and may include multiple high intensity peaks.

The signals that are received by the second line array 1712 and the third line array 1760 (i.e., the first and second receiver arrays) may be result of multiplicative combination of the transmit and receive beams, such as the intersection of orthogonal fan beams. Such configurations may reduce target echoes to only those that occur within the intersection, thereby improving reverberation rejection. In some embodiments, the signals from the second line array 1712 and the third line array 1760 may be combined, thereby improving a signal-to-noise compared to arrangements with a single line array. The signal combination of the second line array 1712 and the third line array 1760 may also improve the directivity to further reduce reverberation and false targets.

Figure 19:
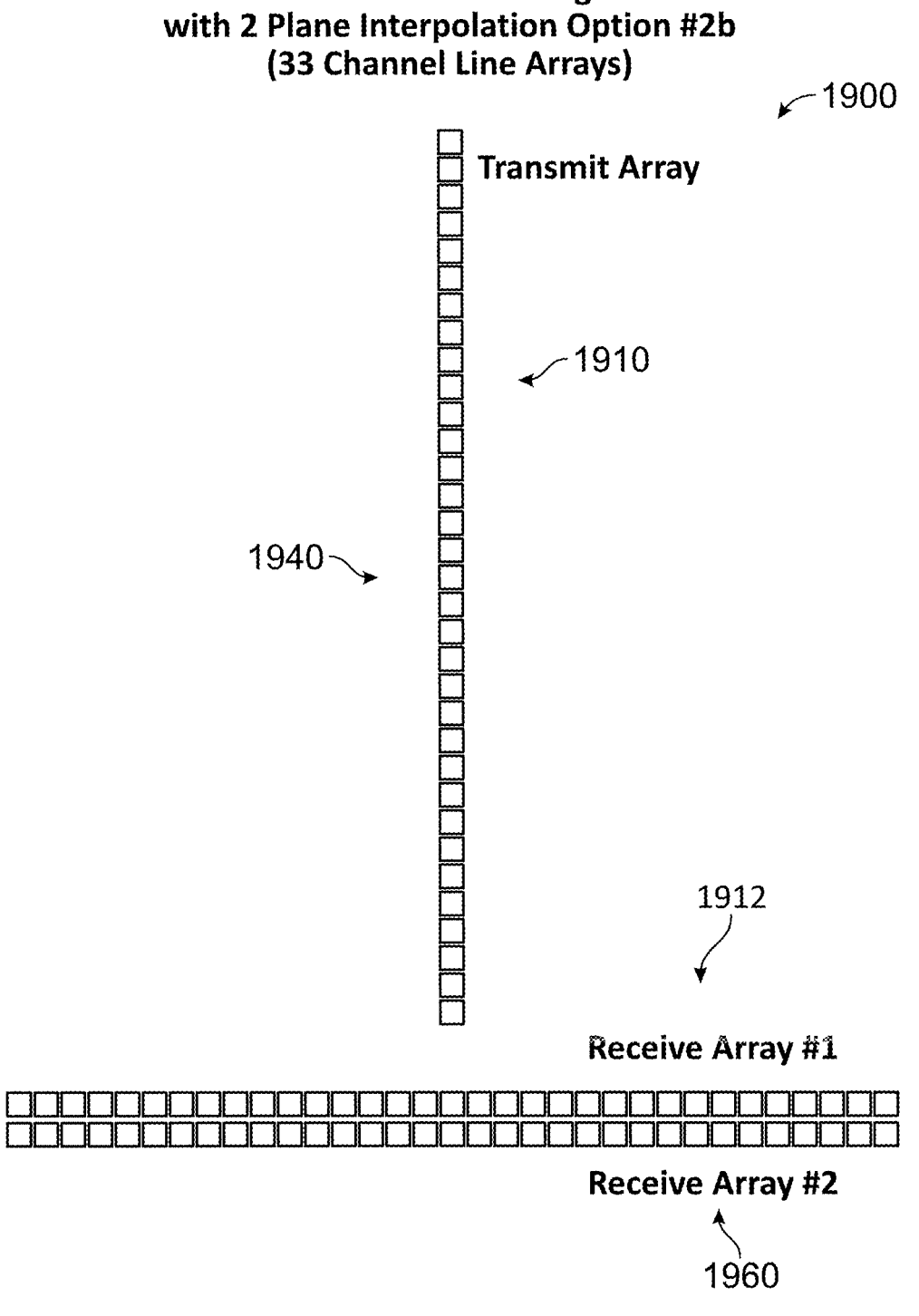
FIG. 19 illustrates a diagram of a fifth active mills cross arrangement with two-plane interpolation in accordance with an embodiment of the disclosure.
Figure 20:
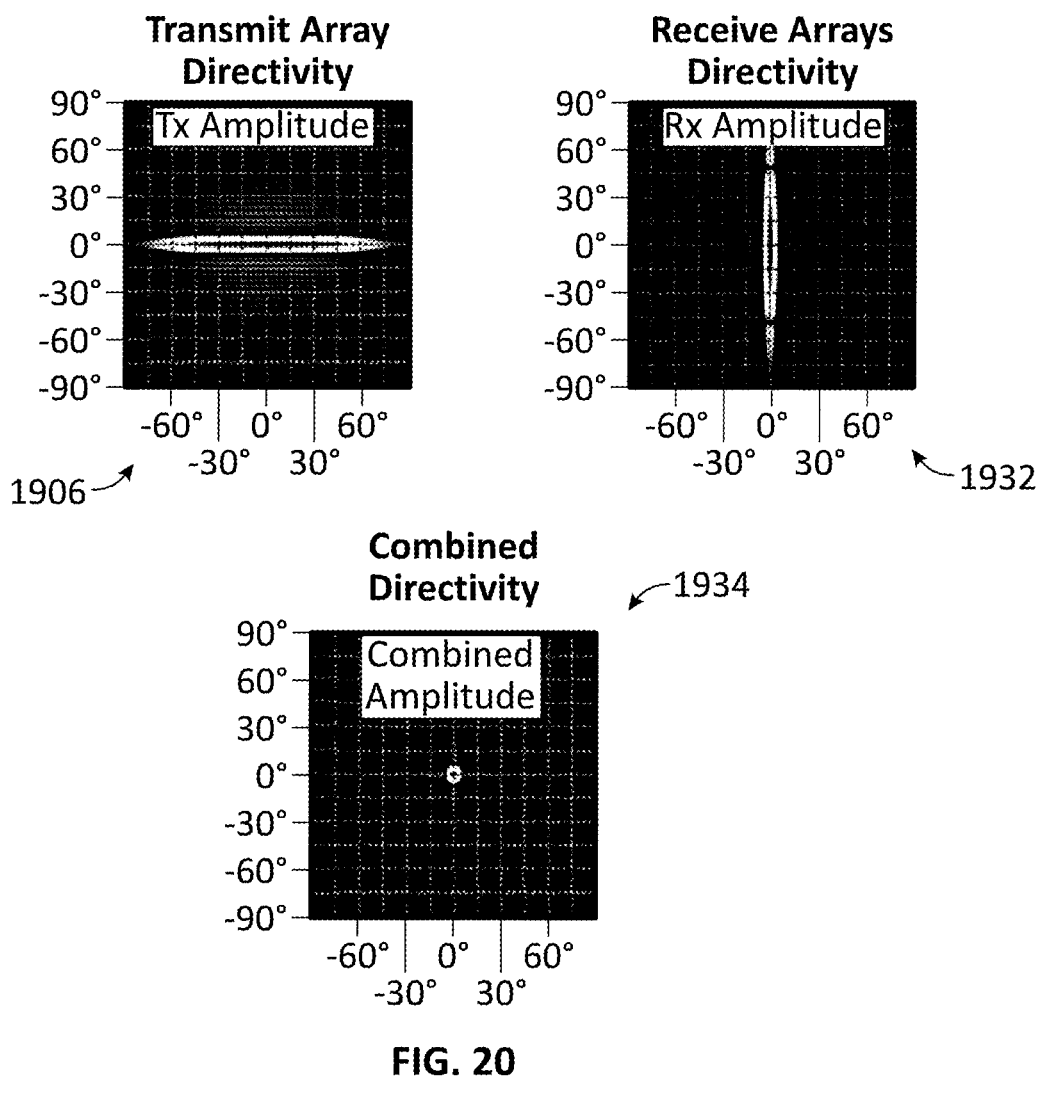
FIG. 20 illustrates diagrams of various unsteered response directivities of the fifth active mills cross arrangement of FIG. 19 in accordance with an embodiment of the disclosure.

FIG. 19 illustrates a diagram of a fifth active mills cross arrangement 1900 in accordance with an embodiment of the disclosure. FIG. 20 illustrates diagrams of various unsteered response directivities of the fifth active mills cross arrangement 1900 of FIG. 19 in accordance with an embodiment of the disclosure. Unless otherwise described below, the fifth active mills cross arrangement 1900 may be similar to the first active mills cross arrangement 1100 of FIGS. 11 and 12, described above, the second active mills cross arrangement 1300 of FIGS. 13 and 14, described above, the third active mills cross arrangement 1500 of FIGS. 15 and 16, described above, and/or the fourth active mills cross arrangement 1700 of FIGS. 17 and 18, described above.

Referring to FIG. 19, the fifth active mills cross arrangement 1900 may include a third line array 1960 similar to the fourth active mills cross arrangement 1700. However, rather than being spaced away from the second line array 1912, the third line array 1960 may extend proximate to the second line array 1912. As noted above, the resolution of the interpolation, orthogonally to the second line array 1912 and the third line array 1960, may be proportional to the spacing between the second line array 1912 and the third line array 1960, with a larger spacing correlating to a higher resolution. For example, in the narrow-spacing embodiment illustrated in FIG. 19 and as shown in FIG. 20, the combined receive array directivity 1932 may be wide vertically and may be narrower than a single array response. As shown in FIG. 19, the array configurations need not physically cross to function as described herein. For instance, the second line array 1912 and/or the third line array 1960 may be spaced from the first line array 1910.

Figure 21:
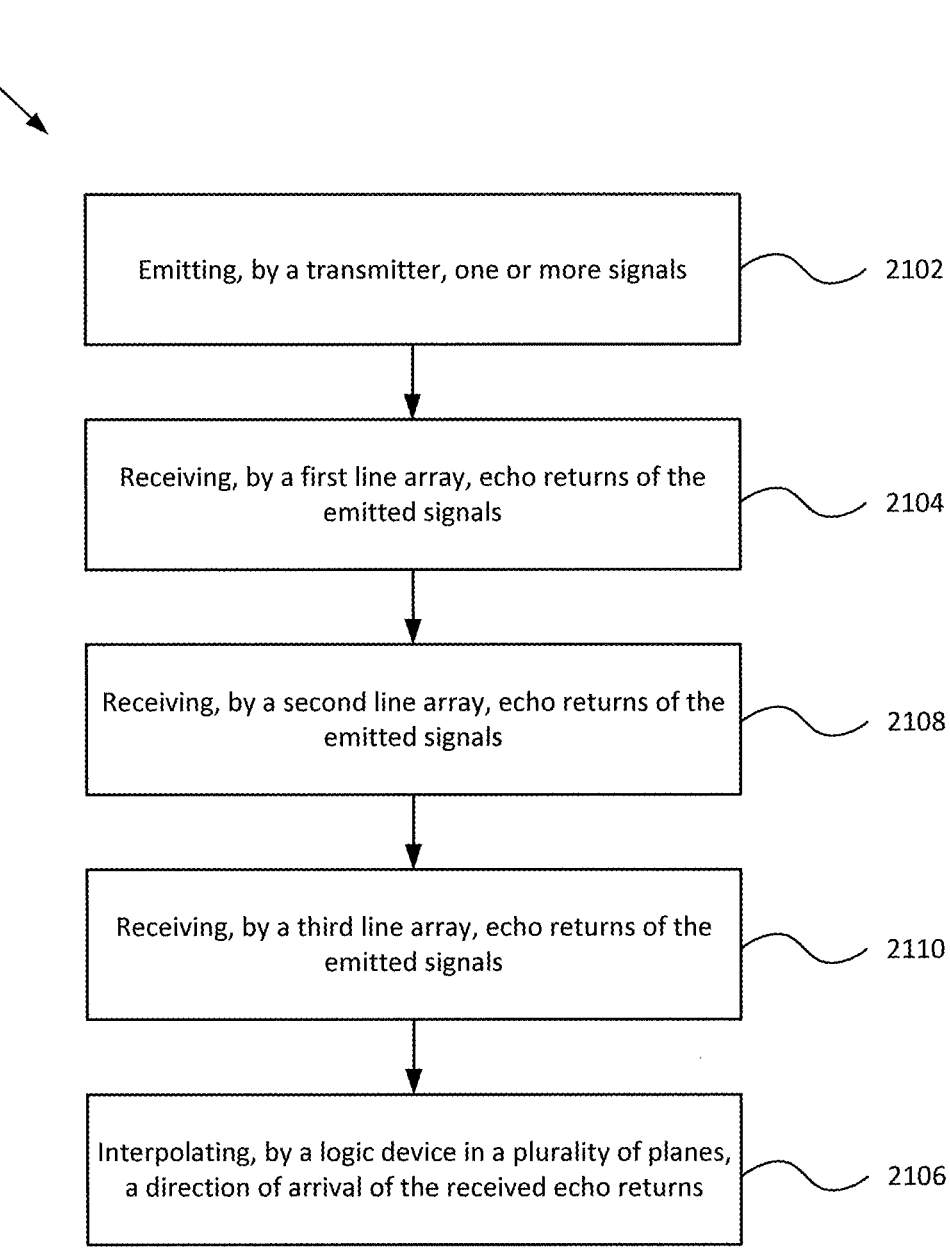
FIG. 21 illustrates a flowchart of a method for applying direction of arrival algorithms in multiple planes using an active mills cross arrangement in accordance with an embodiment of the disclosure.

FIG. 21 illustrates a flowchart of a method 2100 for applying direction of arrival algorithms in multiple planes using an active mills cross arrangement in accordance with an embodiment of the disclosure. In block 2102, the method 2100 includes emitting, by a transmitter, one or more signals. For example, one or more signals may be emitted by transmitter 1102 of FIG. 11, transmitter array 1340, 1740, 1940 of FIGS. 13, 17, and 19, or transceiver 1550 of FIG. 15, each described above. In some embodiments, block 2102 may include emitting the one or more signals along a first plane. For example, the transmitter may be arranged along, and limited to emit within, the first plane. In this manner, block 2102 may include emitting the one or more signals by a transmitter array arranged along the first plane. The transmitter may be controlled by a logic device. For instance, the transmitter may be in communication with the logic device to receive one or more control signals.

In block 2104, the method 2100 includes receiving, by a first line array, echo returns of the emitted signals. For instance, echo returns may be received or detected by any one of second line array 1112, 1312, 1512, 1712 or 1912 of FIGS. 11, 13, 15, 17, and 19, described above. In some embodiments, the echo returns may be received by the first line array along a second plane. The second plane may be orthogonal to the first plane. The first line array may be in communication with a logic device.

In block 2106, the method 2100 includes interpolating, by the logic device in a plurality of planes, a direction of arrival of the received echo returns. For example, a logic device may apply an interpolation algorithm, such as a half beam processing algorithm, to the received echo returns to interpolate the direction of arrival of the received echo returns in multiple planes.

In block 2108, the method 2100 may include receiving, by a second line array, echo returns of the emitted signals. For example, echo returns of the emitted signals may be received or detected by first line array 1110 or 1510 of FIG. 11 or FIG. 15 and/or third line array 1760 or 1960 of FIG. 17 or FIG. 19, described above. In some embodiments, the echo returns may be received by the second line array along a second plane. The second plane may be orthogonal to the first plane. The second plane may be the first plane. The second line array may be in communication with a logic device.

In block 2110, the method 2100 may include receiving, by a third line array, echo returns of the emitted signals. For example, echo returns of the emitted signals may be received or detected by third line array 1760 or 1960 of FIG. 17 or FIG. 19, described above. In some embodiments, the echo returns may be received by the third line array along a third plane. The third plane may be orthogonal to the first plane. The third plane may be parallel to the first plane and/or to the second plane. The third line array may be in communication with a logic device.

FIGS. 22A-25E illustrate diagrams of various weighting schemes associated with apodization (also known as shading, weighting or windowing) where amplitude and/or phase values are applied to the channels in an array, such as the first line array, the second line array, and/or the third line array of FIG. 11, 13, 15, 17, or 19, described above, to reduce sidelobe levels to avoid false targets. As described herein, the apodization schemes may reduce the number of levels required to achieve a reduction in sidelobe levels, including but not limited to the minimal case where there is a single level. For example, the sidelobe levels may be controlled by omitting channels from the array, effectively generating a sparse array. In some embodiments, one or more apodization schemes described herein may avoid generating grating lobes (also known as diffraction secondaries) in the directivity response. Depending on the application, the weighting schemes described herein may be extended to rectangular 2D array configurations or other shapes/configurations.

Figure 22A:
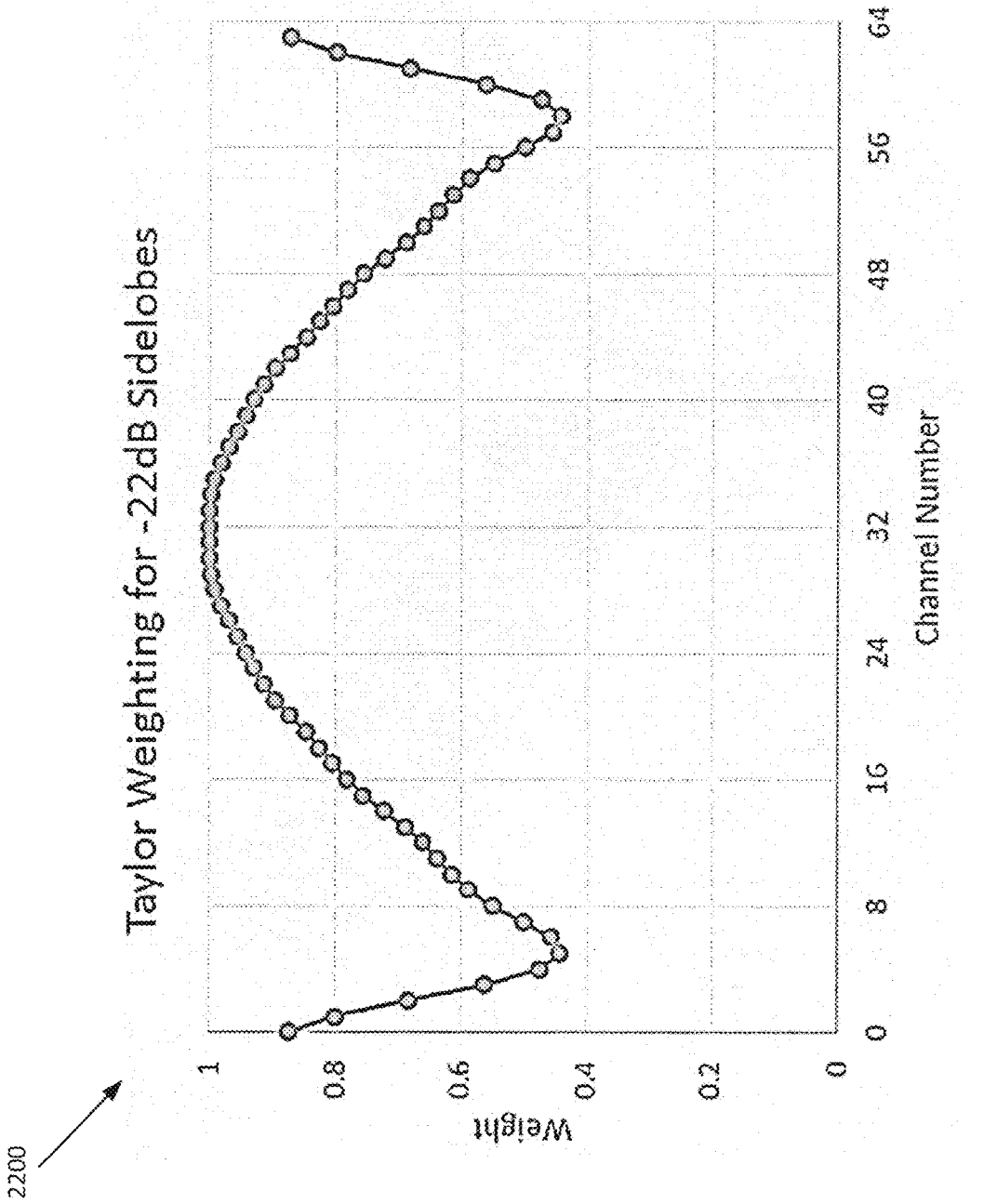
FIGS. 22A-E illustrate diagrams of a first weighting scheme for a linear array, associated one and two-way unsteered responses, and associated one and two-way 30° steering responses in accordance with an embodiment of the disclosure.
Figure 22B:
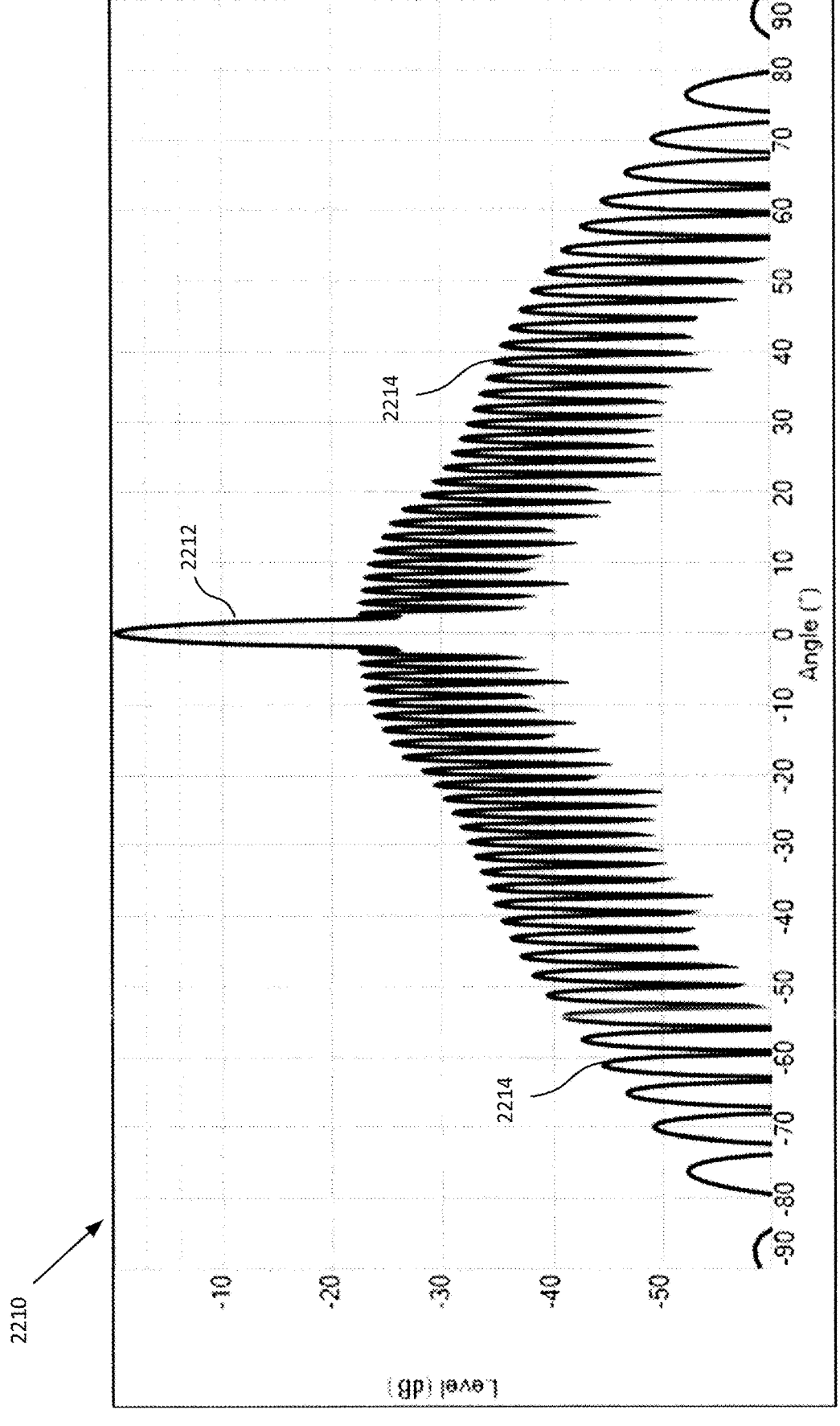
Figure 22C:
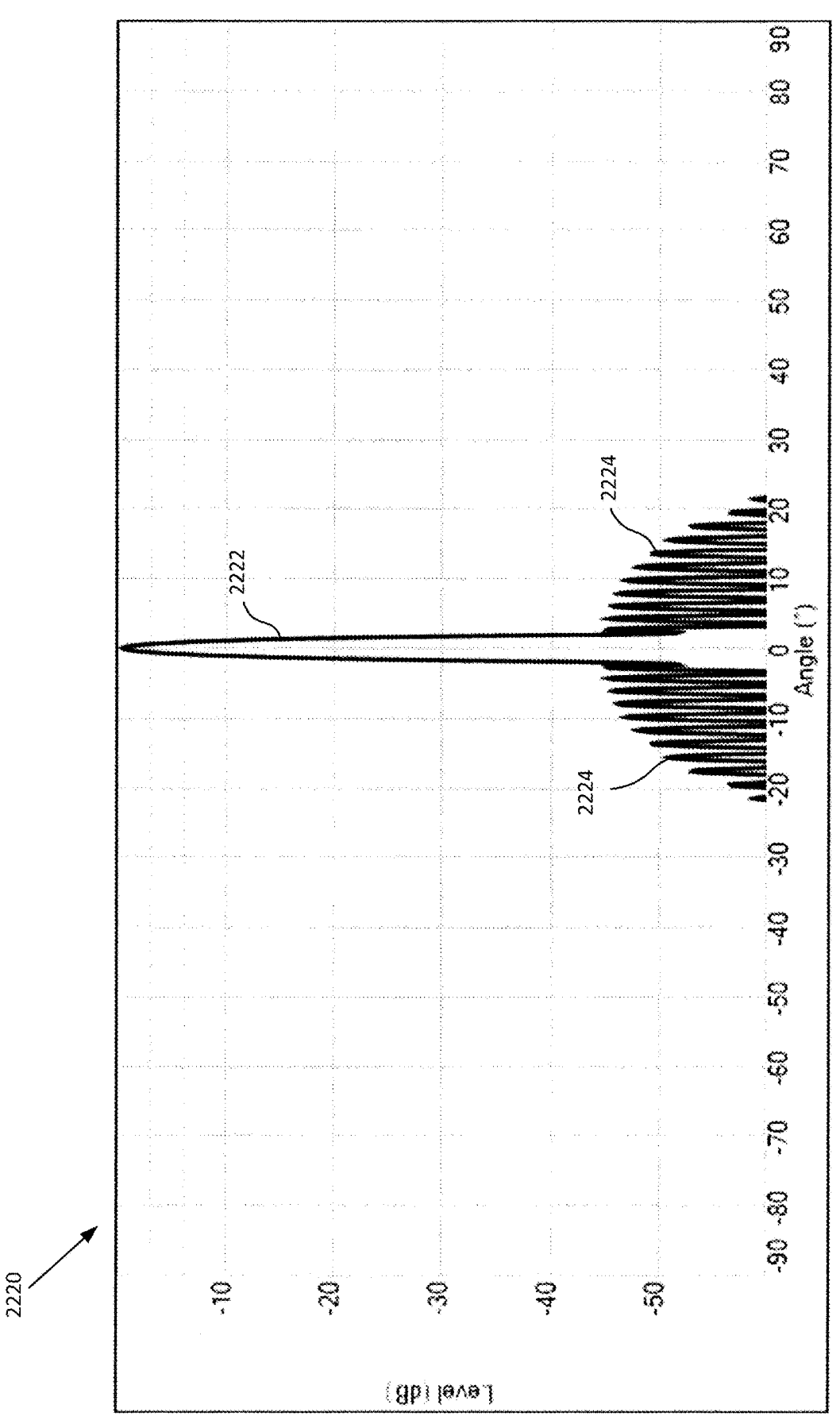
Figure 22D:
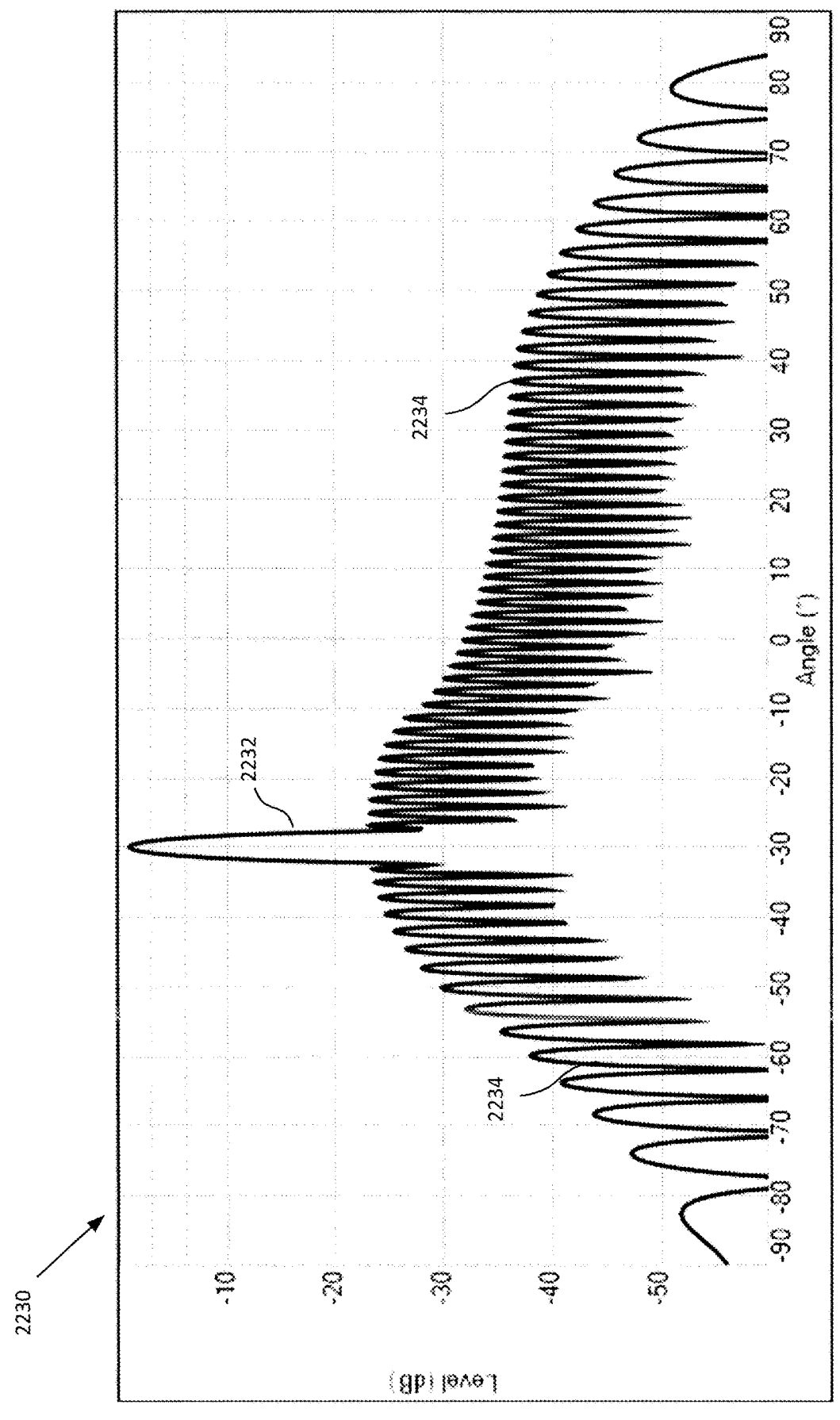
Figure 22E:
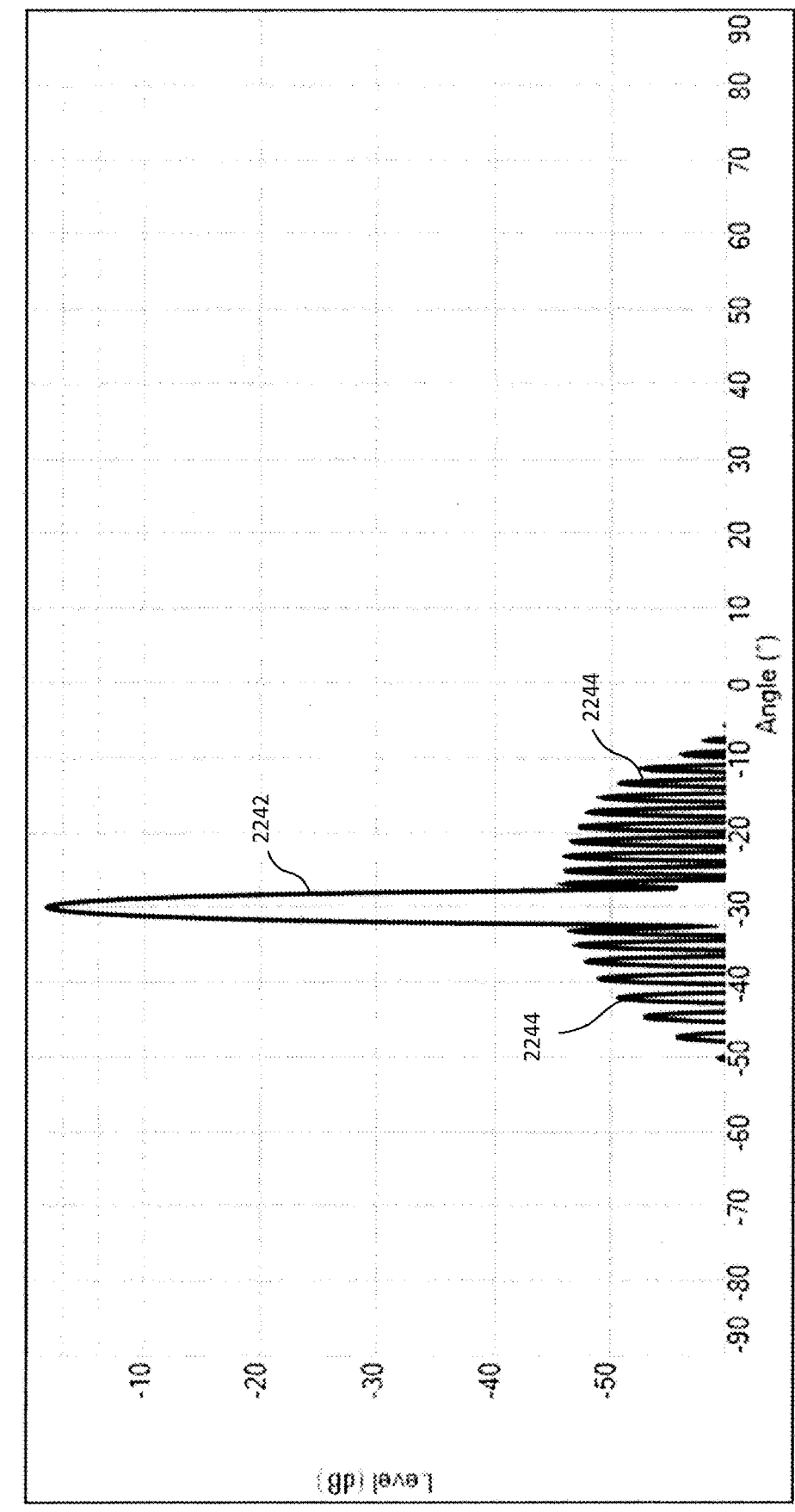

FIG. 22A illustrates a diagram of a first weighting scheme 2200 for a linear array in accordance with an embodiment of the disclosure. FIG. 22B illustrates a one-way unsteered response 2210 associated with the first weighting scheme 2200 in accordance with an embodiment of the disclosure. FIG. 22C illustrates a two-way unsteered response 2220 associated with the first weighting scheme 2200 in accordance with an embodiment of the disclosure. FIG. 22D illustrates a one-way 30° steering response 2230 associated with the first weighting scheme 2200 in accordance with an embodiment of the disclosure. FIG. 22E illustrates a two-way 30° steering response 2240 associated with the first weighting scheme 2200 in accordance with an embodiment of the disclosure.

Referring to FIG. 22A, the first weighting scheme 2200 may be a Taylor weighting scheme for a 64-channel half wavelength linear array. For instance, the first weighting scheme 2200 may be a Taylor shading for –22 dB sidelobes. The first weighting scheme 2200 may have multiple discrete values associated with the channels of the linear array. For instance, each channel may have a discrete weight value varying between 0 and 1. As shown, weight values for channels 1-6 may decrease (linearly or nonlinearly) from approximately 0.9 to approximately 0.4, weight values for channels 7-32 may increase (linearly or nonlinearly) from approximately 0.4 to approximately 1, weight values for channels 33-58 may decrease (linearly or nonlinearly) from approximately 1 to approximately 0.4, and weight values for channels 59-64 may increase (linearly or nonlinearly) from approximately 0.4 to approximately 0.9.

Referring to FIG. 22B, a one-way unsteered response 2210 associated with the first weighting scheme 2200 may include a center beam 2212 and a pair of sidelobes 2214. The center beam 2212 may be centered at or near a 0° angle. With the first weighting scheme 2200, the center beam 2212 may have a beam width of approximately 1.93° (–3 dB), which may be a 25% increase compared to a uniform array (2.66° (–6 dB)). The sidelobes 2214 may have a level of approximately –22 dB immediately adjacent to the center beam 2212 and generally decrease in level with angle away from the center beam 2212. The one-way unsteered response 2210 may have a shading loss of approximately –2.01 dB compared to a 64-channel uniform weighting.

Referring to FIG. 22C, a two-way unsteered response 2220 associated with the first weighting scheme 2200 may be similar to the one-way unsteered response 2210 of FIG. 22B, described above. For instance, the two-way unsteered response 2220 may include a center beam 2222 centered at or near a 0° angle, and a pair of sidelobes 2224 generally decreasing in level with angle away from the center beam 2222. With the two-way unsteered response 2220, however, the sidelobes 2224 may have a level of approximately –44 dB immediately adjacent to the center beam 2222.

Referring to FIGS. 22D-E, one and two-way steered responses 2230 and 2240 associated with the first weighting scheme 2200 may be similar to the one and two-way unsteered responses 2210 and 2220 of FIGS. 22B-C, described above. Depending on the application, the center beam 2232 or 2242 may be centered at or near an angle other than 0°, such as for example at or near a 30° angle, to converge or focus the beam on a specific location and/or direction. The array response may be steered using substantially any steering algorithm. For instance, the array response may be steered using a frequency-steering technique of applying fixed phase shifts between channels to electrically steer the main lobe away from the array normal. Depending on the application, the phase shifts may be integer divisions of 360°, such that the phase shifts are of a cyclic nature and so that the number of drive/receive circuits can be reduced. One such scheme for a 30° steer angle, for an array with half wavelength spacing, is to apply integer multiples of 90° phase shift (i.e., channel 1=0°, channel 2=90°, channel 3=180°, channel 4=270°, channel 5=0°, channel 6=90°, etc.) and noting that channels with 0° and 180° are in antiphase and channels with 90° and 270° are also in antiphase. In such embodiments, the odd numbered channels may be wired together with every other channel in antiphase, and the even numbered channels may be wired together with every other channel in antiphase. In this manner, the full array can be serviced from just 2 channels of electronics, whatever the length of the array.

Figure 23A:
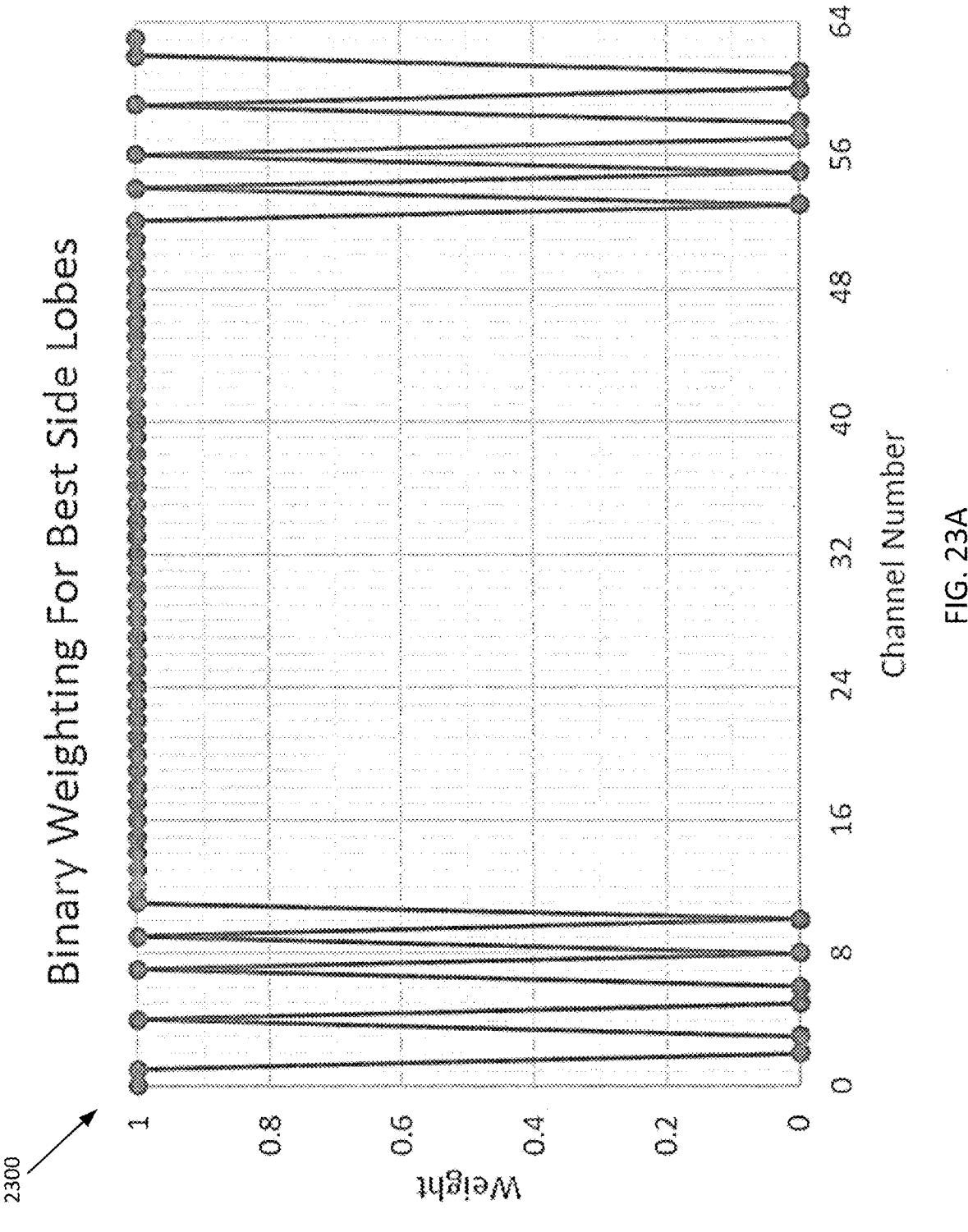
FIGS. 23A-E illustrate diagrams of a second weighting scheme for a linear array, associated one and two-way unsteered responses, and associated one and two-way 30° steering responses in accordance with an embodiment of the disclosure.
Figure 23B:
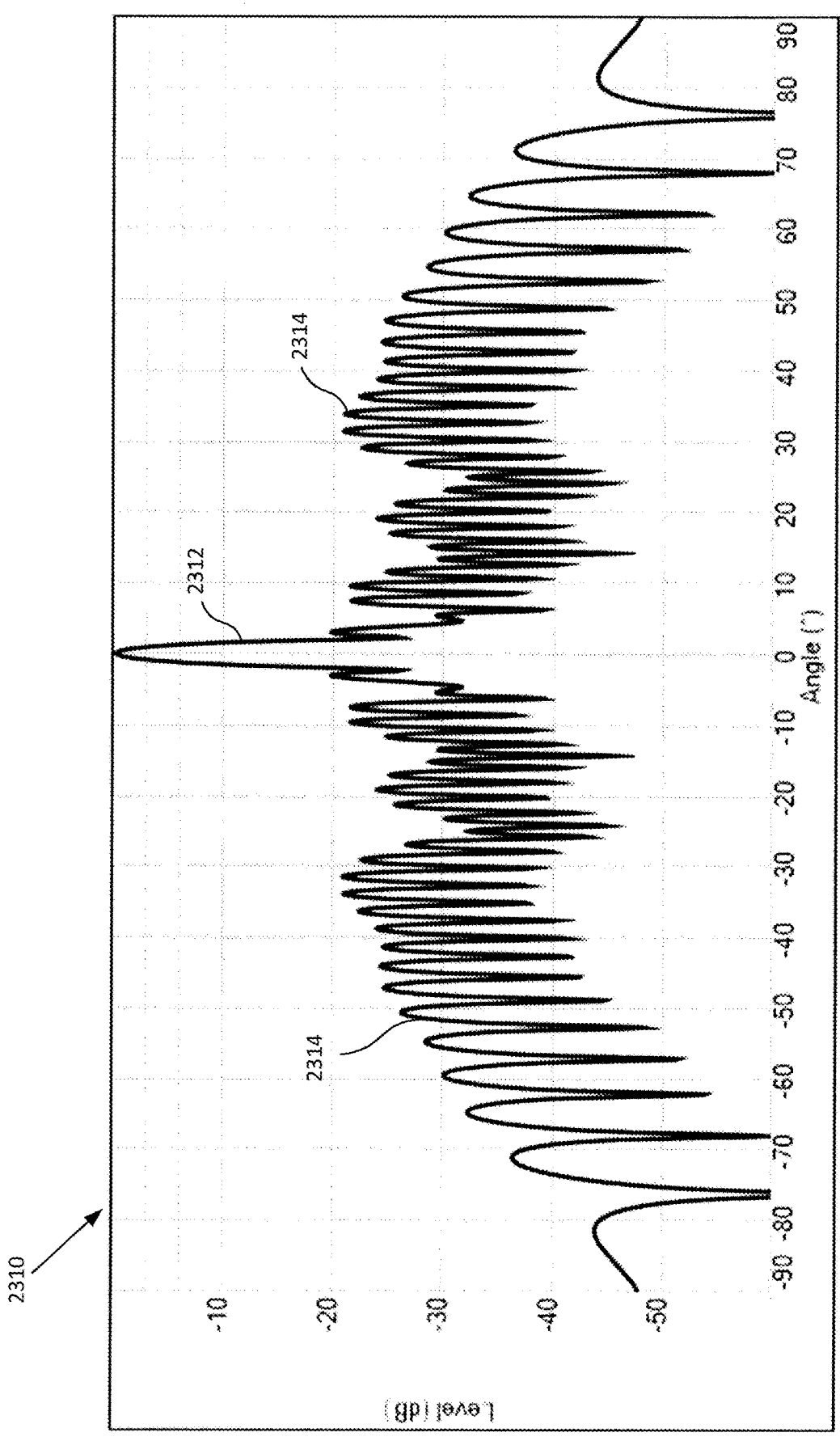
Figure 23C:
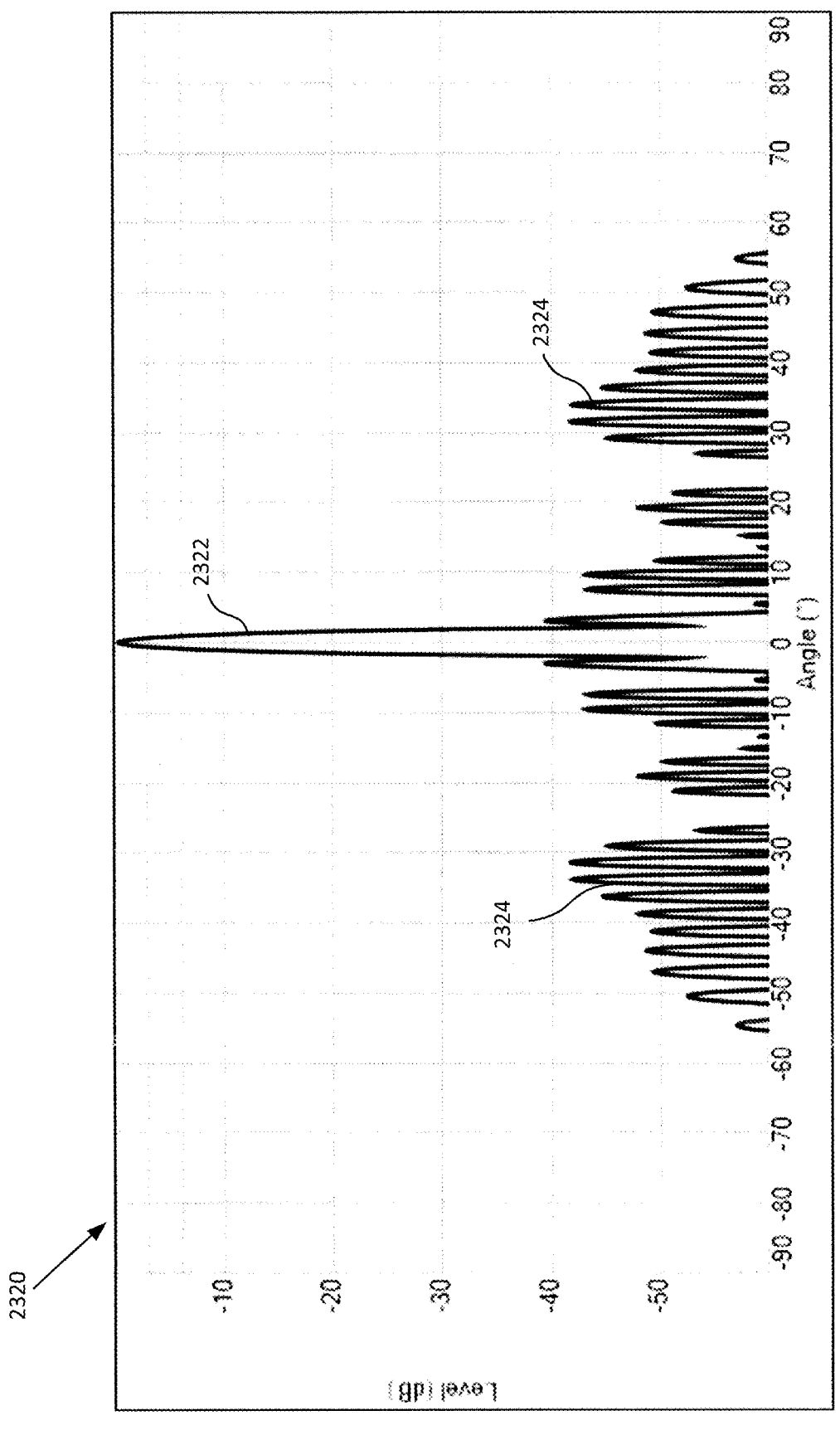
Figure 23D:
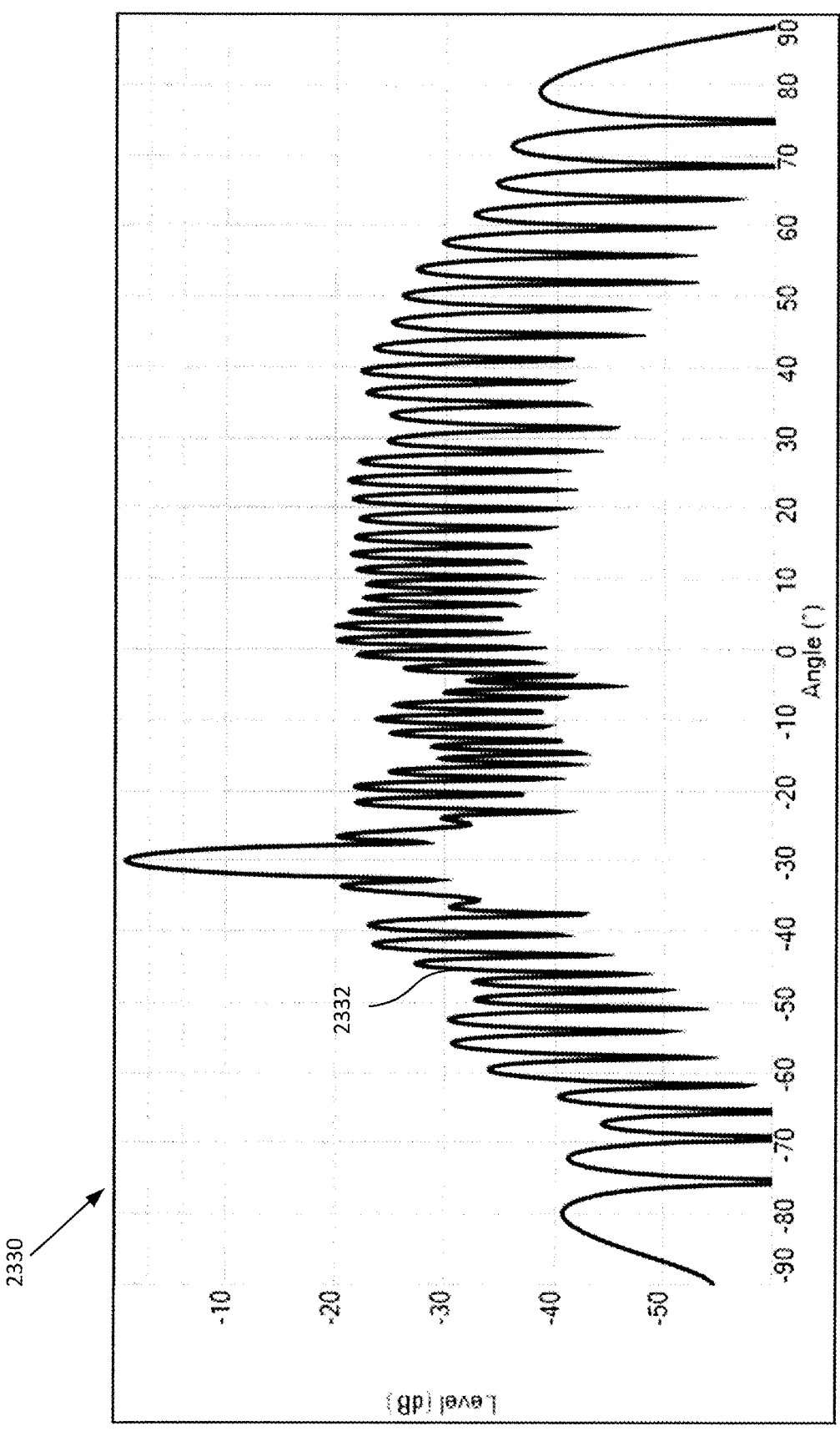
Figure 23E:
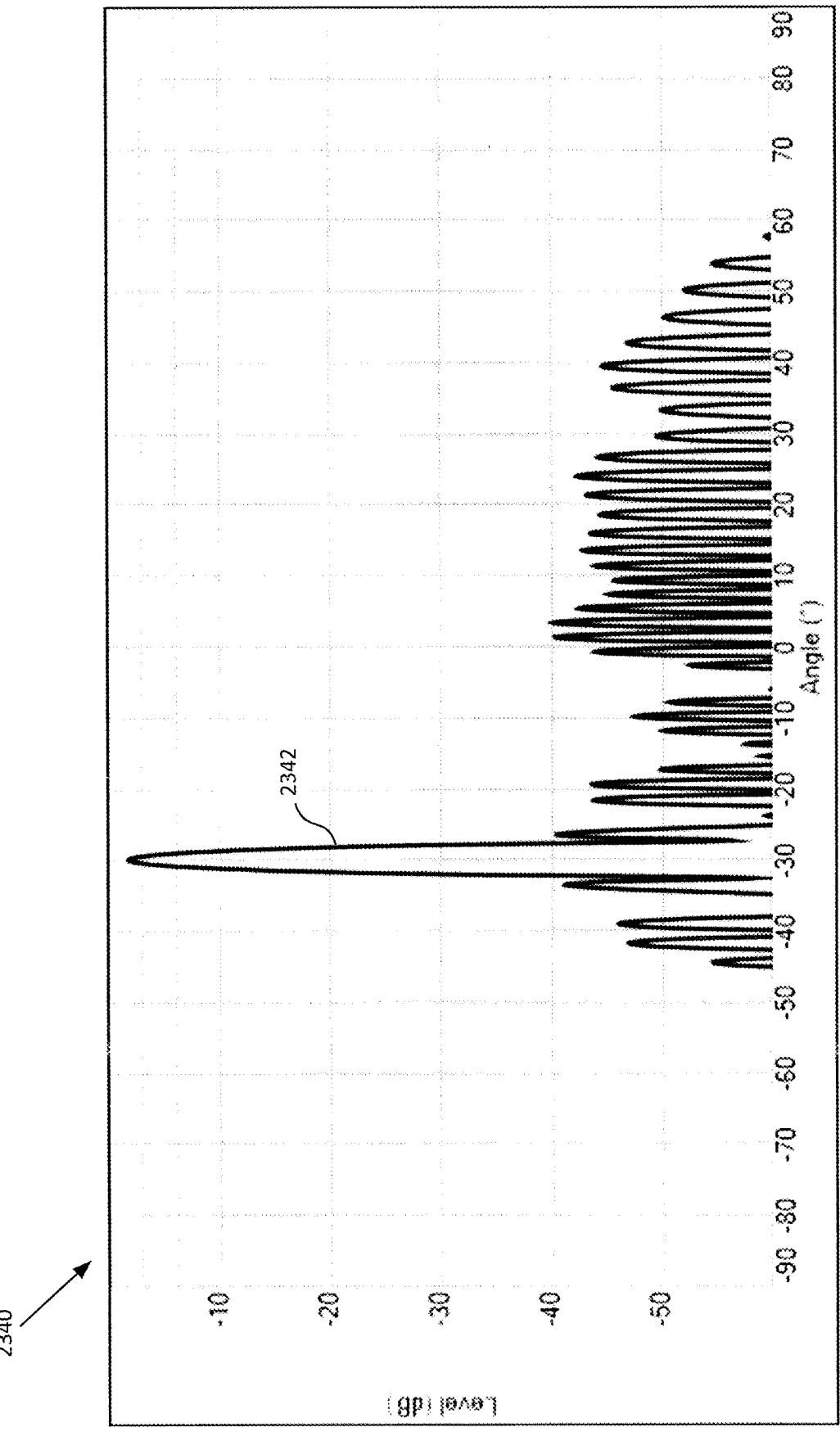

FIG. 23A illustrates a diagram of a second weighting scheme 2300 for a linear array in accordance with an embodiment of the disclosure. FIG. 23B illustrates a one-way unsteered response 2310 associated with the second weighting scheme 2300 in accordance with an embodiment of the disclosure. FIG. 23C illustrates a two-way unsteered response 2320 associated with the second weighting scheme 2300 in accordance with an embodiment of the disclosure. FIG. 23D illustrates a one-way 30° steering response 2330 associated with the second weighting scheme 2300 in accordance with an embodiment of the disclosure. FIG. 23E illustrates a two-way 30° steering response 2340 associated with the second weighting scheme 2300 in accordance with an embodiment of the disclosure.

Referring to FIG. 23A, the second weighting scheme 2300 may be a binary weighting scheme for a 64-channel half wavelength linear array. Unlike the first weighting scheme 2200 described above, the second weighting scheme 2300 may activate only a select number of channels of the linear array. For instance, the second weighting scheme 2300 may include 52 active channels and 12 inactive channels. In such embodiments, the active channels may include a weight level of 1 and the inactive channels may include a weight level of 0. For instance, as shown, channels 1, 2, 5, 8, 10, 12-53, 55, 57, 60, 63, and 64 may be active with a weight level of 1, and channels 3, 4, 6, 7, 9, 11, 54, 56, 58, 59, 61, and 62 may be inactive with a weight level of 0, though other configurations are contemplated.

As described herein, one or more characteristics of the array response may be controlled by omitting channels from the array. For instance, one or more characteristics of the center beam and/or sidelobe levels may be controlled by omitting channels from the array. In this manner, the second weighting scheme 2300 may achieve a similar or identical response compared to the first weighting scheme 2200 with reduced complexity, and therefore costs, to a beamforming system. For instance, referring to FIG. 23B, a one-way unsteered response 2310 associated with the second weighting scheme 2300 may include a center beam 2312 and a pair of sidelobes 2314. The center beam 2312 may be centered at or near a 0° angle. With the second weighting scheme 2300, the center beam 2312 may have a beam width of approximately 1.82° (–3 dB), which may be a 14.8% increase compared to a uniform array (1.58° (–6 dB)). The sidelobes 2314 may have a level of approximately –19.40 dB immediately adjacent to the center beam 2312 and generally decrease in level with angle away from the center beam 2312. The one-way unsteered response 2310 may have a shading loss of approximately –1.8 dB compared to a 64-channel uniform weighting.

Referring to FIG. 23C, a two-way unsteered response 2320 associated with the second weighting scheme 2300 may be similar to the one-way unsteered response of FIG. 23B, described above. For instance, the two-way unsteered response 2320 may include a center beam 2322 centered at or near a 0° angle, and a pair of sidelobes 2324 generally decreasing in level with angle away from the center beam 2322. With the two-way unsteered response 2322, however, the sidelobes 2324 may have a level of approximately –39 dB immediately adjacent to the center beam 2322.

Referring to FIGS. 23D-E, one and two-way steered responses 2330 and 2340 associated with the second weighting scheme 2300 may be similar to the one and two-way unsteered responses 2310 and 2320 of FIGS. 23B-C, described above. Depending on the application, the center beam 2332 and 2342 may be centered at or near an angle other than 0°, such as for example at or near a 30° angle, to converge or focus the beam on a specific location and/or direction. The array response may be steered using substantially any steering algorithm.

Figure 24A:
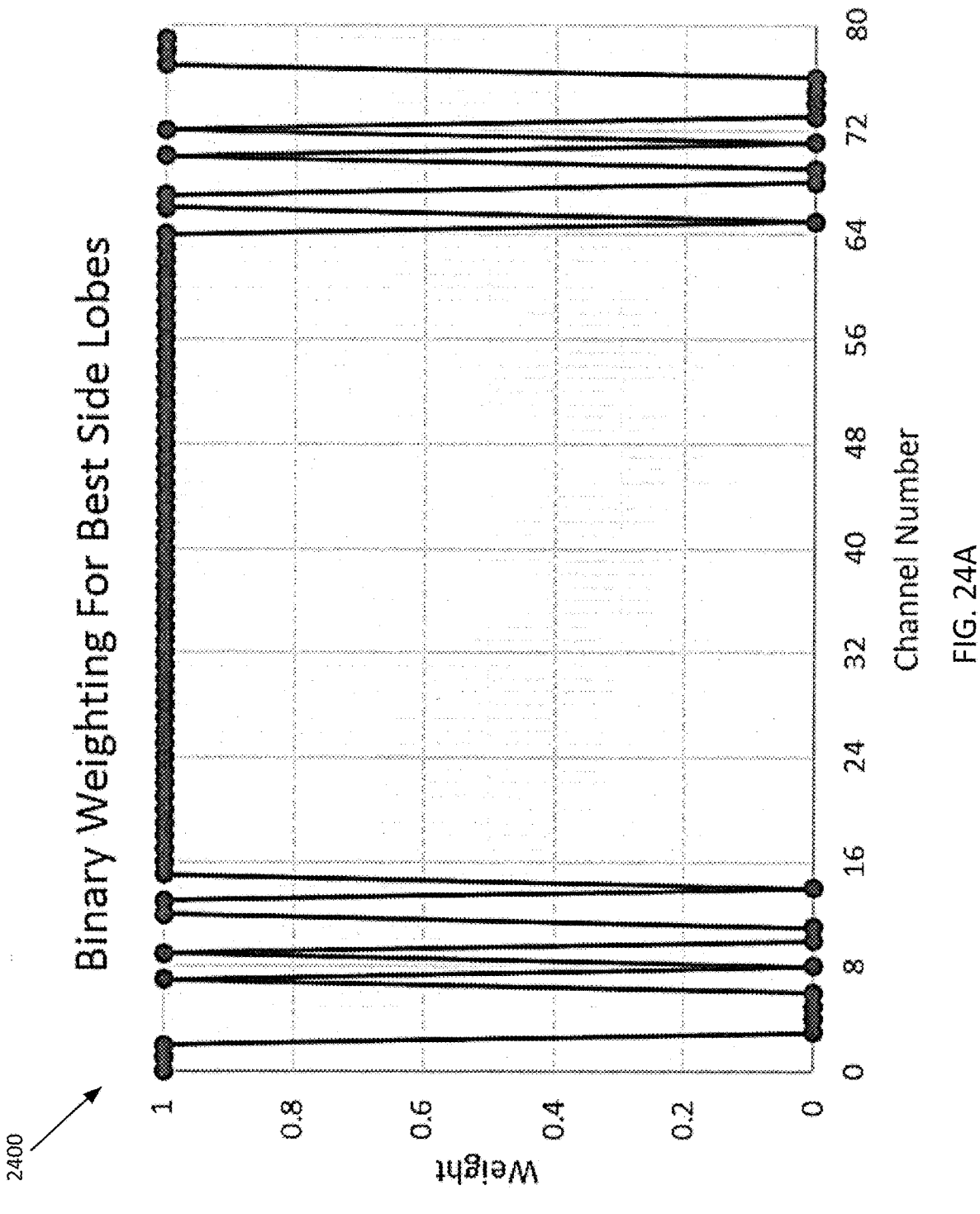
FIGS. 24A-E illustrate diagrams of a third weighting scheme for a linear array, associated one and two-way unsteered responses, and associated one and two-way 30° steering responses in accordance with an embodiment of the disclosure.
Figure 24B:
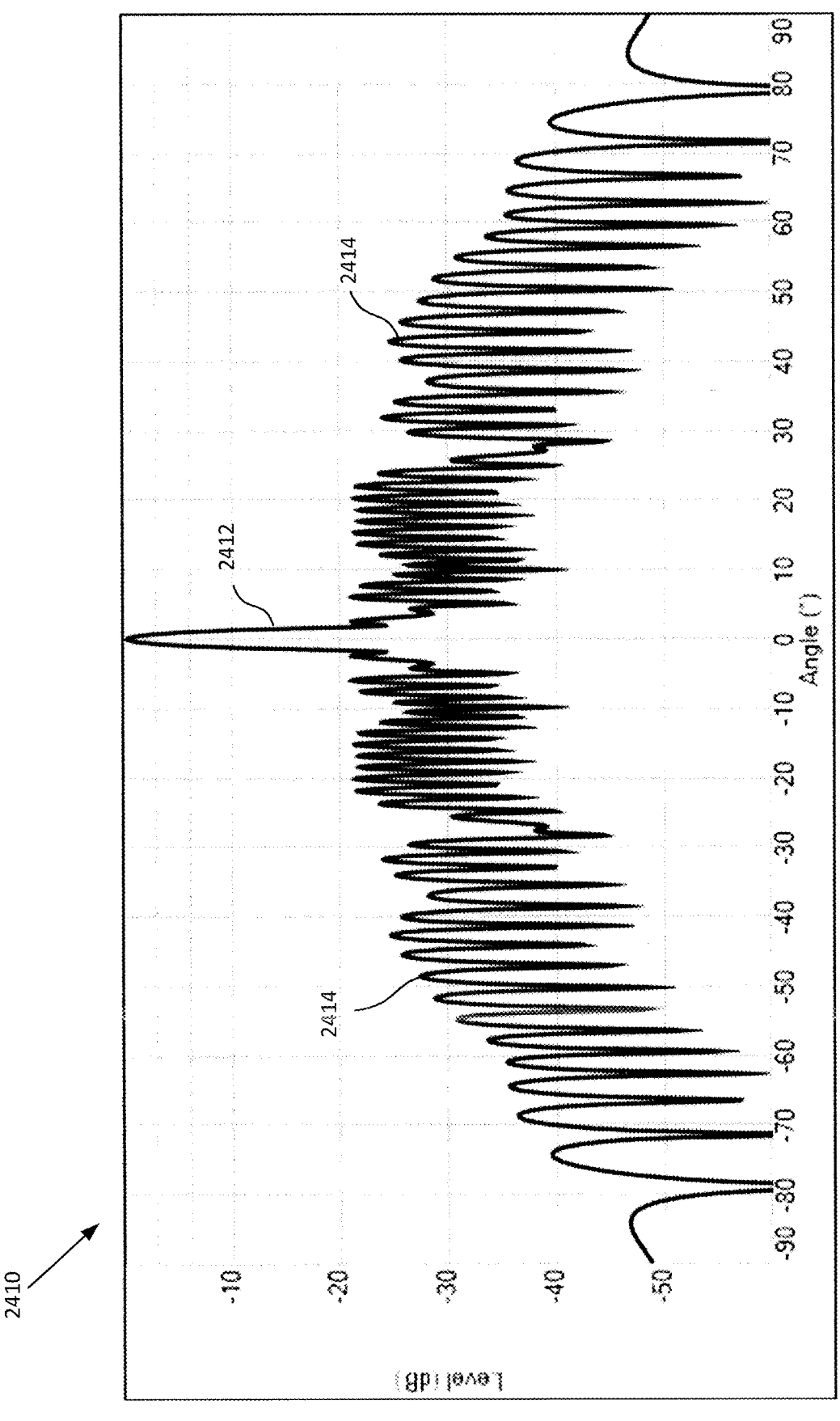
Figure 24C:
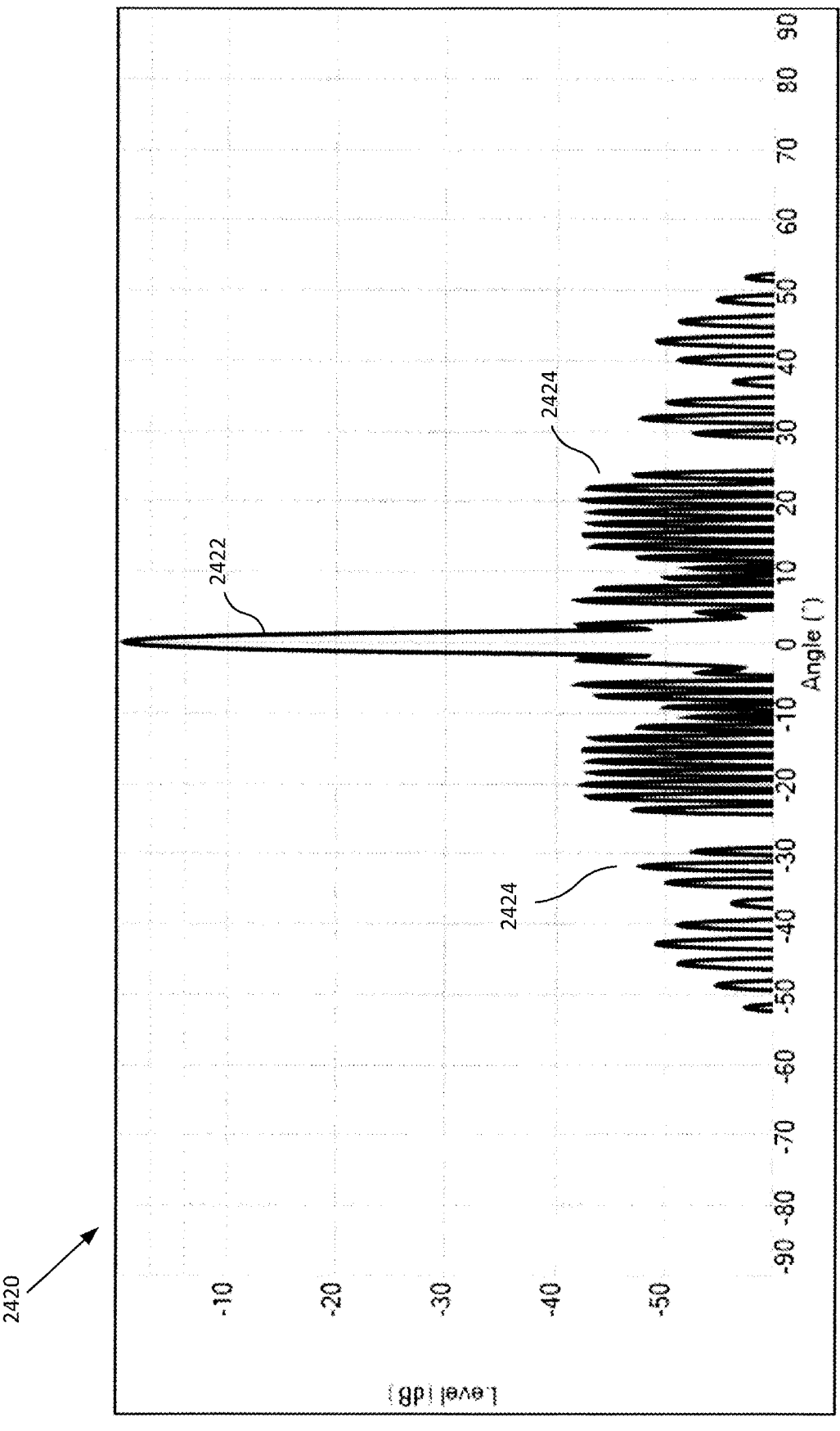
Figure 24D:
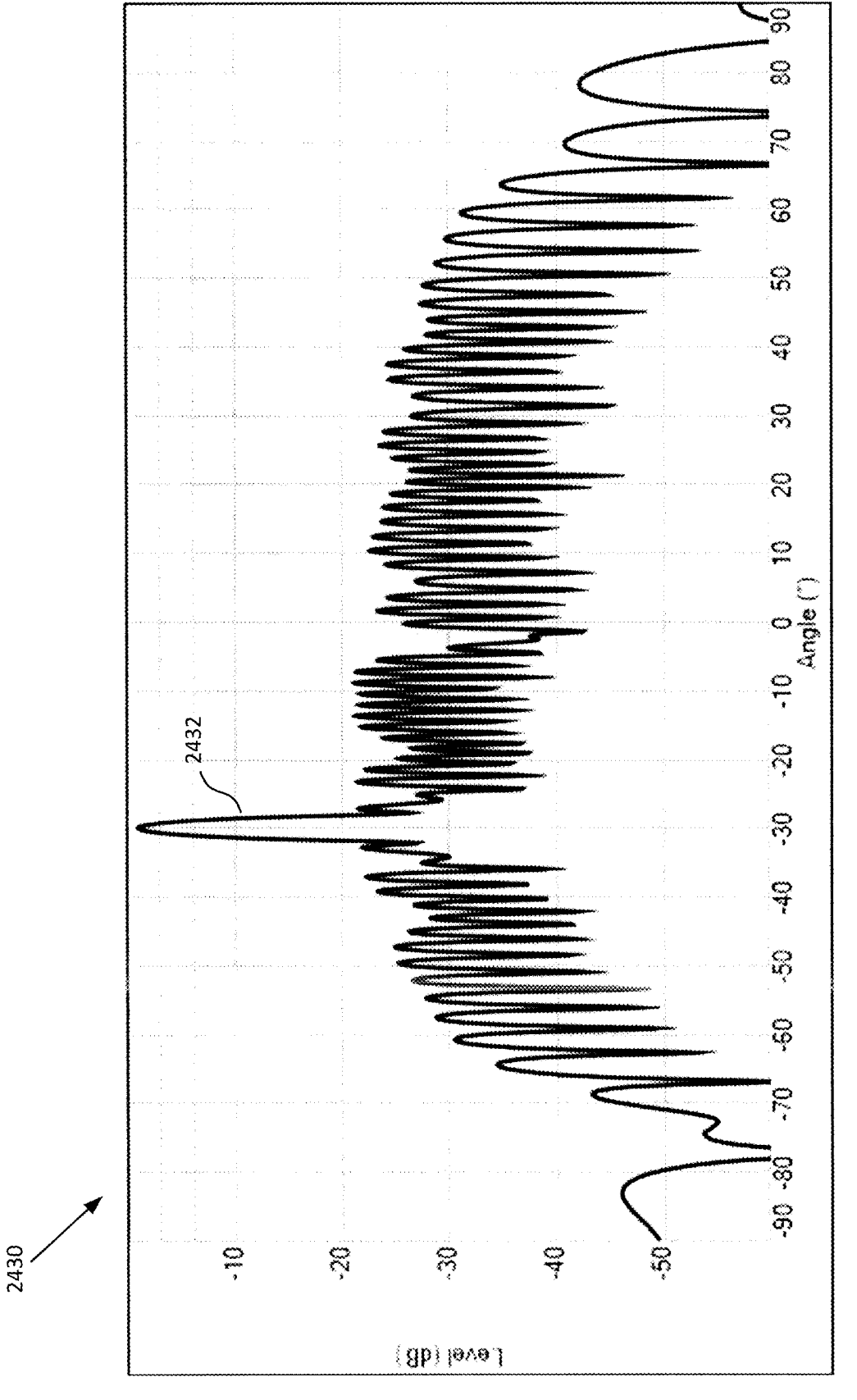
Figure 24E:
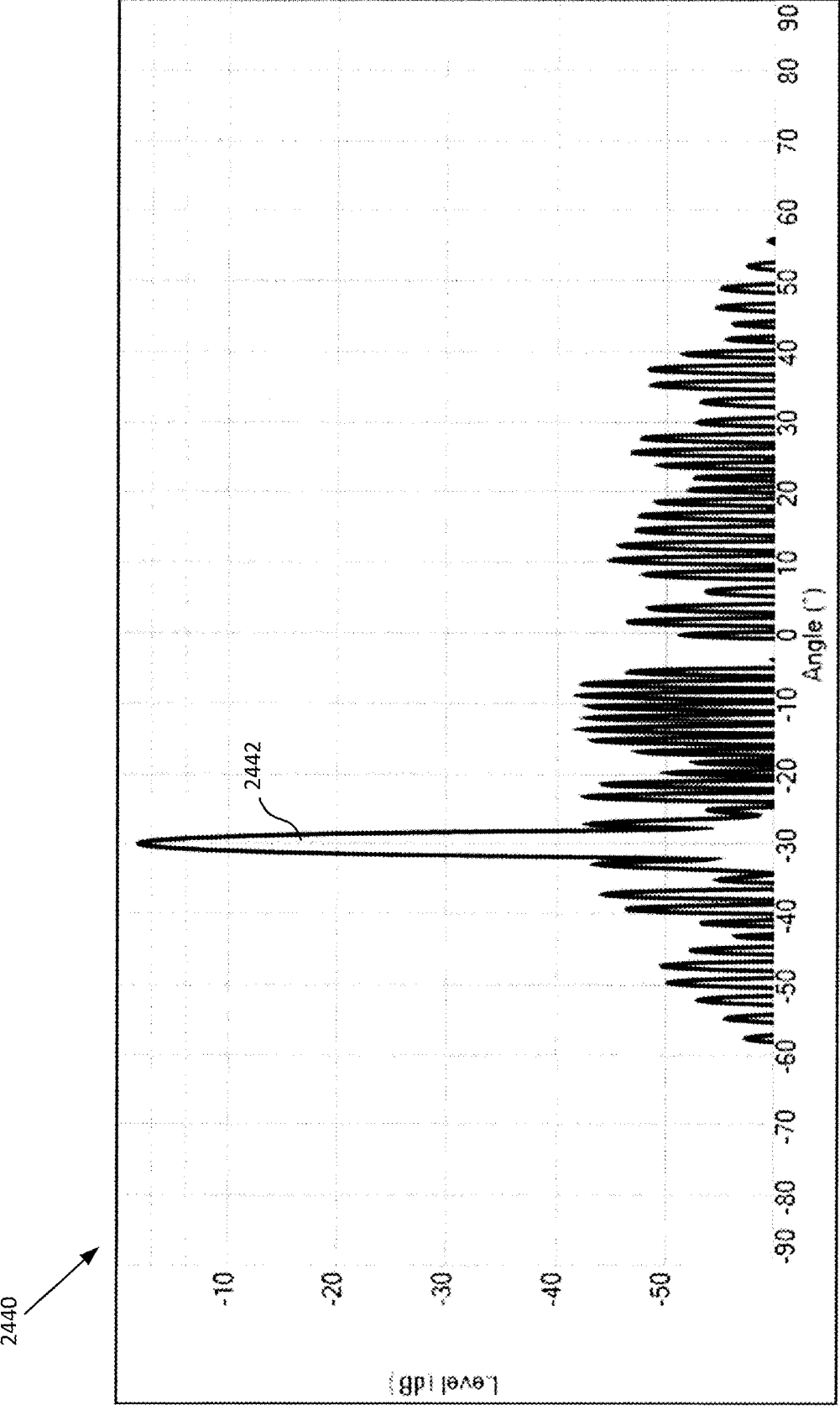

FIG. 24A illustrates a diagram of a third weighting scheme 2400 for a linear array in accordance with an embodiment of the disclosure. FIG. 24B illustrates a one-way unsteered response 2410 associated with the third weighting scheme 2400 in accordance with an embodiment of the disclosure. FIG. 24C illustrates a two-way unsteered response 2420 associated with the third weighting scheme 2400 in accordance with an embodiment of the disclosure. FIG. 24D illustrates a one-way 30° steering response 2430 associated with the third weighting scheme 2400 in accordance with an embodiment of the disclosure. FIG. 24E illustrates a two-way 30° steering response 2440 associated with the third weighting scheme 2400 in accordance with an embodiment of the disclosure.

Referring to FIG. 24A, the third weighting scheme 2400 may be a binary weighting scheme for an 80-channel half wavelength linear array. Similar to the second weighting scheme 2300 described above, the third weighting scheme 2400 may activate only a select number of channels of the linear array. For instance, the third weighting scheme 2400 may include 64 active channels and 16 inactive channels. In such embodiments, the active channels may include a weight level of 1 and the inactive channels may include a weight level of 0. For instance, as shown, channels 1-3, 8, 10, 13, 14, 16-65, 67, 68, 71, 73, and 78-80 may be active with a weight level of 1, and channels 4-7, 9, 11, 12, 15, 66, 69, 70, 72, and 74-77 may be inactive with a weight level of 0, though other configurations are contemplated.

Similar to the second weighting scheme 2300, one or more characteristics of the array response (e.g., center beam, sidelobe levels, etc.) may be controlled by omitting channels from the array using the third weighting scheme 2400. In this manner, the third weighting scheme 2400 may achieve a similar or identical response compared to the first weighting scheme 2200 with reduced complexity, and therefore costs, to a beamforming system. For instance, referring to FIG. 24B, a one-way unsteered response 2410 associated with the third weighting scheme 2400 may include a center beam 2412 and a pair of sidelobes 2414. The center beam 2412 may be centered at or near a 0° angle. With the third weighting scheme 2400, the center beam 2412 may have a beam width of approximately 1.46° (−3 dB), which may be a 7.5% decrease compared to an equivalent 64-channel uniform array (1.58° (−6 dB)). The sidelobes 2414 may have a level of approximately −20.50 dB immediately adjacent to the center beam 2412 and generally decrease in level with angle away from the center beam 2412. The one-way unsteered response 2410 may have a shading loss of approximately 0 dB compared to a 64-channel uniform weighting.

Referring to FIG. 24C, a two-way unsteered response 2420 associated with the third weighting scheme 2400 may be similar to the one-way unsteered response of FIG. 24B, described above. For instance, the two-way unsteered response 2420 may include a center beam 2422 centered at or near a 0° angle, and a pair of sidelobes 2424 generally decreasing in level with angle away from the center beam 2422. With the two-way unsteered response 2420, however, the sidelobes 2424 may have a level of approximately −41 dB immediately adjacent to the center beam 2422.

Referring to FIGS. 24D-E, one and two-way steered responses 2430 and 2440 associated with the third weighting scheme 2400 may be similar to the one and two-way unsteered responses 2410 and 2420 of FIGS. 24B-C, described above. Depending on the application, the center beam 2432 and 2442 may be centered at or near an angle other than 0°, such as for example at or near a 30° angle, to converge or focus the beam on a specific location and/or direction. The array response may be steered using substantially any steering algorithm.

Figure 25A:
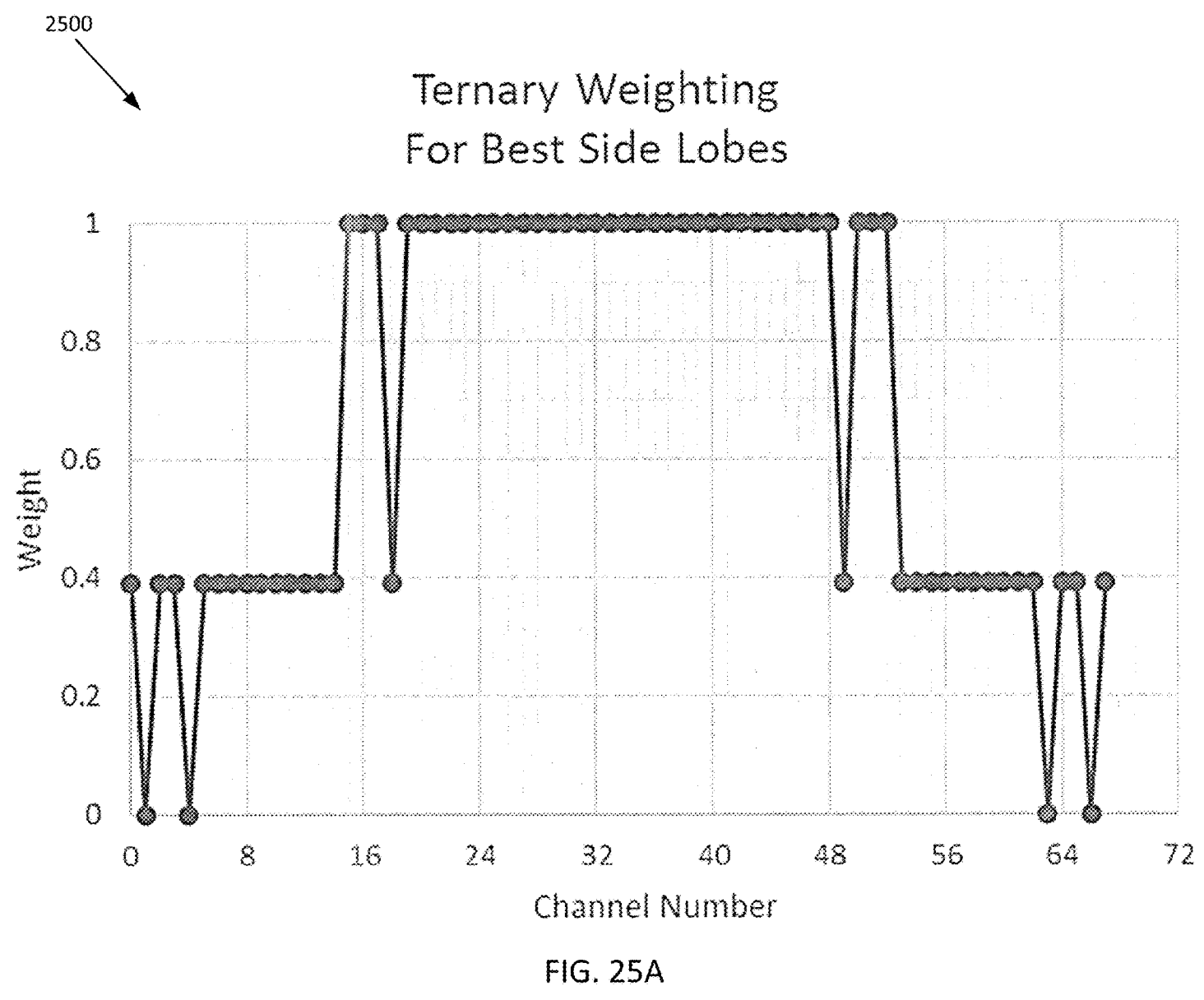
Figure 25B:
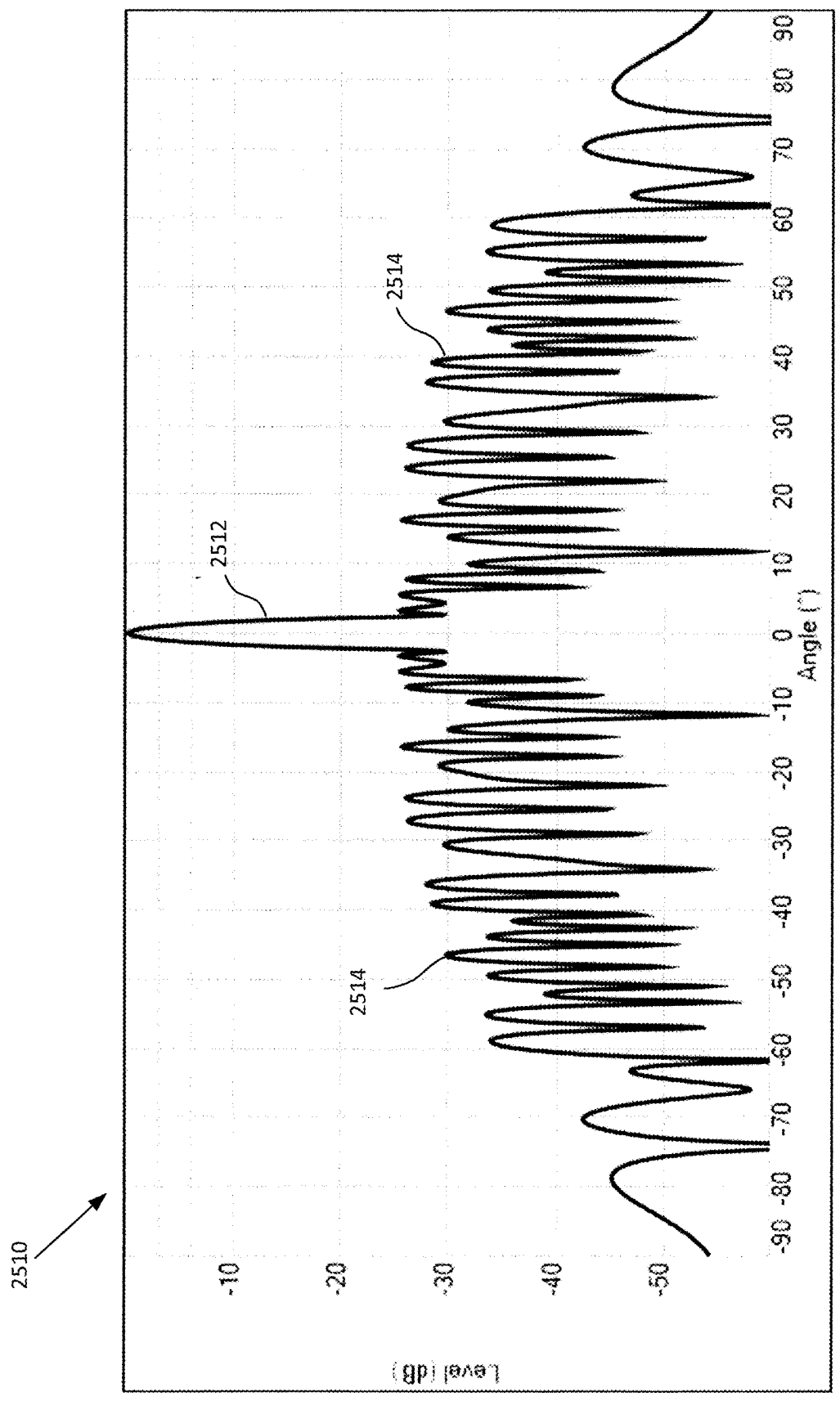
Figure 25C:
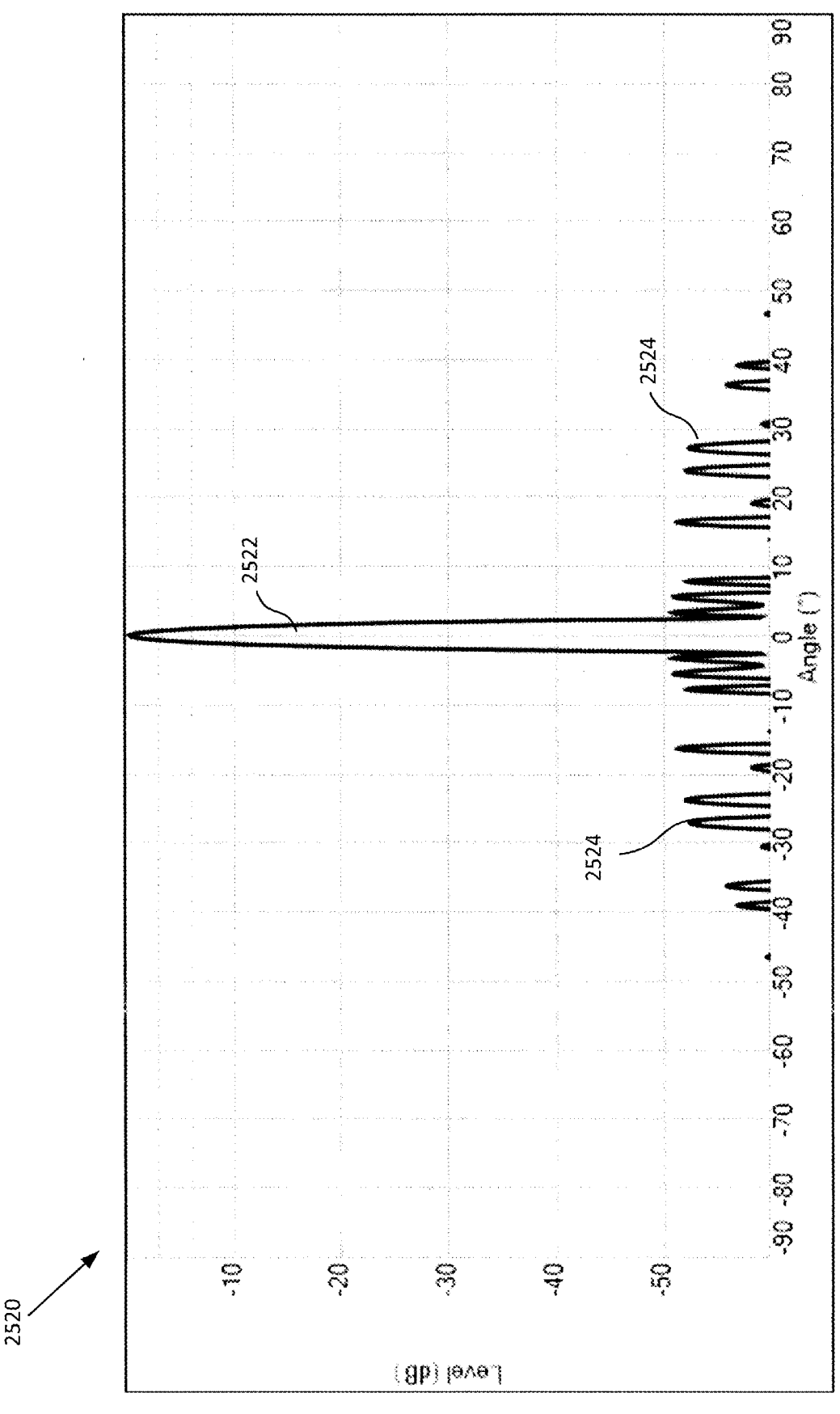
Figure 25D:
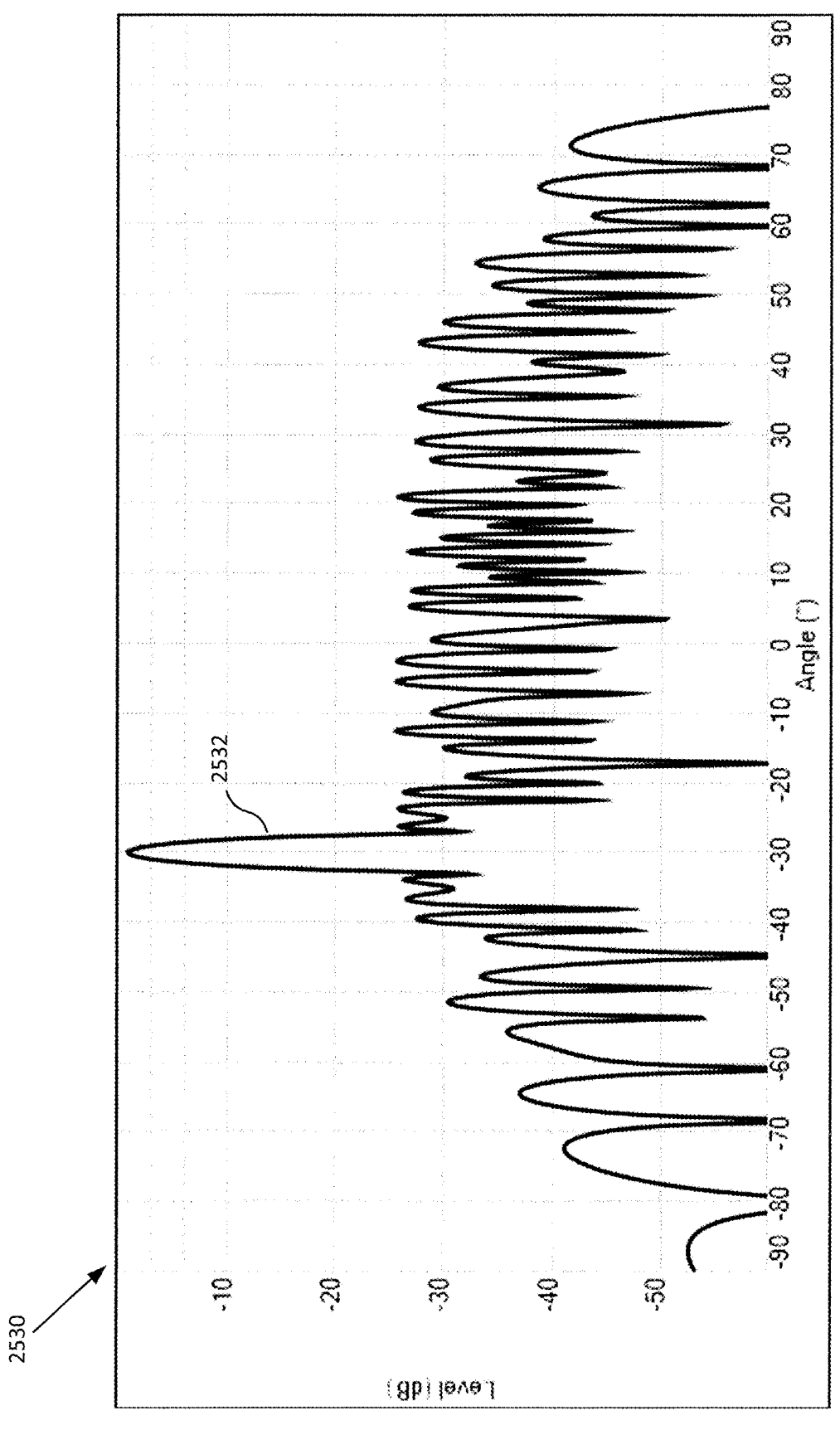
Figure 25E:
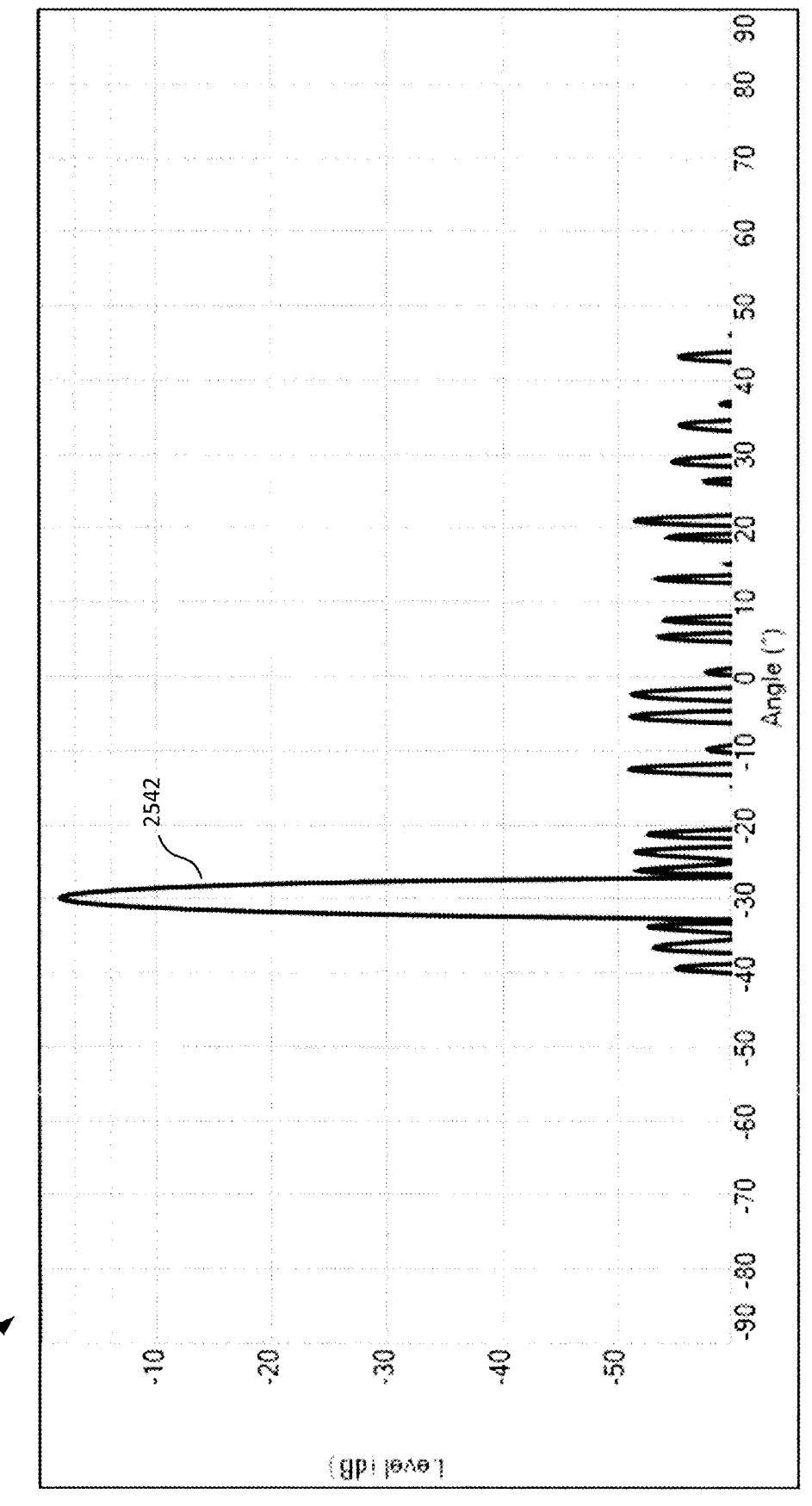

FIG. 25A illustrates a diagram of a fourth weighting scheme 2500 for a linear array in accordance with an embodiment of the disclosure. FIG. 25B illustrates a one-way unsteered response 2510 associated with the fourth weighting scheme 2500 in accordance with an embodiment of the disclosure. FIG. 25C illustrates a two-way unsteered response 2520 associated with the fourth weighting scheme 2500 in accordance with an embodiment of the disclosure. FIG. 25D illustrates a one-way 30° steering response 2530 associated with the fourth weighting scheme 2500 in accordance with an embodiment of the disclosure. FIG. 25E illustrates a two-way 30° steering response 2540 associated with the fourth weighting scheme 2500 in accordance with an embodiment of the disclosure.

Referring to FIG. 25A, the fourth weighting scheme 2500 may be a ternary weighting scheme for a 68-channel half wavelength linear array. Similar to the second weighting scheme 2300 and the third weighting scheme 2400 described above, the fourth weighting scheme 2500 may activate only a select number of channels of the linear array. For instance, the fourth weighting scheme 2500 may include 64 active channels and 4 inactive channels. In such embodiments, the inactive channels may include a weight level of 0 and the active channels may include a weight level other than 0. In some embodiments, a first set of active channels may include a weight level of 1, and a second set of active channels may include a weight level between 0 and 1, such as 0.4. For instance, as shown, channels 16-18, 20-49, and 51-53 may be active with a weight level of 1, channels 1, 3, 4, 6-15, 19, 50, 54-63, 65, 66, and 68 may be active with a weight level of 0.4, and channels 2, 5, 64, and 67 may be inactive with a weight level of 0, though other configurations are contemplated.

Similar to the second weighting scheme 2300 and third weighting scheme 2400, one or more characteristics of the array response (e.g., center beam, sidelobe levels, etc.) may be controlled by omitting channels from the array using the fourth weighting scheme 2500. In this manner, the fourth weighting scheme 2500 may achieve a similar or identical response compared to the first weighting scheme 2200 with reduced complexity, and therefore costs, to a beamforming system. For instance, referring to FIG. 25B, a one-way unsteered response 2510 associated with the fourth weighting scheme 2500 may include a center beam 2512 and a pair of sidelobes 2514. The center beam 2512 may be centered at or near a 0° angle. With the fourth weighting scheme 2500, the center beam 2512 may have a beam width of approximately 1.92° (−3 dB), which may be a 21.5% increase compared to an equivalent 64-channel uniform array (2.66° (−6 dB)). The sidelobes 2514 may have a level of approximately −25.1 dB immediately adjacent to the center beam 2512 and generally decrease in level with angle away from the center beam 2512. The one-way unsteered response 2510 may have a shading loss of approximately −2.70 dB compared to a 64-channel uniform weighting.

Referring to FIG. 25C, a two-way unsteered response 2520 associated with the fourth weighting scheme 2500 may be similar to the one-way unsteered response 2510 of FIG. 25B, described above. For instance, the two-way unsteered response 2520 may include a center beam 2522 centered at or near a 0° angle, and a pair of sidelobes 2524 generally decreasing in level with angle away from the center beam 2522. With the two-way unsteered response 2520, however, the sidelobes 2524 may have a level of approximately −50 dB immediately adjacent to the center beam 2522.

Referring to FIGS. 25D-E, one and two-way steered responses 2530 and 2540 associated with the fourth weighting scheme 2500 may be similar to the one and two-way unsteered responses 2510 and 2520 of FIGS. 25B-C, described above. Depending on the application, the center beam 2532 and 2542 may be centered at or near an angle other than 0°, such as for example at or near a 30° angle, to converge or focus the beam on a specific location and/or direction. The array response may be steered using substantially any steering algorithm.

Although FIGS. 23A-25E illustrate binary and ternary weighting schemes, other suitable weighting schemes are contemplated, including quaternary and quinary weighting schemes. In a quaternary weighting scheme, a first set of channels may be inactive with a weight level of 0, a second set of channels may be active with a weight level of 1, a third set of channels may be active with a first weight level between 0 and 1, and a fourth set of channels may be active with a second weight level between 0 and 1. In a quinary weighting scheme, a first set of channels may be inactive with a weight level of 0, a second set of channels may be active with a weight level of 1, a third set of channels may be active with a first weight level between 0 and 1, a fourth set of channels may be active with a second weight level between 0 and 1, and a fifth set of channels may be active with a third weight level between 0 and 1.

Figure 26A:
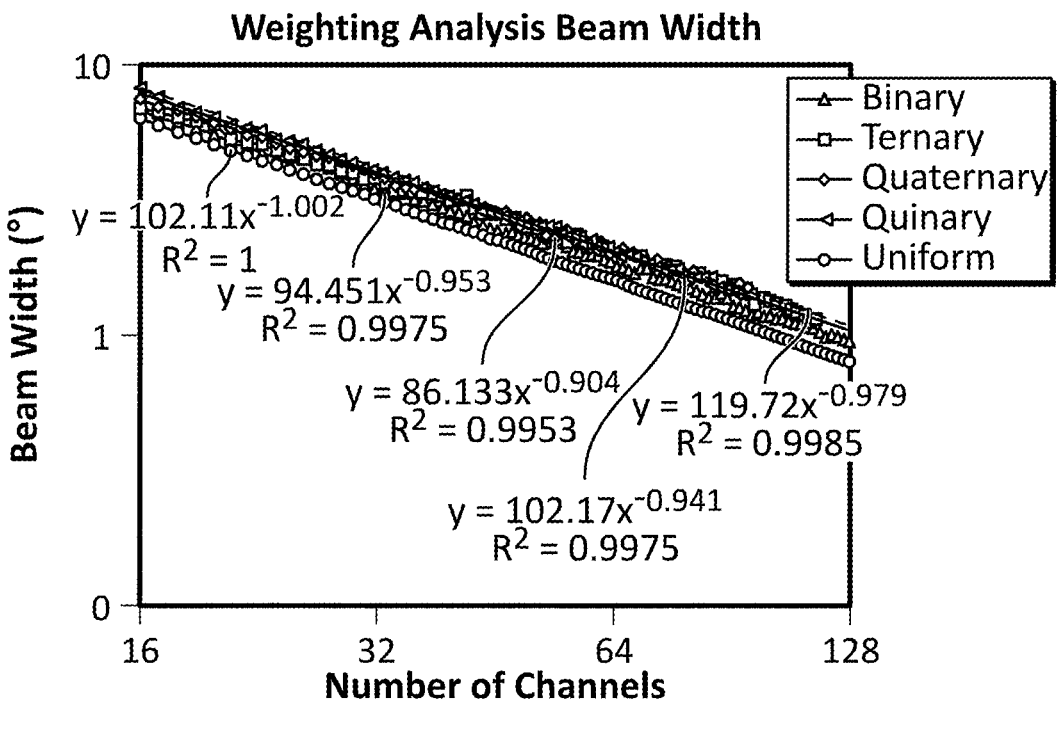
FIGS. 26A-D illustrate diagrams of weighting scheme analyses for beam width, sidelobe level reduction, increase in beam width, and number of active channels in accordance with an embodiment of the disclosure.

FIGS. 26A-D illustrate diagrams of weighting scheme analyses for beam width, sidelobe level reduction, increase in beam width, and number of active channels in accordance with an embodiment of the disclosure. Referring to FIGS. 26A-D, the number of channels may vary for each type of weighting scheme. For instance, the number of channels may vary between 16 and 128 for each of following types of weighting schemes: binary, ternary, quaternary, quinary, senary, and uniform, though other configurations are contemplated. Referring to FIG. 26A, the beam width angle may generally decrease for each weighting scheme as the number of channels increases. As shown, each of the binary, ternary, quaternary, and quinary weighting schemes may include a beam width angle that is greater than the beam width angle for the uniform weighting scheme at each channel number. In general, the beam width angle at each channel number may increase with the number of weight level steps of the weighting scheme. For instance, the beam width angle for a binary weighting scheme may be less than the beam width angle for a ternary weighting scheme, the beam width angle for a ternary weighting scheme may be less than the beam width angle for a quaternary weighting scheme, the beam width angle for a quaternary weighting scheme may be less than the beam width angle for a quinary weighting scheme, and so on, though the order may change at certain channel numbers.

As shown, the beam width angle for a uniform weighting scheme may vary according to number of channels by the following line-fit equation:

$$\text{Beam Width (°)}=102.11(\text{Number of Channels})^{-1.002}$$

The beam width angle for a binary weighting scheme may vary according to number of channels by the following line-fit equation:

$$\text{Beam Width (°)}=94.451(\text{Number of Channels})^{-0.953}$$

The beam width angle for a ternary weighting scheme may vary according to number of channels by the following line-fit equation:

$$\text{Beam Width (°)}=86.133 (\text{Number of Channels})^{-0.904}$$

The beam width angle for a quaternary weighting scheme may vary according to number of channels by the following line-fit equation:

$$\text{Beam Width (°)}=102.17(\text{Number of Channels})^{-0.941}$$

The beam width angle for a quinary weighting scheme may vary according to number of channels by the following line-fit equation:

$$\text{Beam Width (°)}=119.72(\text{Number of Channels})^{-0.979}$$

Figure 26B:
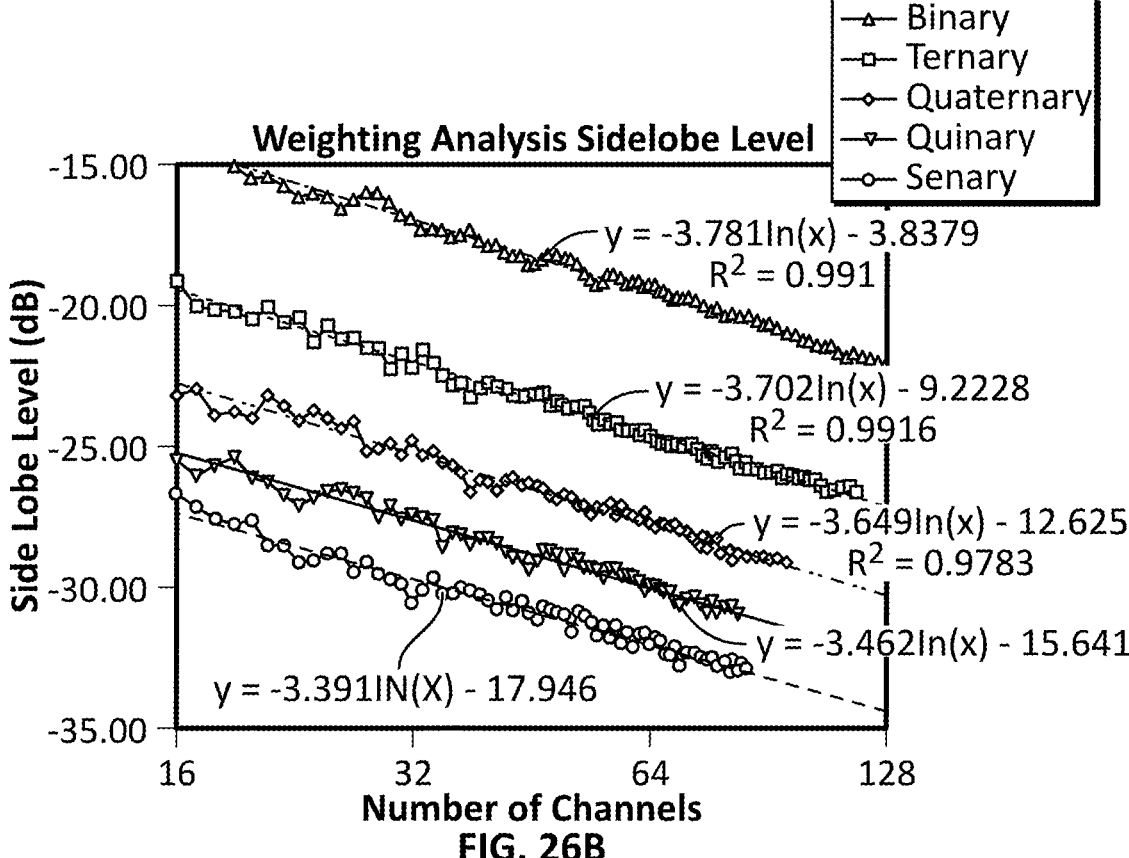

Referring to FIG. 26B, the sidelobe level (dB) may generally decrease for each weighting scheme as the number of channels increases. In general, the sidelobe level at each channel number may decrease with increasing numbers of weight level steps of the weighting scheme. For instance, the sidelobe level for a binary weighting scheme may be greater than the sidelobe level for a ternary weighting scheme, the sidelobe level for a ternary weighting scheme may be greater than the sidelobe level for a quaternary weighting scheme, and so on.

As shown, the sidelobe level for a binary weighting scheme may vary according to number of channels by the following line-fit equation:

$$\text{Sidelobe Level (dB)}=-3.781 \ln(\text{Number of Channels})-3.8379$$

The sidelobe level for a ternary weighting scheme may vary according to number of channels by the following line-fit equation:

$$\text{Sidelobe Level (dB)}=-3.702 \ln(\text{Number of Channels})-9.2228$$

The sidelobe level for a quaternary weighting scheme may vary according to number of channels by the following line-fit equation:

$$\text{Sidelobe Level (dB)}=-3.649 \ln(\text{Number of Channels})-12.625$$

The sidelobe level for a quinary weighting scheme may vary according to number of channels by the following line-fit equation:

$$\text{Sidelobe Level (dB)}=-3.462 \ln(\text{Number of Channels})-15.641$$

The sidelobe level for a senary weighting scheme may vary according to number of channels by the following line-fit equation:

$$\text{Sidelobe Level (dB)}=-3.391 \ln(\text{Number of Channels})-17.946$$

Figure 26C:
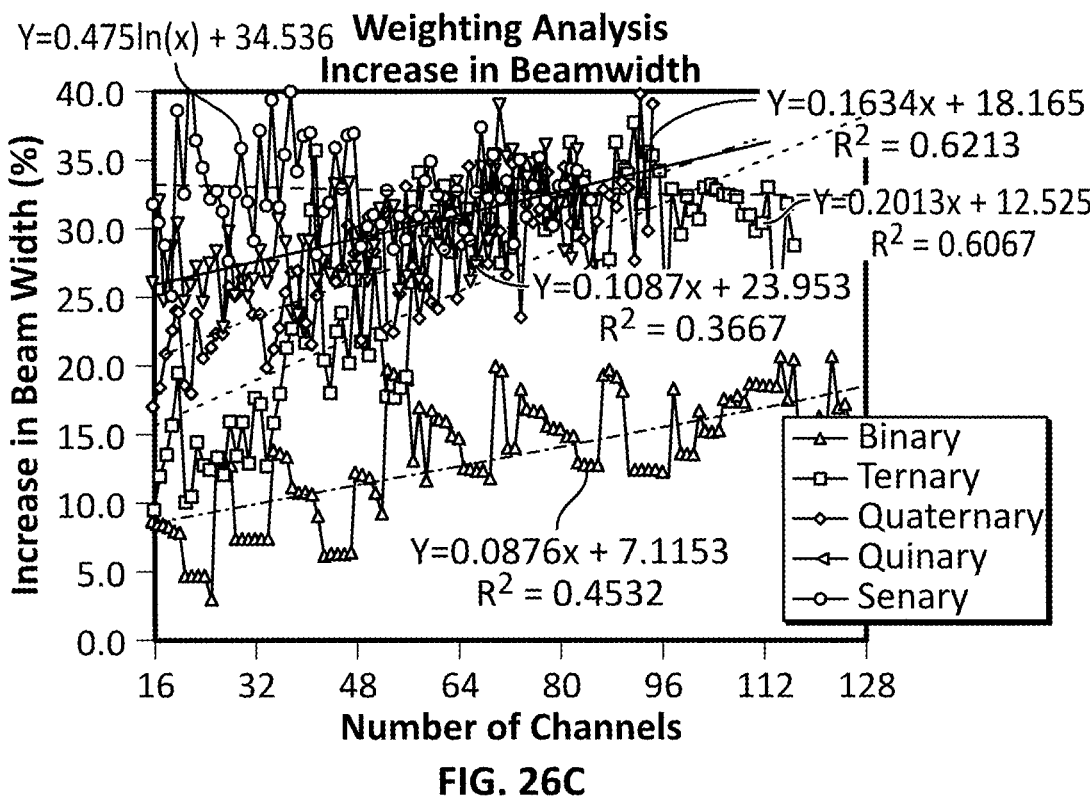

Referring to FIG. 26C, a beam width increases (%) may generally increase for each weighting scheme as the number of channels increases. In general, the beam width increases at each channel number may increase with increasing numbers of weight level steps of the weighting scheme. For instance, the beam width increase for a ternary weighting scheme may be greater than the beam width increase for a binary weighting scheme, the beam width increase for a quaternary weighting scheme may be greater than the beam width increase for a ternary weighting scheme, and so on. The number of active channels in a binary weighting scheme may be determined using the following line-fit equation:

$$\text{Active Channels}=0.7509(\text{Number of Channels})+3.6131$$

The number of active channels in a ternary weighting scheme may be determined using the following line-fit equation:

$$\text{Active Channels} = 0.8544(\text{Number of Channels}) + 3.9737$$

The number of active channels in a quaternary weighting scheme may be determined using the following line-fit equation:

$$\text{Active Channels} = 0.932(\text{Number of Channels}) + 2.0729$$

Figure 26D:
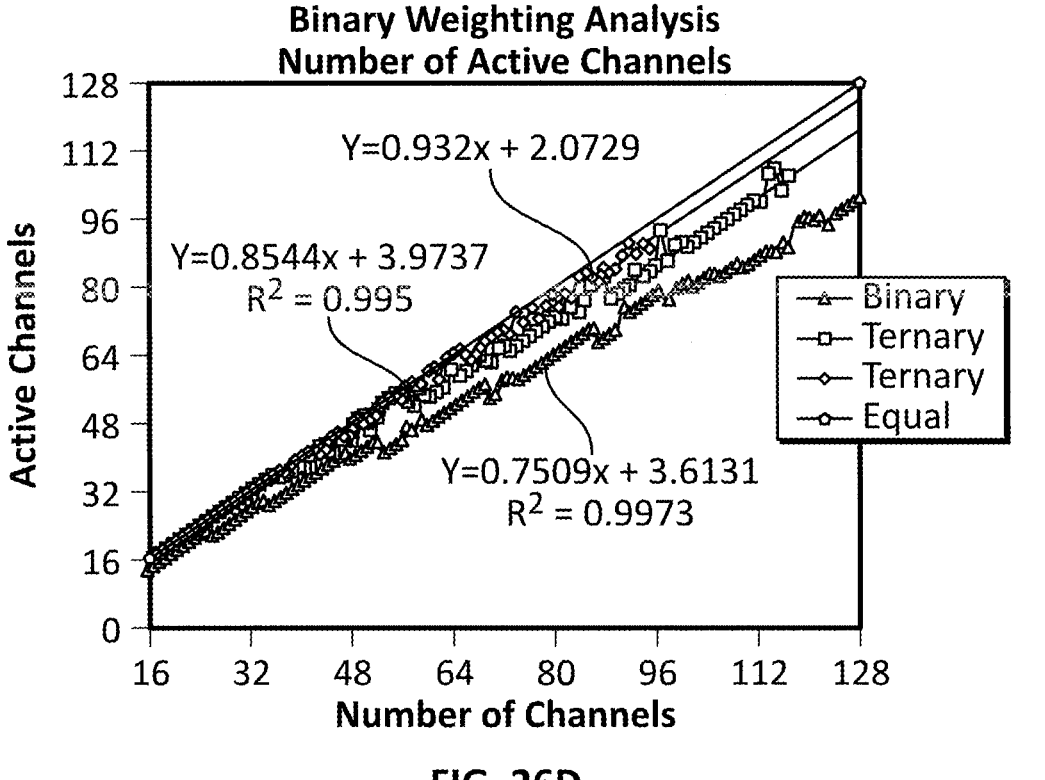

Referring to FIG. 26D, the number of active channels for each weighting scheme may be less than the number of channels in the array. In general, the number of active channels at each channel number may increase with increasing numbers of weight level steps of the weighting scheme. For instance, the number of active channels in a ternary weighting scheme may be generally greater than the number of active channels in a binary weighting scheme, the number of active channels in a quaternary weighting scheme may be greater than the number of active channels in a ternary weighting scheme, and so on.

FIG. 27A illustrates a diagram of ten 64-channel binary weighting schemes ranked according to one-way sidelobe level reduction in accordance with an embodiment of the disclosure. FIG. 27B illustrates a diagram of best sidelobe level reductions of binary weighting schemes for a fixed number of 64 active channels in accordance with an embodiment of the disclosure. FIG. 28A illustrates a diagram of ten 64-channel ternary weighting schemes ranked according to one-way sidelobe level reduction in accordance with an embodiment of the disclosure. FIG. 28B illustrates a diagram of best sidelobe level reductions of ternary weighting schemes for a fixed number of 64 active channels in accordance with an embodiment of the disclosure. Referring to FIGS. 27A-28B, multiple weighting schemes may be analyzed to determine an ideal weighting scheme to apply to an array. For instance, a logic device may be configured to process one or more signals received from an array by first weighting the received one or more signals symmetrically across a center channel of a plurality of receiver channels according to a weighting scheme (e.g., a binary weighting scheme, a ternary weighting scheme, etc.). The logic device may then perform one or more sidelobe calculations to calculate sidelobe levels of the weighted signal pattern.

In some embodiments, the array signal may be weighted according to a plurality of weighting schemes, with the plurality of weighting schemes sorted according to their respective sidelobe levels. For instance, as shown in FIGS. 27A and 28A, ten 64-channel binary and ternary weighting schemes, respectively, may be ranked according to one-way sidelobe level reduction (dB) or other characteristic (e.g., beam width angle, beam width increase, etc.). As shown, the number of channels is held constant at 64 across the ranked weighting schemes, with the number of active channels allowed to vary to achieve the lowest one-way sidelobe levels for a 64-channel linear array.

The ranking may indicate an ideal weighting scheme to achieve a desired characteristic. For example, the lowest one-way sidelobe levels for a 64-channel linear array may be achieved with 52 active channels according to a x01010010011 binary weighting scheme (ranked #1 in FIG. 27A) or with 60 active channels according to a x12211111111110101 ternary weighting scheme (ranked #1 in FIG. 28A). For a lowest active channel count, and therefore the least amount of electronics, binary weighting scheme x010001100001 (ranked #4 in FIG. 27A) may be utilized at the expense of 0.19 dB in sidelobe reduction and a reduction in signal level of 48/64 Similarly, ternary weighting scheme x12111111111100011 (ranked #2 in FIG. 28A) may be utilized at the expense of 0.169 Db in sidelobe reduction and a reduction in signal level of 58/64. For the least amount of loss in signal level, binary weighting scheme x0101101100111 (ranked #2 in FIG. 27A) or ternary weighting scheme x12222111111111011 (ranked #10 in FIG. 28A) may be utilized as this weighting scheme has the highest number of active channels for the lowest sidelobe level. For the least amount of increase in beam width (%), binary weighting scheme x01100111101011 (ranked #7 in FIG. 27A) or ternary weighting scheme x12222111111111111011 (ranked #10 in FIG. 28A) may be utilized.

Referring to FIGS. 27B and 28B, the best sidelobe level reductions of binary and ternary weighting schemes, respectively, may be determined for a set number of active channels. As shown, the number of active channels be may be held constant at 64, with the total number of channels allowed to vary to achieve the best one-way sidelobe level reduction for 64 active channels. For the lowest sidelobe level, the 80-channel binary weighting scheme or the 68-channel ternary weighting scheme may be utilized. For the narrowest beam, the 78-channel binary weighting scheme or the 74-channel ternary weighting scheme may be utilized.

Figure 29A:
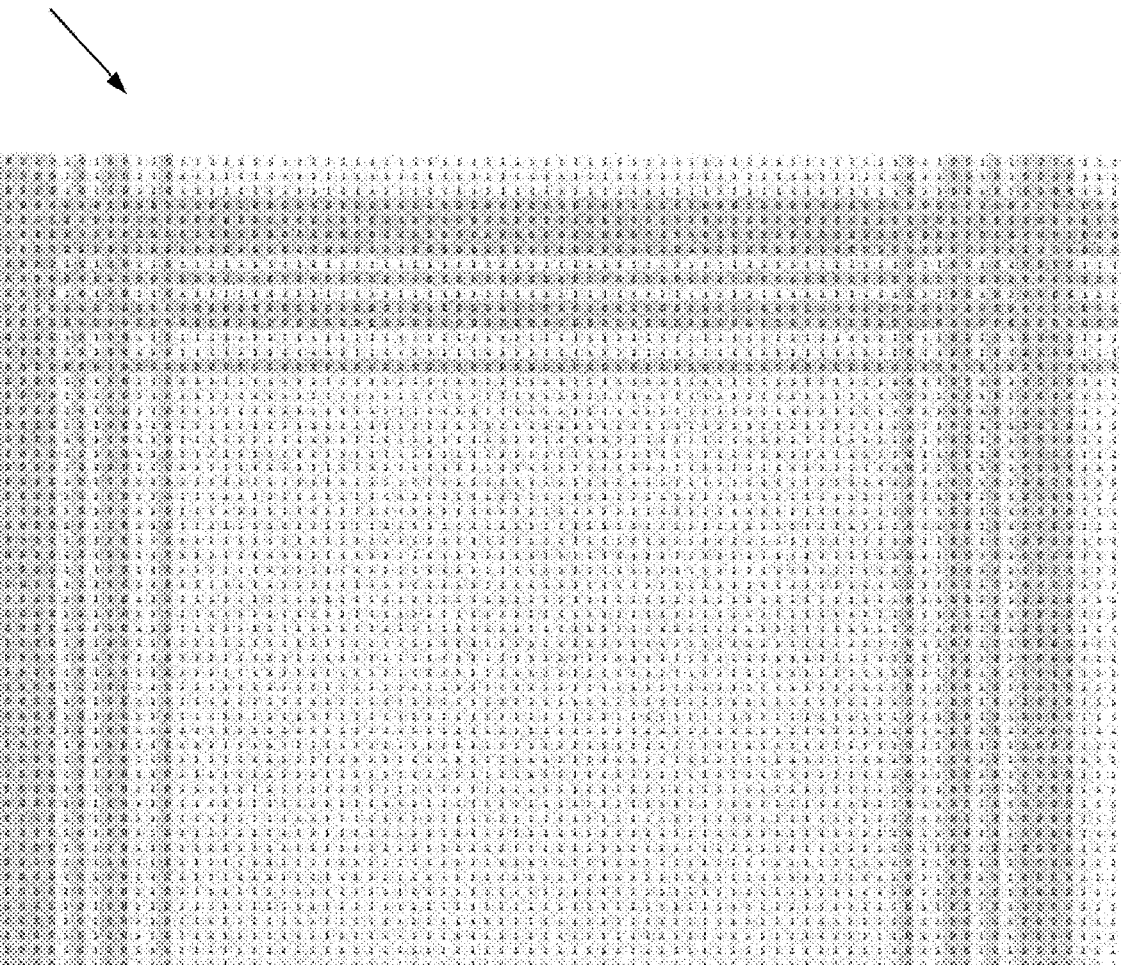
FIGS. 29A-C illustrate diagrams of a 2D array weighting scheme, a corresponding 3D directivity, and a corresponding directivity parallel to an edge in accordance with an embodiment of the disclosure.
Figure 29B:
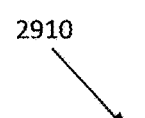
Figure 29C:
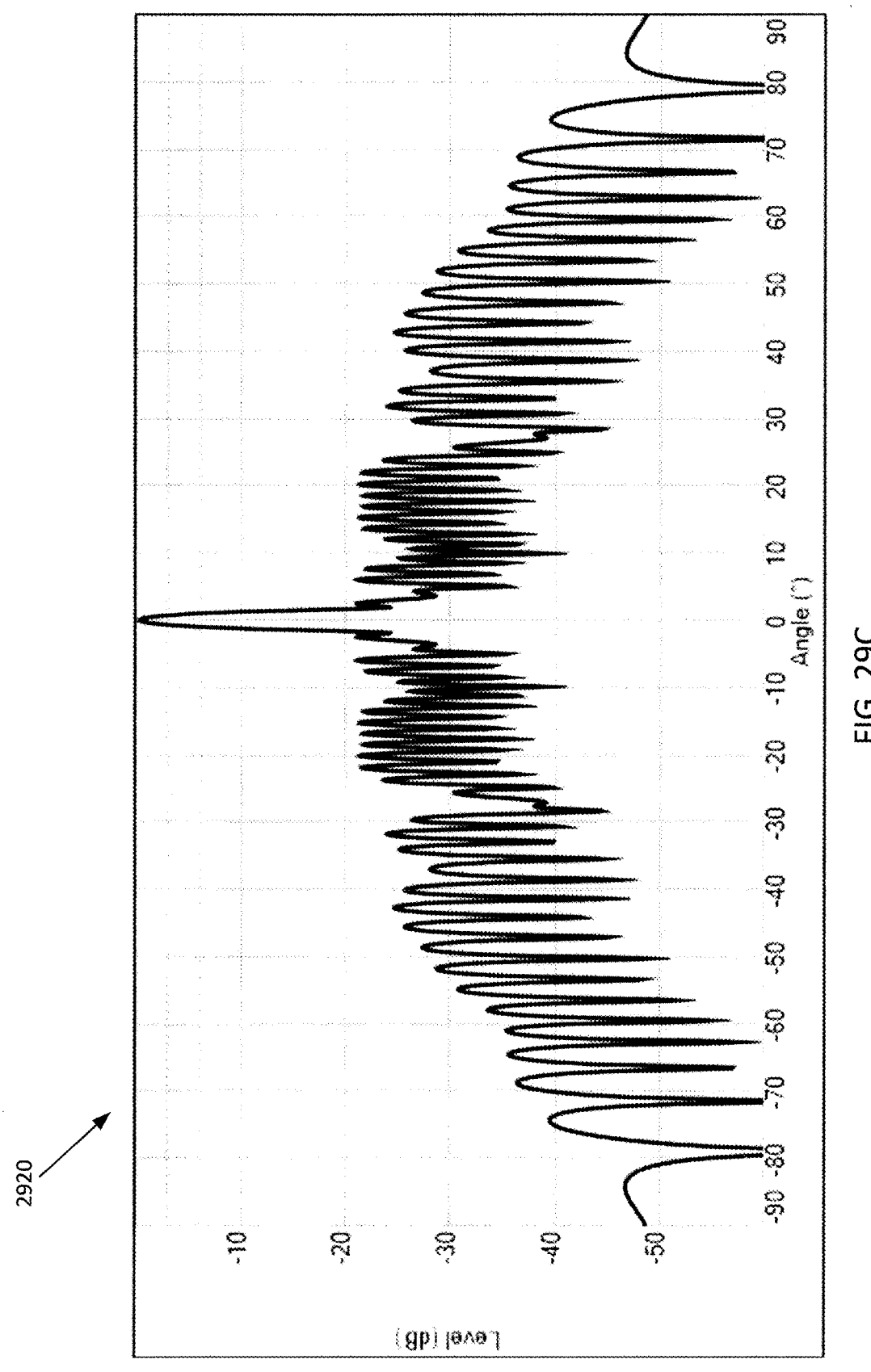
Figure 30A:
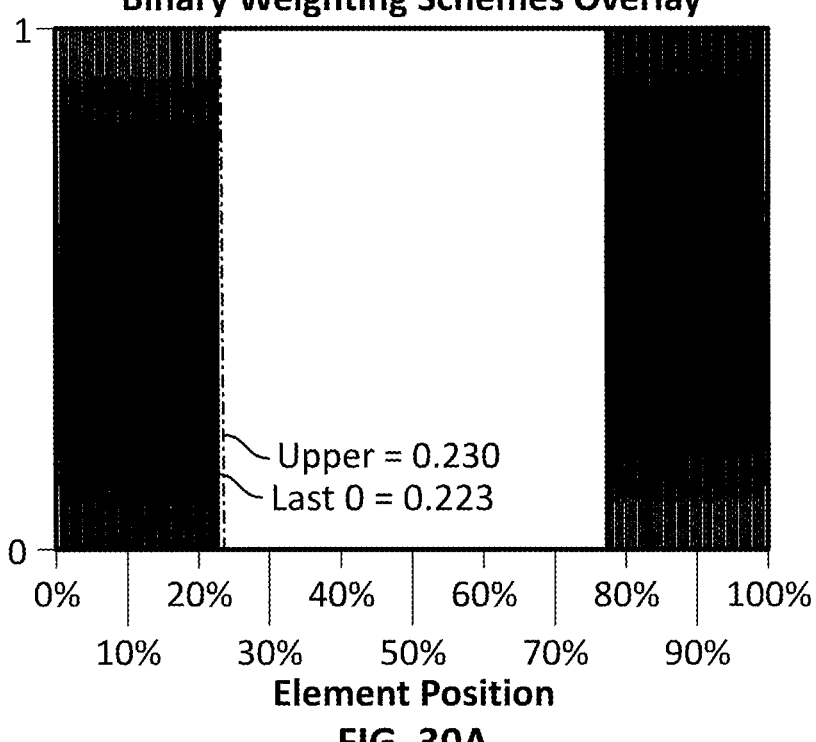
Figure 30B:
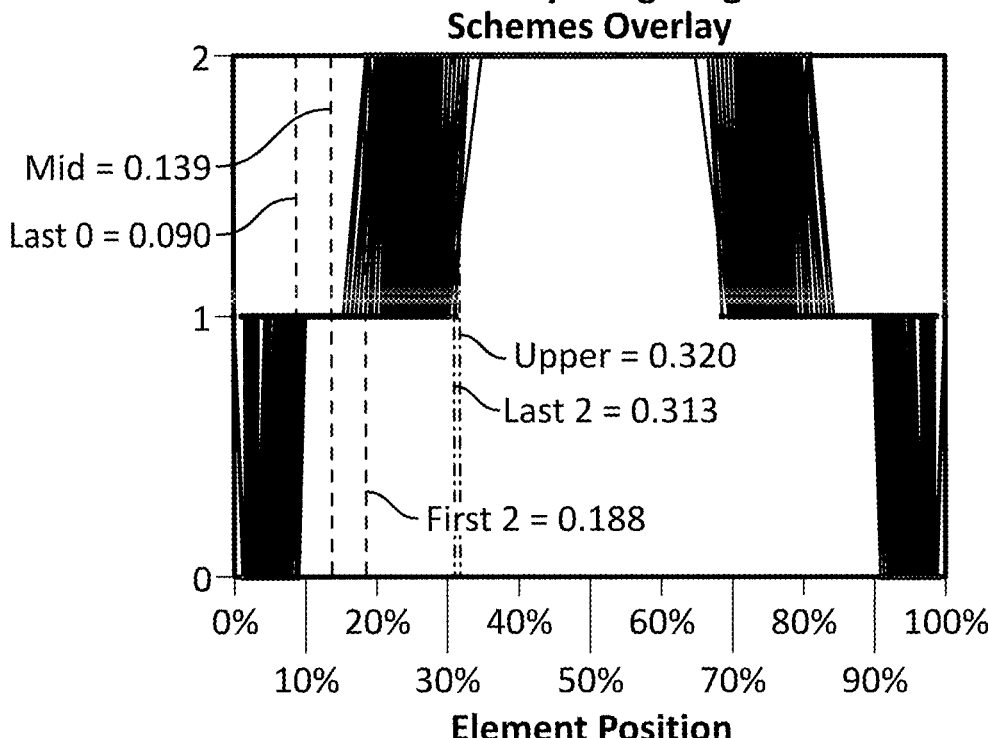
Figure 30C:
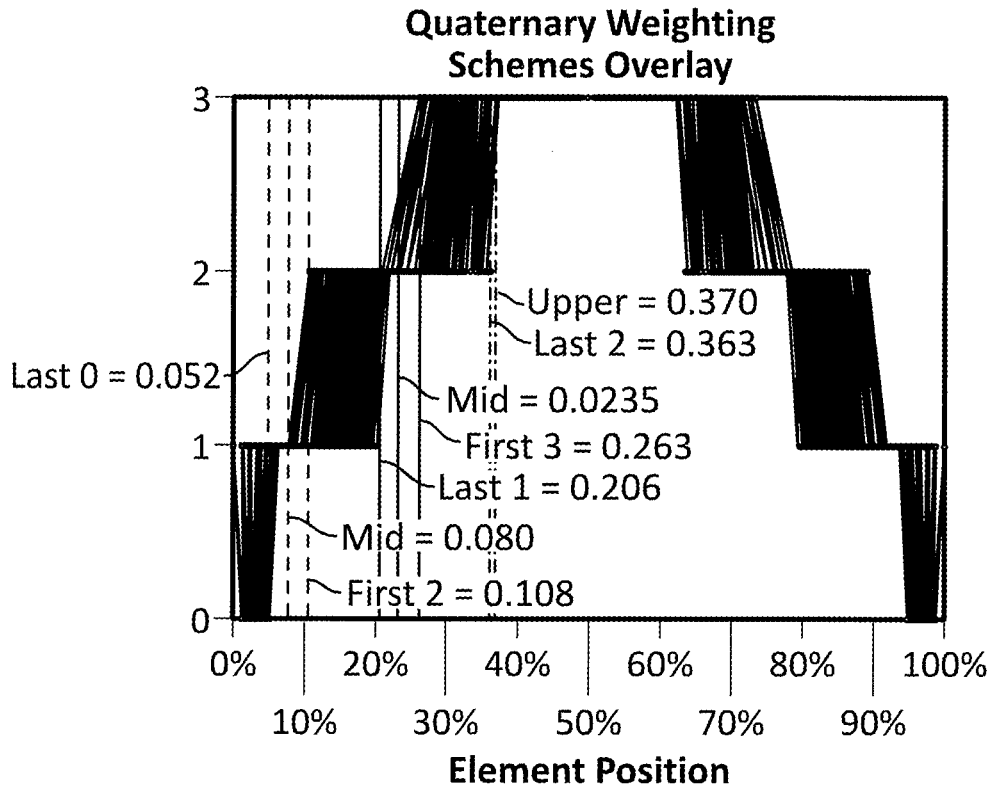
Figure 30D:
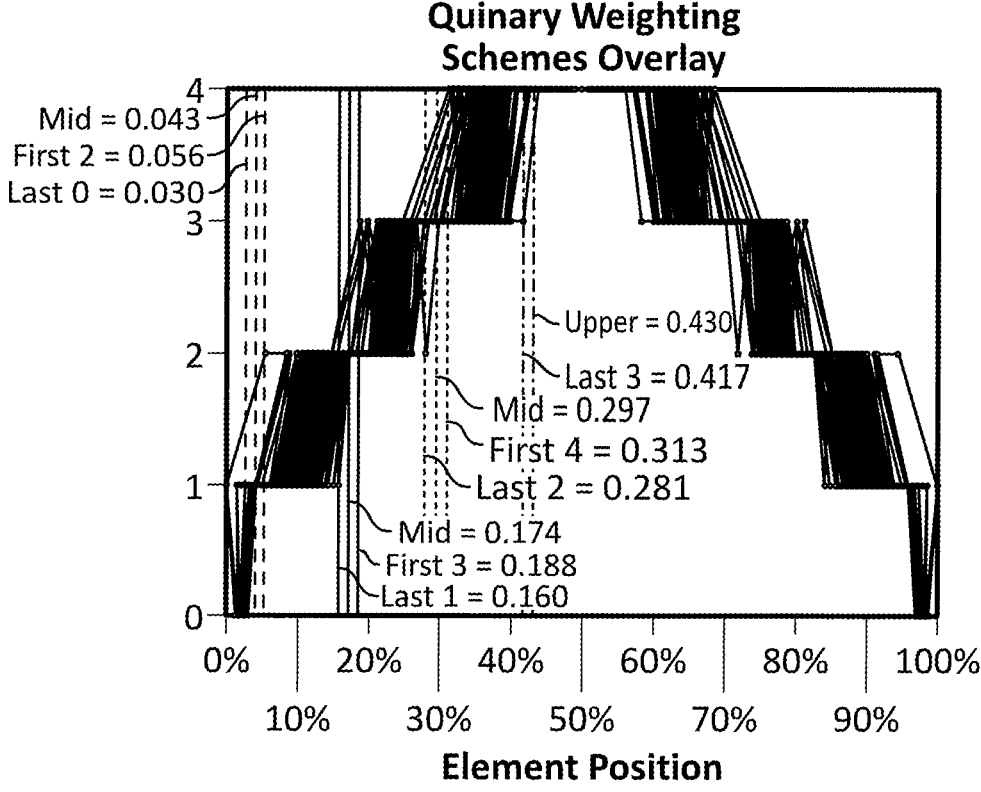

FIGS. 29A-C illustrate diagrams of a 2D array weighting scheme 2900, a corresponding 3D directivity 2910, and a corresponding 2D directivity 2920 parallel to an edge in accordance with an embodiment of the disclosure. Referring to FIGS. 29A-C, the weighting schemes described herein may be applied to a 2D array, such as the active mills cross arrangements described above. For example, for a design requirement to use 4096 active channels, conventional techniques would lead the design to choose a square 2D arrangement with side lengths of 64 channels (i.e., square root of 4096). But with the new technique described herein, the number of channels along each side can be chosen by rearranging the line fit equation of FIG. 26D, described above.

$$\text{Active Channels} = 0.7509(\text{Number of Channels}) + 3.6131$$

$$\text{Number of Channels} = \frac{\text{Active Channels} - 3.6131}{0.7509}$$

$$\text{Number of Channels} = \frac{64 - 3.6131}{0.7509} = 80$$

This is equivalent to a 6400 channel 2D array, but with 4096 active channels. This exemplary weighting scheme 2900 is illustrated in FIG. 29A, where the green cells indicate channels with unity weighting and the red cells indicate channels with zero weighting. The corresponding 3D directivity response 2910 is shown in FIG. 29B. The corresponding 2D directivity 2920 parallel to an edge of the 2D array is shown in FIG. 29C.

FIGS. 30A-E illustrate diagrams of binary, ternary, quaternary, quinary, and senary weighting schemes, respectively, overlaid, with element positions within the array normalized such that 100% is equal to the number of elements in the array, in accordance with an embodiment of the disclosure. As shown, there are areas where values can take on either of two values and cross over positions where only a single value is taken. Such offers the opportunity to use a modified binary weighting scheme for all weighting schemes, which may remove a considerable amount of redundancy and reduce computing time. For example, the ratio between a 48-channel quinary count ($5^{48}$) and a 48-channel binary count ($2^{48}$) is approximately $12.6 \times 10^{18}$ (i.e., a quinary count that takes 400,233,843,339 years would take 1 second for a binary count).

FIG. 31 illustrates a flowchart of a method 3100 of apodizing a signal received from an array in accordance with an embodiment of the disclosure. In block 3102, the method 3100 includes receiving one or more signals from an array comprising a plurality of receiver channels. In block 3104, the method 3100 includes weighting the received signals symmetrically across a center channel according to a weighting scheme. For example, each channel of a center section of the plurality of receiver channels may have a channel level of 1, the center section including one or more channels of the plurality of receiver channels. In such embodiments, channel levels of one or more channels adjacent to the center section may be limited to be within +/−1. For instance, a first set of channels adjacent to the center section may have a channel level of 0. A second set of channels adjacent to the center section may have a channel level between and including 0 and 1.

In some embodiments, the received signals may be weighted according to a plurality of weighting schemes. In such embodiments, the plurality of weighting schemes may be sorted according to a characteristic (e.g., sidelobe levels, beam width angle, increase in beam width, number of active channels, etc.). For instance, block 3104 may include ranking the various weighting schemes according to sidelobe level reduction In block 3106, the method 3100 may include calculating sidelobe levels of the signal pattern. For instance, block 3106 may include calculating the least amount of sidelobe level reduction for each weighting scheme. In some embodiments, block 3106 may include performing a first pass of the one or more sidelobe calculations at a lower resolution at a first step angle. In some embodiments, block 3106 may include performing a second pass of the one or more sidelobe calculations at a higher resolution at a second step angle. In some embodiments, block 3106 may use an angular resolution based on a uniform beam width. In some embodiments, block 3106 may include adjusting one or more mid-level channels of the plurality of receiver channels to find the lowest sidelobe levels. For instance, rather than a binary weighting scheme, a ternary or other multi-level weighting scheme may be utilized to fine tune the weighting scheme and achieve a higher level of sidelobe level reduction.

In block 3108, the method 3100 may include rejecting sidelobe levels greater than a stored best sidelobe level to produce a post process signal. For instance, to reduce the number of calculations on the system, only angles up to the first time a sidelobe exceeds the stored lowest level need to be considered. In block 3110, the method 3100 may include analyzing the post process signal. For instance, beam widths significantly larger than a uniform weighting system may be rejected. In some embodiments, only an unsteered beam response may be analyzed. For instance, only one half of the directivity needs to be considered, thereby reducing computations. In some embodiments, the post process signal may be steered using a frequency-steering technique to converge or focus the beam on a specific location and/or direction.

Embodiments of the present disclosure can thus provide inexpensive, feature-filled, reliable, compact, and accurate sonar systems, data and/or imagery. Such embodiments may be used to provide sonar data to assist in navigation and/or mapping for a mobile structure and/or to assist in the operation of other systems, devices, and/or sensors coupled to the mobile structure.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:

an active mills cross arrangement with interpolation of echo returns in two planes, the active mills cross arrangement comprising:

a transmitter configured to emit one or more signals forming one or more transmit beams;

a first line array comprising a first plurality of elements defining a first plane;

a second line array comprising a second plurality of elements defining a second plane orthogonal to the first plane; and a third line array comprising a third plurality of elements, wherein the third line array extends parallel to the second line array, and wherein the third line array is spaced away from the second line array along the first line array;

wherein the second line array and the third line array are configured to receive echo returns of the emitted signals from one or more objects or targets, and the system is configured to form one or more receive beams based on the echo returns;

wherein the first line array defines the transmitter, the transmitter defined as a transmitter array which is a phased array;

wherein the second line array defines a first receiver array for receiving echo returns of the signals emitted from the transmitter; and wherein the third line array defines a second receiver array for receiving echo returns of the signals emitted from the transmitter;

wherein the system is configured to provide a result of a multiplicative combination of the transmit and receive beams in a configuration reducing the echo returns to only those that occur within an intersection of the transmit and receive beams, the system being configured to determine a direction of arrival of the echo returns from the multiplicative combination.

2. The system of claim 1, further comprising a logic device configured to control the first line array, the second line array, and the third line array, wherein a spacing between the second line array and the third line array is proportional to a resolution of an interpolation of the received echo returns.

3. The system of claim 1, further comprising a logic device, wherein each of the first line array, the second line array, and the third line array is configured to communicate with the logic device, wherein the logic device applies an interpolation algorithm to the received echo returns to interpolate the direction of arrival of the echo returns in both the first plane and the second plane.

4. The system of claim 3, wherein the interpolation algorithm comprises half beam processing.

5. The system of claim 3, wherein the interpolation algorithm comprises estimation of signal parameters via rotational invariant techniques (ESPRIT).

6. The system of claim 3, wherein the interpolation algorithm comprises a MUSIC interpolation technique.

7. The system of claim 3, wherein the logic device is configured to:

weight the echo returns symmetrically across a center channel of a plurality of receiver channels according to a weighting scheme to produce a signal pattern;

perform one or more sidelobe calculations to calculate sidelobe levels of the signal pattern;

reject sidelobe levels greater than a stored best sidelobe level to produce a post process signal; and analyze the post process signal.

8. The system of claim 7, wherein:

the plurality of receiver channels comprise at least part of at least one of the first, second, or third line arrays; and in the at least part of the at least one of the first, second, or third arrays, at least one channel has a weight of zero, and at least two channels on opposite sides of the at least one channel in the at least one of the first, second, and third line arrays have non-zero weights.

9. The system of claim 7, wherein the logic device is configured to perform a first pass of the one or more sidelobe calculations at a first resolution at a first step angle, and wherein the logic device is configured to perform a second pass of the one or more sidelobe calculations at a second resolution higher than the first resolution at a second step angle.

10. The system of claim 7, wherein the logic device is configured to:

weight the received one or more signals according to a plurality of weighting schemes; and sort the plurality of weighting schemes according to their respective sidelobe levels, and wherein the transmitter comprises a sonar transducer configured to emit sonar signals.

11. A method comprising:

emitting, by a transmitter controlled by a logic device, one or more signals along a first plane, the transmitter being a phased array, the one or more signals forming one or more transmit beams;

receiving, by a first line array in communication with the logic device, echo returns of the emitted signals along a second plane;

receiving, by a second line array in communication with the logic device, echo returns of the emitted signals along a third plane parallel to the second plane;

forming one or more receive beams based on the echo returns of the emitted signals along the second and third planes; and interpolating, by the logic device in a plurality of planes, a direction of arrival algorithm to the received echo returns;

wherein the method comprises providing a result of a multiplicative combination of the transmit and receive beams in a configuration reducing the echo returns to only those that occur within an intersection of the transmit and receive beams;

wherein the method comprises determining a direction of arrival of the echo returns from the multiplicative combination.

12. The method of claim 11, wherein the interpolating comprises one or more of the following interpolation techniques: estimation of signal parameters via rotational invariant techniques (ESPRIT), MUSIC, or half-beam processing.

13. The method of claim 11, wherein the second and third planes are spaced away from each other along the first plane.

14. The method of claim 11, wherein emitting the one or more signals comprises emitting the one or more signals by the phased array arranged along the first plane.

15. The method of claim 11, further comprising:

weighting the received echo returns symmetrically across a center channel of a plurality of receiver channels according to a weighting scheme to produce a signal pattern;

calculating sidelobe levels of the signal pattern;

rejecting sidelobe levels greater than a stored best sidelobe level to produce a post process signal; and analyzing the post process signal.

16. The method of claim 15, further comprising:

setting a channel level of a center section of the plurality of receiver channels to 1; and limiting channel levels of one or more channels adjacent to the center section to within +/−1.

17. The method of claim 15, further comprising:

performing a first pass of the sidelobe level calculations at a first resolution at a first step angle; and performing a second pass of the sidelobe level calculations at a second resolution higher than the first resolution at a second step angle.

18. The method of claim 15, further comprising:

weighting the received echo returns according to a plurality of weighting schemes;

sorting the plurality of weighting schemes according to their respective sidelobe levels; and adjusting one or more mid-level channels of the plurality of receiver channels to find a lowest sidelobe level.

19. The method of claim 15, further comprising using an angular resolution based on a uniform beam width to reduce the number of angular calculations for a wide beam.

* * * * *